(12) United States Patent
Hong et al.

(10) Patent No.: US 8,797,632 B2
(45) Date of Patent: Aug. 5, 2014

(54) ACTUATION AND CALIBRATION OF CHARGE NEUTRAL ELECTRODE OF A DISPLAY DEVICE

(75) Inventors: John H. Hong, San Clemente, CA (US); Chong U. Lee, San Diego, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 231 days.

(21) Appl. No.: 13/211,136

(22) Filed: Aug. 16, 2011

(65) Prior Publication Data

US 2012/0044237 A1 Feb. 23, 2012

Related U.S. Application Data

(60) Provisional application No. 61/374,569, filed on Aug. 17, 2010.

(51) Int. Cl.
*G02B 26/00* (2006.01)
(52) U.S. Cl.
USPC ............ 359/295; 359/290; 359/245; 345/108
(58) Field of Classification Search
USPC ........... 345/84, 107, 204, 501, 418, 690, 212, 345/205; 359/290–298, 578, 224.1, 365; 356/614; 257/415, 254, E21.215; 361/783
See application file for complete search history.

(56) References Cited

U.S. PATENT DOCUMENTS 2,590,906 A 4/1952 Tripp
2,677,714 A 5/1954 Auwarter (Continued)

FOREIGN PATENT DOCUMENTS

DE 10 2006 039 071 2/2008
EP 0 035 299 9/1983

(Continued)

OTHER PUBLICATIONS

Billard, Tunable Capacitor, 5th Annual Review of LETI, Jun. 24, 2003, p. 7.

(Continued)

*Primary Examiner* — Alexander S Beck
*Assistant Examiner* — Charles Zheng
(74) *Attorney, Agent, or Firm* — Knobbe Martens Olson & Bear LLP

(57) ABSTRACT

This disclosure provides systems, methods, and devices for actuating, charging and calibrating the charge on a movable electrode in electromechanical systems (EMS) devices. The electromechanical systems device can include a first electrode, a second electrode spaced apart from the first electrode by a gap, a complementary electrode, at least one electrical contact, and a movable third electrode disposed between the first electrode and the second electrode. In one implementation, a method of calibrating charge on the movable electrode of the EMS device includes electrically connecting a complementary electrode to the first electrode to form a compound electrode and applying a calibration voltage across the compound electrode and the second electrode to produce a uniform electric field in the gap. Under the electric field the third electrode moves towards the first electrode until it connects with the at least one electrical contact. Once in contact with the electrical contact, an electrical charge on the third electrode can be changed and calibrated when the third electrode is in a second position. When a mechanical restorative force on the third electrode exceeds the electric force of the uniform electric field on the third electrode, the third electrode then moves to a third position.

29 Claims, 26 Drawing Sheets

(56) References Cited

U.S. PATENT DOCUMENTS

| | | | |
|---|---|---|---|
| 3,247,392 A | 4/1966 | Thelen | |
| 3,679,313 A | 7/1972 | Rosenberg | |
| 3,728,030 A | 4/1973 | Malmer, Jr. et al. | |
| 3,886,310 A | 5/1975 | Guldberg | |
| 3,955,190 A | 5/1976 | Teraishi | |
| 4,403,248 A | 9/1983 | te Velde | |
| 4,421,381 A | 12/1983 | Ueda et al. | |
| 4,441,789 A | 4/1984 | Pohlack | |
| 4,441,791 A | 4/1984 | Hornbeck | |
| 4,497,974 A | 2/1985 | Deckman et al. | |
| 4,498,953 A | 2/1985 | Cook et al. | |
| 4,560,435 A | 12/1985 | Brown et al. | |
| 4,655,554 A | 4/1987 | Armitage | |
| 4,705,361 A | 11/1987 | Frazier et al. | |
| 4,779,959 A | 10/1988 | Saunders | |
| 4,786,128 A | 11/1988 | Birnbach | |
| 4,822,993 A | 4/1989 | Dillon et al. | |
| 4,859,060 A | 8/1989 | Katagiri et al. | |
| 4,925,259 A | 5/1990 | Emmett | |
| 4,954,789 A | 9/1990 | Sampsell | |
| 4,956,619 A | 9/1990 | Hornbeck | |
| 4,973,131 A | 11/1990 | Carnes | |
| 5,022,745 A | 6/1991 | Zayhowski et al. | |
| 5,028,939 A | 7/1991 | Hornbeck et al. | |
| 5,062,689 A | 11/1991 | Koehler | |
| 5,091,983 A | 2/1992 | Lukosz | |
| 5,096,279 A | 3/1992 | Hornbeck et al. | |
| 5,170,283 A | 12/1992 | O'Brien et al. | |
| 5,315,370 A | 5/1994 | Bulow | |
| 5,381,232 A | 1/1995 | Van Wijk | |
| 5,452,138 A | 9/1995 | Mignardi et al. | |
| 5,471,341 A | 11/1995 | Warde et al. | |
| 5,526,172 A | 6/1996 | Kanack | |
| 5,544,001 A | 8/1996 | Ichiya et al. | |
| 5,550,373 A | 8/1996 | Cole et al. | |
| 5,559,290 A | 9/1996 | Suzuki et al. | |
| 5,559,358 A | 9/1996 | Burns et al. | |
| 5,561,523 A | 10/1996 | Blomberg et al. | |
| 5,597,736 A | 1/1997 | Sampsell | |
| 5,600,383 A | 2/1997 | Hornbeck | |
| 5,636,052 A | 6/1997 | Arney et al. | |
| 5,646,729 A | 7/1997 | Koskinen et al. | |
| 5,646,768 A | 7/1997 | Kaeiyama | |
| 5,661,592 A | 8/1997 | Bornstein et al. | |
| 5,665,997 A | 9/1997 | Weaver et al. | |
| 5,699,181 A | 12/1997 | Choi | |
| 5,710,656 A | 1/1998 | Goossen | |
| 5,719,068 A | 2/1998 | Suzawa et al. | |
| 5,734,177 A | 3/1998 | Sakamoto | |
| 5,771,116 A | 6/1998 | Miller et al. | |
| 5,786,927 A | 7/1998 | Greywall et al. | |
| 5,808,781 A | 9/1998 | Arney et al. | |
| 5,818,095 A | 10/1998 | Sampsell | |
| 5,825,528 A | 10/1998 | Goossen | |
| 5,838,484 A | 11/1998 | Goossen et al. | |
| 5,867,302 A | 2/1999 | Fleming | |
| 5,870,221 A | 2/1999 | Goossen | |
| 5,914,804 A | 6/1999 | Goossen | |
| 5,920,418 A | 7/1999 | Shiono et al. | |
| 5,961,848 A | 10/1999 | Jacquet et al. | |
| 6,028,689 A | 2/2000 | Michalicek et al. | |
| 6,031,653 A | 2/2000 | Wang | |
| 6,040,937 A | 3/2000 | Miles | |
| 6,046,659 A | 4/2000 | Loo et al. | |
| 6,055,090 A | 4/2000 | Miles | |
| 6,100,861 A | 8/2000 | Cohen et al. | |
| 6,124,851 A | 9/2000 | Jacobsen | |
| 6,242,932 B1 | 6/2001 | Hembree | |
| 6,262,697 B1 | 7/2001 | Stephenson | |
| 6,301,000 B1 | 10/2001 | Johnson | |
| 6,323,987 B1 | 11/2001 | Rinaudo et al. | |
| 6,327,071 B1 | 12/2001 | Kimura | |
| 6,335,235 B1 | 1/2002 | Bhekta et al. | |
| 6,351,329 B1 | 2/2002 | Greywall | |
| 6,356,378 B1 | 3/2002 | Huibers | |
| 6,377,233 B2 | 4/2002 | Colgan et al. | |
| 6,381,022 B1 | 4/2002 | Zavracky | |
| 6,384,952 B1 | 5/2002 | Clark et al. | |
| 6,400,738 B1 | 6/2002 | Tucker et al. | |
| 6,433,917 B1 * | 8/2002 | Mei et al. | 359/292 |
| 6,437,583 B1 | 8/2002 | Tartagni et al. | |
| 6,438,282 B1 | 8/2002 | Takeda et al. | |
| 6,452,712 B2 | 9/2002 | Atobe et al. | |
| 6,466,354 B1 | 10/2002 | Gudeman | |
| 6,519,073 B1 | 2/2003 | Goossen | |
| 6,556,338 B2 | 4/2003 | Han et al. | |
| 6,574,033 B1 | 6/2003 | Chui et al. | |
| 6,597,490 B2 | 7/2003 | Tayebati | |
| 6,608,268 B1 | 8/2003 | Goldsmith | |
| 6,632,698 B2 | 10/2003 | Ives | |
| 6,650,455 B2 | 11/2003 | Miles | |
| 6,657,832 B2 | 12/2003 | Williams et al. | |
| 6,661,561 B2 | 12/2003 | Fitzpatrick et al. | |
| 6,674,562 B1 | 1/2004 | Miles et al. | |
| 6,680,792 B2 | 1/2004 | Miles | |
| 6,698,295 B1 | 3/2004 | Sherrer | |
| 6,710,908 B2 | 3/2004 | Miles et al. | |
| 6,738,194 B1 | 5/2004 | Ramirez et al. | |
| 6,768,555 B2 | 7/2004 | Chen | |
| 6,794,119 B2 | 9/2004 | Miles | |
| 6,813,059 B2 | 11/2004 | Hunter et al. | |
| 6,813,060 B1 | 11/2004 | Garcia et al. | |
| 6,836,366 B1 | 12/2004 | Flanders et al. | |
| 6,841,081 B2 | 1/2005 | Chang et al. | |
| 6,844,959 B2 | 1/2005 | Huibers et al. | |
| 6,849,471 B2 | 2/2005 | Patel et al. | |
| 6,862,127 B1 | 3/2005 | Ishii | |
| 6,867,896 B2 | 3/2005 | Miles | |
| 6,870,654 B2 | 3/2005 | Lin et al. | |
| 6,882,458 B2 | 4/2005 | Lin et al. | |
| 6,882,461 B1 | 4/2005 | Tsai et al. | |
| 6,912,022 B2 | 6/2005 | Lin et al. | |
| 6,913,942 B2 | 7/2005 | Patel et al. | |
| 6,940,630 B2 | 9/2005 | Xie | |
| 6,947,200 B2 | 9/2005 | Huibers | |
| 6,952,303 B2 | 10/2005 | Lin et al. | |
| 6,958,847 B2 | 10/2005 | Lin | |
| 6,960,305 B2 | 11/2005 | Doan et al. | |
| 6,980,350 B2 | 12/2005 | Hung et al. | |
| 6,982,820 B2 | 1/2006 | Tsai | |
| 7,002,726 B2 | 2/2006 | Patel et al. | |
| 7,006,272 B2 | 2/2006 | Tsai | |
| 7,009,754 B2 | 3/2006 | Huibers | |
| 7,027,204 B2 | 4/2006 | Trisnadi et al. | |
| 7,034,981 B2 | 4/2006 | Makigaki | |
| 7,046,422 B2 | 5/2006 | Kimura et al. | |
| 7,072,093 B2 | 7/2006 | Piehl et al. | |
| 7,113,339 B2 | 9/2006 | Taguchi et al. | |
| 7,119,945 B2 | 10/2006 | Kothari et al. | |
| 7,123,216 B1 | 10/2006 | Miles | |
| 7,126,738 B2 | 10/2006 | Miles | |
| 7,130,104 B2 | 10/2006 | Cummings | |
| 7,184,195 B2 | 2/2007 | Yang | |
| 7,184,202 B2 | 2/2007 | Miles et al. | |
| 7,198,973 B2 | 4/2007 | Lin et al. | |
| 7,221,495 B2 | 5/2007 | Miles et al. | |
| 7,236,284 B2 | 6/2007 | Miles | |
| 7,245,285 B2 | 7/2007 | Yeh et al. | |
| 7,289,259 B2 | 10/2007 | Chui et al. | |
| 7,302,157 B2 | 11/2007 | Chui | |
| 7,304,784 B2 | 12/2007 | Chui et al. | |
| 7,321,456 B2 | 1/2008 | Cummings | |
| 7,321,457 B2 | 1/2008 | Heald | |
| 7,327,510 B2 | 2/2008 | Cummings et al. | |
| 7,372,613 B2 | 5/2008 | Chui et al. | |
| 7,372,619 B2 | 5/2008 | Miles | |
| 7,385,744 B2 | 6/2008 | Kogut et al. | |
| 7,385,762 B2 | 6/2008 | Cummings | |
| 7,400,488 B2 | 7/2008 | Lynch et al. | |
| 7,405,852 B2 | 7/2008 | Brosnihan et al. | |
| 7,417,746 B2 | 8/2008 | Lin et al. | |
| 7,420,725 B2 | 9/2008 | Kothari | |
| 7,436,573 B2 | 10/2008 | Doan et al. | |
| 7,459,402 B2 | 12/2008 | Doan et al. | |

(56) References Cited

U.S. PATENT DOCUMENTS

| | | | |
|---|---|---|---|
| 7,460,291 B2 | 12/2008 | Sampsell et al. |
| 7,460,292 B2 | 12/2008 | Chou |
| 7,476,327 B2 | 1/2009 | Tung et al. |
| 7,477,440 B1 | 1/2009 | Huang et al. |
| 7,492,503 B2 | 2/2009 | Chui |
| 7,508,566 B2 | 3/2009 | Feenstra et al. |
| 7,513,327 B1 | 5/2009 | Cummings |
| 7,527,995 B2 | 5/2009 | Sampsell |
| 7,532,377 B2 | 5/2009 | Miles |
| 7,535,621 B2 | 5/2009 | Chiang |
| 7,542,198 B2 | 6/2009 | Kothari |
| 7,550,794 B2 | 6/2009 | Miles et al. |
| 7,550,810 B2 | 6/2009 | Mignard et al. |
| 7,554,711 B2 | 6/2009 | Miles |
| 7,554,714 B2 | 6/2009 | Chui et al. |
| 7,561,321 B2 | 7/2009 | Heald |
| 7,564,612 B2 | 7/2009 | Chui |
| 7,566,664 B2 | 7/2009 | Yan et al. |
| 7,567,373 B2 | 7/2009 | Chui et al. |
| 7,569,488 B2 | 8/2009 | Rafanan |
| 7,576,901 B2 | 8/2009 | Chui et al. |
| 7,612,932 B2 | 11/2009 | Chui et al. |
| 7,612,933 B2 | 11/2009 | Djordjev |
| 7,629,197 B2 | 12/2009 | Luo et al. |
| 7,630,119 B2 | 12/2009 | Tung et al. |
| 7,630,121 B2 | 12/2009 | Endisch et al. |
| 7,643,199 B2 | 1/2010 | Lan |
| 7,643,202 B2 | 1/2010 | Sasagawa |
| 7,649,671 B2 | 1/2010 | Kothari et al. |
| 7,663,794 B2 | 2/2010 | Cummings |
| 7,672,035 B2 | 3/2010 | Sampsell et al. |
| 7,692,844 B2 | 4/2010 | Miles |
| 7,704,772 B2 | 4/2010 | Tung et al. |
| 7,715,079 B2 | 5/2010 | Kogut et al. |
| 7,715,085 B2 | 5/2010 | Sasagawa |
| 7,719,500 B2 | 5/2010 | Chui |
| 7,733,553 B2 | 6/2010 | Faase et al. |
| 7,738,157 B2 | 6/2010 | Miles |
| 7,742,220 B2 | 6/2010 | Kogut et al. |
| 7,746,539 B2 | 6/2010 | Sampsell |
| 7,768,690 B2 | 8/2010 | Sampsell |
| 7,773,286 B2 | 8/2010 | Mignard |
| 7,782,517 B2 | 8/2010 | Griffiths et al. |
| 7,782,523 B2 | 8/2010 | Ishii |
| 7,787,173 B2 | 8/2010 | Chui |
| 7,808,694 B2 | 10/2010 | Miles |
| 7,813,029 B2 | 10/2010 | Kothari et al. |
| 7,826,120 B2 | 11/2010 | Miles |
| 7,830,586 B2 | 11/2010 | Miles |
| 7,830,587 B2 | 11/2010 | Miles |
| 7,830,588 B2 | 11/2010 | Miles |
| 7,835,061 B2 | 11/2010 | Kogut et al. |
| 7,839,557 B2 | 11/2010 | Chui et al. |
| 7,847,999 B2 | 12/2010 | Lee et al. |
| 7,848,003 B2 | 12/2010 | Kothari et al. |
| 7,852,544 B2 | 12/2010 | Sampsell |
| 7,852,545 B2 | 12/2010 | Miles |
| 7,855,826 B2 | 12/2010 | de Groot |
| 7,859,740 B2 | 12/2010 | Tung |
| 7,872,792 B2 | 1/2011 | Miles |
| 7,884,989 B2 | 2/2011 | Gally et al. |
| 7,889,415 B2 | 2/2011 | Kothari |
| 7,889,417 B2 | 2/2011 | Sasagawa |
| 7,893,919 B2 | 2/2011 | Kothari et al. |
| 7,898,722 B2 | 3/2011 | Miles |
| 7,898,723 B2 | 3/2011 | Khazeni et al. |
| 7,924,494 B2 | 4/2011 | Tung et al. |
| 7,936,497 B2 | 5/2011 | Chui et al. |
| 7,944,599 B2 | 5/2011 | Chui et al. |
| 7,944,604 B2 | 5/2011 | Ganti et al. |
| 7,948,671 B2 | 5/2011 | Tung et al. |
| 7,952,787 B2 | 5/2011 | Tung et al. |
| 7,969,638 B2 | 6/2011 | Xu et al. |
| 7,982,700 B2 | 7/2011 | Chui et al. |
| 7,999,993 B2 | 8/2011 | Chui et al. |
| 7,999,995 B2 | 8/2011 | Hashimura et al. |
| 8,008,736 B2 | 8/2011 | Kothari |
| 8,023,167 B2 | 9/2011 | Sampsell |
| 2001/0003487 A1 | 6/2001 | Miles |
| 2001/0028503 A1 | 10/2001 | Flanders et al. |
| 2001/0043171 A1 | 11/2001 | Van Gorkom et al. |
| 2002/0054424 A1 | 5/2002 | Miles |
| 2002/0070931 A1 | 6/2002 | Ishikawa |
| 2002/0075555 A1 | 6/2002 | Miles |
| 2002/0126364 A1 | 9/2002 | Miles |
| 2002/0146200 A1 | 10/2002 | Kudrle et al. |
| 2002/0149828 A1 | 10/2002 | Miles |
| 2002/0149834 A1 | 10/2002 | Mei et al. |
| 2002/0154422 A1 | 10/2002 | Sniegowski et al. |
| 2002/0197761 A1 | 12/2002 | Patel et al. |
| 2003/0011864 A1 | 1/2003 | Flanders |
| 2003/0016428 A1 | 1/2003 | Kato et al. |
| 2003/0035196 A1 | 2/2003 | Walker |
| 2003/0043157 A1 | 3/2003 | Miles |
| 2003/0053078 A1 | 3/2003 | Missey et al. |
| 2003/0119221 A1 | 6/2003 | Cunningham et al. |
| 2003/0123125 A1 | 7/2003 | Little |
| 2003/0138669 A1 | 7/2003 | Kojima et al. |
| 2003/0173504 A1 | 9/2003 | Cole et al. |
| 2003/0202265 A1 | 10/2003 | Reboa et al. |
| 2003/0202266 A1 | 10/2003 | Ring et al. |
| 2004/0008396 A1 | 1/2004 | Stappaerts |
| 2004/0008438 A1 | 1/2004 | Sato |
| 2004/0027671 A1 | 2/2004 | Wu et al. |
| 2004/0027701 A1 | 2/2004 | Ishikawa |
| 2004/0043552 A1 | 3/2004 | Strumpell et al. |
| 2004/0066477 A1 | 4/2004 | Morimoto et al. |
| 2004/0075967 A1 | 4/2004 | Lynch et al. |
| 2004/0076802 A1 | 4/2004 | Tompkin et al. |
| 2004/0080035 A1 | 4/2004 | Delapierre |
| 2004/0100594 A1 | 5/2004 | Huibers et al. |
| 2004/0100677 A1 | 5/2004 | Huibers et al. |
| 2004/0125281 A1 | 7/2004 | Lin et al. |
| 2004/0145811 A1 | 7/2004 | Lin et al. |
| 2004/0147198 A1 | 7/2004 | Lin et al. |
| 2004/0175577 A1 | 9/2004 | Lin et al. |
| 2004/0184134 A1 | 9/2004 | Makigaki |
| 2004/0188599 A1 | 9/2004 | Viktorovitch et al. |
| 2004/0207897 A1 | 10/2004 | Lin |
| 2004/0209195 A1 | 10/2004 | Lin |
| 2004/0217264 A1 | 11/2004 | Wood et al. |
| 2004/0217919 A1 | 11/2004 | Piehl et al. |
| 2004/0218251 A1 | 11/2004 | Piehl et al. |
| 2004/0259010 A1 | 12/2004 | Kanbe |
| 2005/0002082 A1 | 1/2005 | Miles |
| 2005/0003667 A1 | 1/2005 | Lin et al. |
| 2005/0024557 A1 | 2/2005 | Lin |
| 2005/0035699 A1 | 2/2005 | Tsai |
| 2005/0036095 A1 | 2/2005 | Yeh et al. |
| 2005/0046919 A1 | 3/2005 | Taguchi et al. |
| 2005/0046922 A1 | 3/2005 | Lin et al. |
| 2005/0046948 A1 | 3/2005 | Lin |
| 2005/0068627 A1 | 3/2005 | Nakamura et al. |
| 2005/0078348 A1 | 4/2005 | Lin |
| 2005/0117190 A1 | 6/2005 | Iwauchi et al. |
| 2005/0117623 A1 | 6/2005 | Shchukin et al. |
| 2005/0128543 A1 | 6/2005 | Phillips et al. |
| 2005/0133761 A1 | 6/2005 | Thielemans |
| 2005/0168849 A1 | 8/2005 | Lin |
| 2005/0179378 A1 | 8/2005 | Oooka et al. |
| 2005/0195462 A1 | 9/2005 | Lin |
| 2005/0275930 A1 | 12/2005 | Patel et al. |
| 2006/0007517 A1 | 1/2006 | Tsai |
| 2006/0017379 A1 | 1/2006 | Su et al. |
| 2006/0017689 A1 | 1/2006 | Faase et al. |
| 2006/0024880 A1 | 2/2006 | Chui et al. |
| 2006/0038643 A1 | 2/2006 | Xu et al. |
| 2006/0066641 A1 | 3/2006 | Gally et al. |
| 2006/0066938 A1 | 3/2006 | Chui |
| 2006/0082588 A1 | 4/2006 | Mizuno et al. |
| 2006/0082863 A1 | 4/2006 | Piehl et al. |
| 2006/0132927 A1 | 6/2006 | Yoon |
| 2006/0180886 A1 | 8/2006 | Tsang |
| 2006/0220160 A1 | 10/2006 | Miles |

(56) References Cited

U.S. PATENT DOCUMENTS

| | | | |
|---|---|---|---|
| 2007/0020948 A1 | 1/2007 | Piehl et al. | |
| 2007/0077525 A1 | 4/2007 | Davis et al. | |
| 2007/0086078 A1 | 4/2007 | Hagood et al. | |
| 2007/0097694 A1 | 5/2007 | Faase et al. | |
| 2007/0138608 A1 | 6/2007 | Ikehashi | |
| 2007/0153860 A1 | 7/2007 | Chang-Hasnain et al. | |
| 2007/0216987 A1 | 9/2007 | Hagood et al. | |
| 2007/0253054 A1 | 11/2007 | Miles | |
| 2007/0279727 A1 | 12/2007 | Gandhi et al. | |
| 2007/0279729 A1* | 12/2007 | Kothari et al. | 359/291 |
| 2007/0279730 A1 | 12/2007 | Heald | |
| 2007/0285761 A1 | 12/2007 | Zhong et al. | |
| 2008/0002299 A1 | 1/2008 | Thurn | |
| 2008/0030657 A1 | 2/2008 | Wu et al. | |
| 2008/0068697 A1 | 3/2008 | Haluzak et al. | |
| 2008/0088910 A1 | 4/2008 | Miles | |
| 2008/0110855 A1 | 5/2008 | Cummings | |
| 2008/0158645 A1 | 7/2008 | Chiang | |
| 2008/0186581 A1 | 8/2008 | Bita et al. | |
| 2008/0297880 A1 | 12/2008 | Steckl et al. | |
| 2009/0021884 A1 | 1/2009 | Nakamura | |
| 2009/0078316 A1 | 3/2009 | Khazeni | |
| 2009/0086305 A1* | 4/2009 | Chui | 359/290 |
| 2009/0101192 A1 | 4/2009 | Kothari et al. | |
| 2009/0103166 A1 | 4/2009 | Khazeni et al. | |
| 2009/0122384 A1 | 5/2009 | Felnhofer et al. | |
| 2009/0126777 A1 | 5/2009 | Khazeni et al. | |
| 2009/0147343 A1* | 6/2009 | Kogut et al. | 359/254 |
| 2009/0159123 A1 | 6/2009 | Kothari | |
| 2009/0211885 A1 | 8/2009 | Steeneken et al. | |
| 2009/0213450 A1 | 8/2009 | Sampsell | |
| 2009/0213451 A1 | 8/2009 | Tung et al. | |
| 2009/0231666 A1 | 9/2009 | Gudlavalleti et al. | |
| 2009/0256218 A1 | 10/2009 | Mignard et al. | |
| 2009/0279162 A1 | 11/2009 | Chui | |
| 2009/0293955 A1 | 12/2009 | Kothari et al. | |
| 2010/0014148 A1 | 1/2010 | Djordjev | |
| 2010/0051089 A1 | 3/2010 | Khazeni et al. | |
| 2010/0053148 A1 | 3/2010 | Khazeni et al. | |
| 2010/0096006 A1 | 4/2010 | Griffiths | |
| 2010/0096011 A1 | 4/2010 | Griffiths | |
| 2010/0118382 A1 | 5/2010 | Kothari et al. | |
| 2010/0236624 A1 | 9/2010 | Khazeni et al. | |
| 2010/0238572 A1 | 9/2010 | Tao et al. | |
| 2010/0309572 A1 | 12/2010 | Mignard | |
| 2011/0019380 A1 | 1/2011 | Miles | |
| 2011/0026095 A1 | 2/2011 | Kothari et al. | |
| 2011/0026096 A1 | 2/2011 | Miles | |
| 2011/0038027 A1 | 2/2011 | Miles | |
| 2011/0044496 A1 | 2/2011 | Chui et al. | |
| 2011/0063712 A1 | 3/2011 | Kothari et al. | |
| 2011/0069371 A1 | 3/2011 | Kothari et al. | |
| 2011/0075241 A1 | 3/2011 | Mienko et al. | |
| 2011/0075245 A1 | 3/2011 | Hashimura et al. | |
| 2011/0080632 A1 | 4/2011 | Miles | |
| 2011/0090554 A1 | 4/2011 | Tung | |
| 2011/0116156 A1 | 5/2011 | Kothari | |
| 2011/0134505 A1 | 6/2011 | Sasagawa | |
| 2011/0169724 A1 | 7/2011 | Tao et al. | |
| 2011/0170166 A1 | 7/2011 | Miles | |
| 2011/0170167 A1 | 7/2011 | Miles | |
| 2011/0170168 A1 | 7/2011 | Endisch et al. | |
| 2011/0188109 A1 | 8/2011 | Chui et al. | |
| 2011/0188110 A1 | 8/2011 | Miles | |
| 2011/0194169 A1 | 8/2011 | Ganti et al. | |
| 2012/0044562 A1 | 2/2012 | Hong et al. | |

FOREIGN PATENT DOCUMENTS

| | | |
|---|---|---|
| EP | 0 668 490 | 8/1995 |
| EP | 0 695 959 | 2/1996 |
| EP | 0 879 991 | 11/1998 |
| EP | 0 969 306 | 1/2000 |
| EP | 0 986 077 | 3/2000 |
| EP | 1 122 577 | 8/2001 |
| EP | 1 205 782 | 5/2002 |
| EP | 1 227 346 | 7/2002 |
| EP | 1 275 997 | 1/2003 |
| EP | 1 403 212 | 3/2004 |
| EP | 1 473 581 | 11/2004 |
| EP | 1 928 028 | 6/2008 |
| JP | 56-088111 | 7/1981 |
| JP | 5-49238 | 2/1993 |
| JP | 5-281479 | 10/1993 |
| JP | 08-051230 | 2/1996 |
| JP | 11-211999 | 8/1999 |
| JP | 2000 147262 | 5/2000 |
| JP | 2001-221913 | 8/2001 |
| JP | 2001 249283 | 9/2001 |
| JP | 2002-062490 | 2/2002 |
| JP | 2002-221678 | 8/2002 |
| JP | 2003-340795 | 2/2003 |
| JP | 2003 177336 | 6/2003 |
| JP | 2004-012642 | 1/2004 |
| JP | 2004-212638 | 7/2004 |
| JP | 2004-212680 | 7/2004 |
| JP | 2005 279831 | 10/2005 |
| JP | 2005-308871 | 11/2005 |
| JP | 2006099078 A | 4/2006 |
| JP | 2007 027150 | 2/2007 |
| JP | 2012530276 A | 11/2012 |
| WO | WO 98/14804 | 4/1998 |
| WO | WO 98/43129 | 10/1998 |
| WO | WO 01/53113 | 7/2001 |
| WO | WO 02/24590 | 3/2002 |
| WO | WO 02/086582 | 10/2002 |
| WO | WO 03/105198 | 12/2003 |
| WO | WO 2006/035698 | 4/2006 |
| WO | WO 2006/036386 | 4/2006 |
| WO | WO 2006/132941 | 12/2006 |
| WO | WO 2007/036422 | 4/2007 |
| WO | WO 2007/045875 | 4/2007 |
| WO | WO 2007/053438 | 5/2007 |
| WO | WO 2007/061406 | 5/2007 |
| WO | WO 2007/072998 | 6/2007 |
| WO | WO 2008/062363 | 5/2008 |

OTHER PUBLICATIONS

Brosnihan et al., Jun. 2003, Optical IMEMS—A fabrication process for MEMS optical switches with integrated on-chip electronic, Transducers, Solid-State Sensors, Actuators and Microsystems, 12$^{th}$ International Conference 2003, 2(8-12):1638-1642.

Cacharelis et al., 1997, A Reflective-mode PDLC Light Valve Display Technology, Proceedings of European Solid State Device Research Conference (ESSDERC), pp. 596-599.

Conner, Hybrid Color Display Using Optical Interference Filter Array, SID Digest, pp. 577-580 (1993).

Dokmeci et al., Dec. 2004, Two-axis single-crystal silicon micromirror arrays, Journal of Microelectromechanical Systems, 13(6):1006-1017.

Feenstra et al., Electrowetting displays, Liquavista BV, 16 pp., Jan. 2006.

Hohlfeld et al., Jun. 2003, Micro-machined tunable optical filters with optimized band-pass spectrum, 12th International Conference on Transducers, Solid-State Sensors, Actuators and Microsystems, 2:1494-1497.

Jerman et al., A Miniature Fabry-Perot Interferometer with a Corrugated Silicon Diaphragm Support, (1988).

Jerman et al., Miniature Fabry-Perot Interferometers Micromachined in Silicon for Use in Optical Fiber WDM Systems, Transducers, San Francisco, Jun. 24-27, 1991, Proceedings on the Int'l. Conf. on Solid State Sensors and Actuators, Jun. 24, 1991, pp. 372-375.

Kowarz et al., Conformal grating electromechanical system (GEMS) for high-speed digital light modulation, Proceedings of the IEEEE 15th. Annual International Conference on Micro Electro Mechanical Systems, MEMS 2002, pp. 568-573.

Lezec, Submicrometer dimple array based interference color field displays and sensors, Nano Lett. 7(2):329-333, Dec. 23, 2006.

(56) References Cited

OTHER PUBLICATIONS

Londergan et al., Advanced processes for MEMS-based displays, Proceedings of the Asia Display 2007, SID, 1:107-112.

Longhurst, 1963, Chapter IX: Multiple Beam Interferometry, in Geometrical and Physical Optics, pp. 153-157.

Maier et al., 1996, 1.3" active matrix liquid crystal spatial light modulator with 508 dpi resolution, SPIE vol. 2754, pp. 171-179.

Mehregany et al., 1996, MEMS applications in optical systems, IEEE/LEOS 1996 Summer Topical Meetings, pp. 75-76.

Miles et al, Oct. 21, 1997, A MEMS based interferometric modulator (IMOD) for display applications, Proceedings of Sensors Expo, pp. 281-284.

Miles, A New Reflective FPD Technology Using Interferometric Modulation, Journal of the SID, 5/4, 1997.

Miles, Interferometric modulation: MOEMS as an enabling technology for high performance reflective displays, Proceedings of SPIE, 4985:131-139, 2003.

Nakagawa et al., Feb. 1, 2002, Wide-field-of-view narrow-band spectral filters based on photonic crystal nanocavities, Optics Letters, 27(3):191-193.

Nieminen et al., 2004, Design of a temperature-stable RF MEM capacitor, IEEE Journal of Microelectromechanical Systems, 13(5):705-714.

Pape et al., Characteristics of the deformable mirror device for optical information processing, Optical Engineering, 22(6):676-681, Nov.-Dec. 1983.

Qualcomm MEMS Technologies, Inc., May 2008, Interferometric Modulator (IMOD) Technology Overview, White Paper, 14 pp.

Taii et al., A transparent sheet display by plastic MEMS, Journal of the SID 14(8):735-741, 2006.

Tolansky, 1948, Chapter II: Multiple-Beam Interference, in Multiple-bean Interferometry of Surfaces and Films, Oxford at the Clarendon Press, pp. 8-11.

Wang, Jun. 29-Jul. 1, 2002, Design and fabrication of a novel two-dimension MEMS-based tunable capacitor, IEEE 2002 International Conference on Communications, Circuits and Systems and West Sino Expositions, 2:1766-1769.

Invitation to Pay Additional Fees dated Oct. 27, 2011 in PCT/US11/047790.

ISR and WO dated Jan. 18, 2012 in PCT/US11/047790.

Wang, et al., "Flexible Circuit-Based RF MEMS Switches," Proceedings of 2001 ASME International Mechanical Engineering Congress and Exposition, Nov. 11-16, 2001 pp. 757-762.

* cited by examiner

Common Voltages

|  | $VC_{ADD\_H}$ | $VC_{HOLD\_H}$ | $VC_{REL}$ | $VC_{HOLD\_L}$ | $VC_{ADD\_L}$ |
|---|---|---|---|---|---|
| $VS_H$ | Stable | Stable | Relax | Stable | Actuate |
| $VS_L$ | Actuate | Stable | Relax | Stable | Stable |

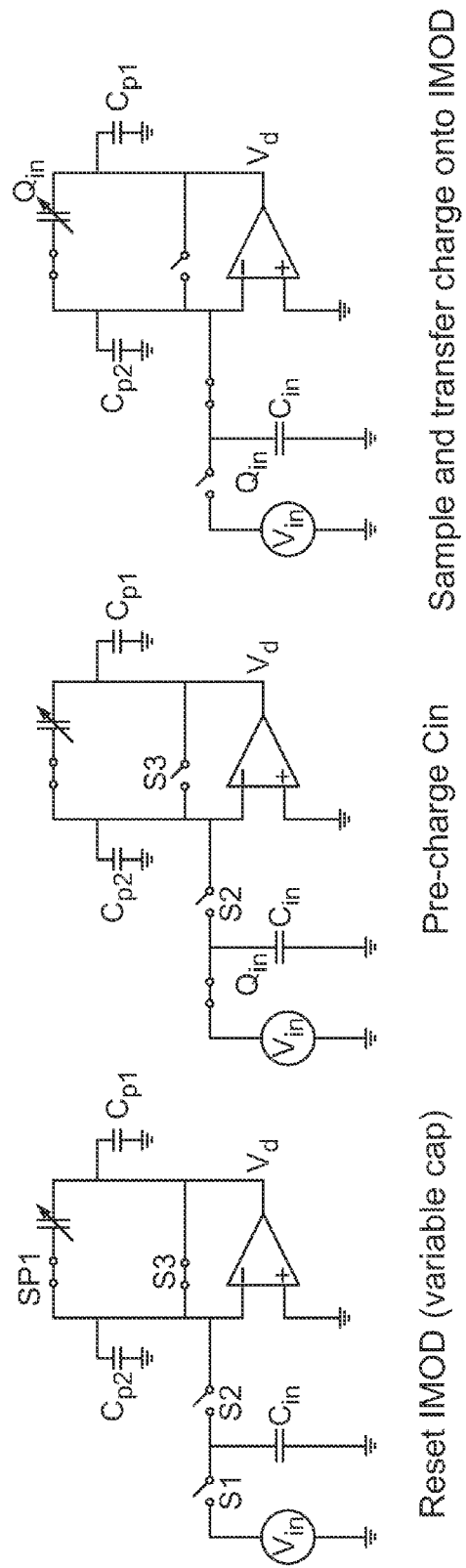

ACTUATION AND CALIBRATION OF CHARGE NEUTRAL ELECTRODE OF A DISPLAY DEVICE

CROSS-REFERENCE TO RELATED APPLICATIONS

This disclosure claims priority to U.S. Provisional Patent Application No. 61/374,569, filed Aug. 17, 2010, entitled "ELECTROSTATIC ACTUATION AND CALIBRATION OF CHARGE NEUTRAL ELECTRODE," and assigned to the assignee hereof. The disclosure of the prior application is considered part of, and is incorporated by reference in, this disclosure. This application is related to U.S. patent application Ser. No. 13/211,165, entitled "Actuation and Calibration of Charge Neutral Electrode," filed Aug. 16, 2011, which is assigned to the assignee of the present invention.

TECHNICAL FIELD

This disclosure relates to actuation of electrodes in electromechanical systems.

DESCRIPTION OF THE RELATED TECHNOLOGY

Electromechanical systems (EMS) include devices having electrical and mechanical elements, actuators, transducers, sensors, optical components (e.g., mirrors) and electronics. Electromechanical systems can be manufactured at a variety of scales including, but not limited to, microscales and nanoscales. For example, microelectromechanical systems (MEMS) devices can include structures having sizes ranging from about a micron to hundreds of microns or more. Nanoelectromechanical systems (NEMS) devices can include structures having sizes smaller than a micron including, for example, sizes smaller than several hundred nanometers. Electromechanical elements may be created using deposition, etching, lithography, and/or other micromachining processes that etch away parts of substrates and/or deposited material layers, or that add layers to form electrical and electromechanical devices.

One type of electromechanical systems device is called an interferometric modulator (IMOD). As used herein, the term interferometric modulator or interferometric light modulator refers to a device that selectively absorbs and/or reflects light using the principles of optical interference. In some implementations, an interferometric modulator may include a pair of conductive plates, one or both of which may be transparent and/or reflective, wholly or in part, and capable of relative motion upon application of an appropriate electrical signal. In an implementation, one plate may include a stationary layer deposited on a substrate and the other plate may include a reflective membrane separated from the stationary layer by an air gap. The position of one plate in relation to another can change the optical interference of light incident on the interferometric modulator. Interferometric modulator devices have a wide range of applications, and are anticipated to be used in improving existing products and creating new products, especially those with display capabilities.

Some interferometric modulators include bi-stable display elements having two states: a relaxed state and an actuated state. In contrast, analog interferometric modulators can reflect a range of colors. For example, in one implementation of an analog interferometric modulator, a single interferometric modulator can reflect a red color, a green color, a blue color, a black color, and a white color. In some implementations, an analog modulator can reflect any color within a given range of wavelengths.

SUMMARY

The systems, methods and devices of the disclosure each have several innovative aspects, no single one of which is solely responsible for the desirable attributes disclosed herein.

One innovative aspect of the subject matter described in this disclosure can be implemented in a device for modulating light that includes a display element. The display element includes a first electrode and a second electrode spaced apart from the first electrode by a gap. The display element also includes a movable third electrode disposed between the first electrode and the second electrode and at least one electrical contact. The first electrode and the second electrode are configured to produce an electric field therebetween capable of moving the movable third electrode when the movable third electrode is electrically isolated and charge neutral when a voltage is applied across the first electrode and the second electrode. The third electrode is configured to move within the gap between an electrically isolated first position, an electrically connected second position, and an electrically isolated third position. The third electrode is in electrical communication with the at least one electrical contact at the electrically connected second position. The electrical contact is configured to change an electrical charge on the third electrode when the third electrode is in the electrically connected second position. The third electrode is also configured to move to the third position after the electrical charge on the third electrode has been changed.

Another implementation is a device for modulating light including a display element. The device includes means for producing a non-uniform electric field. The device also includes a movable electrode disposed between a first electrode and a second electrode forming a gap therebetween, the movable electrode being configured to move within the gap between an electrically isolated first position, a second position, and an electrically isolated third position. The device also includes means for changing an electrical charge on the movable electrode when the movable electrode is in the second position.

Yet another implementation includes a method of actuating a device for modulating light. The method includes applying a charging actuation voltage across a first electrode and a second electrode to produce an electric field in a gap between the first electrode and second electrode in order to move an electrically isolated, charge-neutral third electrode, positioned in the gap, towards the first electrode from a first position to a second position. The method also includes electrically connecting the third electrode with an electrical contact when the third electrode is in the second position. The method further includes changing an electrical charge on the third electrode when the third electrode is in the second position until a mechanical restorative force on the third electrode exceeds an electric force of the electric field on the third electrode.

Another implementation is a method of calibrating an analog interferometric modulator in a display. The method includes applying a calibration voltage across a first electrode and a second electrode to produce an electric field in a gap between the first electrode and the second electrode to move a third electrode, positioned in the gap, towards the first electrode from an electrically isolated first position to an electrically connected second position, the third electrode being subject to a mechanical restorative force. The method further includes electrically connecting the third electrode to one or more conductive posts electrically connected to the first electrode, to change an electric charge on the third electrode when the third electrode is in the second position, until a mechanical restorative force on the third electrode exceeds an electric field force on the third electrode such that the third electrode moves to an electrically isolated third position, the third position being farther away from the first electrode than the second position. In some implementations, the first electrode includes an upper electrode and a complementary electrode aligned laterally relative to the upper electrode and the method also includes electrically connecting the complementary electrode to the upper electrode to form a compound electrode. The calibration voltage can then be applied across the compound electrode and the second electrode.

Yet another implementation is device for modulating light that includes a display element. The display element includes a first electrode and a second electrode spaced apart from the first electrode by a gap, the first electrode and the second electrode configured to produce a non-uniform electric field therebetween when an actuation voltage is applied across the first electrode and the second electrode during an actuation procedure. The display element further includes a complementary electrode aligned laterally relative to the first electrode, the complementary electrode configured to be electrically isolated from the first electrode during the actuation procedure and electrically connected to the first electrode to form a compound electrode during a calibration procedure, the compound electrode and the second electrode configured to produce a uniform electric field therebetween when a calibration voltage is applied across the compound electrode and the second electrode during the calibration procedure. The display element also includes at least one electrical contact disposed on the complementary electrode and a movable third electrode disposed between the first electrode and the second electrode, the third electrode being configured to move within the gap between an electrically isolated first position, a second position in electrical communication with the at least one electrical contact, and an electrically isolated third position. The electrical contact is configured to change an electrical charge on the third electrode when the third electrode is in the second position, and the third electrode is configured to move to the third position after the electrical charge on the third electrode has been changed.

Still a further implementation includes a device for modulating light that includes a display element. The display element includes means for producing a non-uniform electric field and means for producing a uniform electric field. The display element further includes a movable electrode disposed between a first electrode and a second electrode forming a gap therebetween, the movable electrode being configured to move within the gap between an electrically isolated first position, a second position, and an electrically isolated third position. The display element also includes means for changing an electrical charge on the movable electrode when the movable electrode is in the second position. In some implementations, the means for producing a non-uniform electric field includes the first electrode and the second electrode. The first electrode and the second electrode have different surface areas. In some implementations, the means for producing a uniform electric field includes the first electrode and the second electrode, where the first electrode includes an upper electrode electrically connected to a complementary electrode aligned laterally relative to the upper electrode.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

FIG. 11B shows an example of a schematic of charge pump circuitry to place a charge on an electrode of an interferometric modulator.

Like reference numbers and designations in the various drawings indicate like elements.

DETAILED DESCRIPTION

Figure 1:
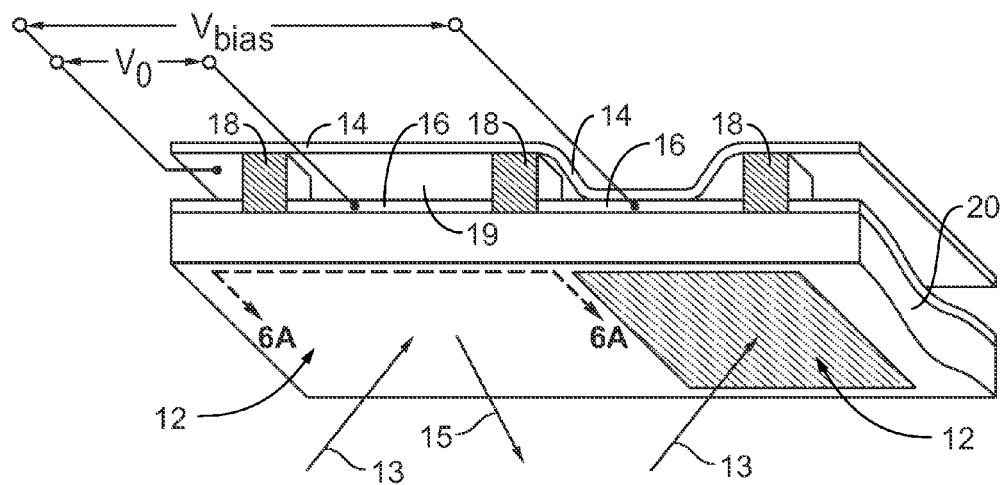
FIG. 1 shows an example of an isometric view depicting two adjacent pixels in a series of pixels of an interferometric modulator (IMOD) display device.

The following detailed description is directed to certain implementations for the purposes of describing the innovative aspects. However, the teachings herein can be applied in a multitude of different ways. The described implementations may be implemented in any device that is configured to display an image, whether in motion (e.g., video) or stationary (e.g., still image), and whether textual, graphical or pictorial. More particularly, it is contemplated that the implementations may be implemented in or associated with a variety of electronic devices such as, but not limited to, mobile telephones, multimedia Internet enabled cellular telephones, mobile television receivers, wireless devices, smartphones, bluetooth devices, personal data assistants (PDAs), wireless electronic mail receivers, hand-held or portable computers, netbooks, notebooks, smartbooks, tablets, printers, copiers, scanners, facsimile devices, GPS receivers/navigators, cameras, MP3 players, camcorders, game consoles, wrist watches, clocks, calculators, television monitors, flat panel displays, electronic reading devices (e-readers), computer monitors, auto displays (e.g., odometer display, etc.), cockpit controls and/or displays, camera view displays (e.g., display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (for example electromechanical systems (EMS), MEMS and non-MEMS applications), aesthetic structures (for example, display of images on a piece of jewelry) and a variety of electromechanical systems devices. The teachings herein also can be used in non-display applications such as, but not limited to, electronic switching devices, radio frequency filters, sensors, accelerometers, gyroscopes, motion-sensing devices, magnetometers, inertial components for consumer electronics, parts of consumer electronics products, varactors, liquid crystal devices, electrophoretic devices, drive schemes, manufacturing processes, and electronic test equipment. Thus, the teachings are not intended to be limited to the implementations depicted solely in the Figures, but instead have wide applicability as will be readily apparent to a person having ordinary skill in the art.

Methods and devices to actuate, charge, and calibrate movable electrodes in analog interferometric modulators are described herein. For example, various methods and devices are provided to actuate a charge-neutral, electrically isolated electrode ("middle electrode") disposed in a gap between two charged electrodes such that the charge-neutral electrode is actuated and moves toward one of the charged electrodes. In one implementation, at least two charged electrodes are configured to produce an electric field therebetween capable of moving the electrically isolated, charge neutral middle electrode when a voltage V is applied across the charged electrodes. In such implementations, there can be at least two charged electrodes having different dimensions and/or surface areas. The middle electrode can be disposed between such electrodes. In another implementation, the charge-neutral, electrically isolated middle electrode is actuated by applying an electric field between charged electrodes having different surface areas, where a complementary electrode is aligned laterally relative to one of the charged electrodes.

Methods and devices to provide charge onto movable electrodes in analog interferometric modulators are also described herein. For example, various methods and devices can provide a charge to a charge-neutral, electrically isolated middle electrode after it has been actuated or moved toward a charged electrode. In one implementation, charge is placed on the middle electrode when the middle electrode moves toward a charged electrode and makes direct electrical contact with conductive posts on the charged electrode. The middle electrode develops a net charge until the electric force acting on the middle electrode is overcome by the opposing mechanical spring force acting on the middle electrode. The middle electrode then moves away from the charged electrode, breaking electrical contact and electrically isolating the charge that has been placed on the middle electrode. In another implementation, the middle electrode is inductively charged when the middle electrode moves toward a charged electrode and electrically contacts conductive posts on a complementary electrode aligned laterally relative to the charged electrode, where the complementary electrode is electrically isolated from the charged electrode and connected to electrical ground.

Methods and devices to calibrate the charge that is provided to a movable electrode in an analog interferometric modulator are also described herein. In one implementation using a "switch" configuration, one or more switches are closed to electrically connect a complementary electrode and a charged electrode to form a compound electrode. A calibration voltage is applied between the compound electrode and the opposing charged electrode, causing the charged middle electrode to move toward the compound electrode and to change its charge by, for example, electrically contacting at least one conductive structure (for example conductive posts) on the compound electrode. In one implementation, the electrical contact causes charge on the middle electrode to change until the electric force acting on the middle electrode is overcome by the opposing mechanical spring force acting on the middle electrode. The middle electrode then moves away from the compound electrode, breaking electrical contact and electrically isolating the charge that remains onto the middle electrode. Upon release, the amount of charge on the middle electrode is related to the mechanical spring force acting on the middle electrode. The structure that holds the middle electrode and provides the mechanical spring force can be, for example, springs of various configurations or the structure of the middle electrode itself that opposes deformation of the electrode. For clarity of disclosure, structure that provides a mechanical spring force on the middle electrode is referred to herein as a "spring" whether such force is provided by the electrode material itself or a structure connected to the middle electrode.

Another implementation uses a "switchless" configuration to calibrate charge that has been placed on a movable electrode. A calibration voltage is applied between two charged electrodes having different surface areas. The charged middle electrode moves toward the charged electrode having the smaller surface area and electrically contacts conductive posts electrically connected to the charged electrode. The electrical contact causes charge on the middle electrode to change until the electric force acting on the middle electrode is overcome by the opposing mechanical spring force acting on the middle electrode. The middle electrode then moves away from the charged electrode, breaking electrical contact and electrically isolating the charge that remains on the middle electrode. Upon release, the amount of charge on the middle electrode is related to the stiffness of the springs holding the middle electrode.

Particular implementations of the subject matter described in this disclosure can be implemented to realize one or more of the following potential advantages. A three-terminal electromechanical device (for example, an interferometric modulator) can include a movable middle electrode disposed in a gap between two electrodes, for example, an upper electrode and a lower electrode. Implementations of the devices and methods described herein can move an electrically isolated middle electrode having net zero charge, so that the middle electrode contacts the upper (or lower) electrode. The middle electrode can become charged through this contact, solving drawbacks associated with typical three-terminal devices. Devices and methods are disclosed to charge the middle electrode once it contacts the upper (or lower) electrode. Once charge is provided to the middle electrode, the middle electrode can then be released from the contacting electrode, which isolates charge on the electrode. The charge on the middle electrode can then be calibrated to account for the particular mechanical spring force acting on the middle electrode. Methods and systems for calibrating a charge placed onto the middle electrode are described, for example, with reference to FIGS. 31-33 and 39-41. Calibrating each of the middle electrodes across an array of three-terminal devices with a desired amount of charge can allow for movement of all of the middle electrodes to the same location upon application of the same voltage across all of the devices. Following calibration, the plurality of calibrated modulators in the array can be in an operationally ready state. Additionally, the actuation, charging, and calibration procedures described herein can be repeated where useful and adjusted to account for variances in the rate of charge leakage from the middle electrodes over the lifetime of the device.

An example of a suitable EMS or MEMS device, to which the described implementations may apply, is a reflective display device. Reflective display devices can incorporate interferometric modulators (IMODs) to selectively absorb and/or reflect light incident thereon using principles of optical interference. IMODs can include an absorber, a reflector that is movable with respect to the absorber, and an optical resonant cavity defined between the absorber and the reflector. The reflector can be moved to two or more different positions, which can change the size of the optical resonant cavity and thereby affect the reflectance of the interferometric modulator. The reflectance spectrums of IMODs can create fairly broad spectral bands which can be shifted across the visible wavelengths to generate different colors. The position of the spectral band can be adjusted by changing the thickness of the optical resonant cavity, i.e., by changing the position of the reflector.

FIG. 1 shows an example of an isometric view depicting two adjacent pixels in a series of pixels of an interferometric modulator (IMOD) display device. The IMOD display device includes one or more interferometric MEMS display elements. In these devices, the pixels of the MEMS display elements can be in either a bright or dark state. In the bright ("relaxed," "open" or "on") state, the display element reflects a large portion of incident visible light, e.g., to a user. Conversely, in the dark ("actuated," "closed" or "off") state, the display element reflects little incident visible light. In some implementations, the light reflectance properties of the on and off states may be reversed. MEMS pixels can be configured to reflect predominantly at particular wavelengths allowing for a color display in addition to black and white.

The IMOD display device can include a row/column array of IMODs. Each IMOD can include a pair of reflective layers, i.e., a movable reflective layer and a fixed partially reflective layer, positioned at a variable and controllable distance from each other to form an air gap (also referred to as an optical gap or cavity). The movable reflective layer may be moved between at least two positions. In a first position, i.e., a relaxed position, the movable reflective layer can be positioned at a relatively large distance from the fixed partially reflective layer. In a second position, i.e., an actuated position, the movable reflective layer can be positioned more closely to the partially reflective layer. Incident light that reflects from the two layers can interfere constructively or destructively depending on the position of the movable reflective layer, producing either an overall reflective or non-reflective state for each pixel. In some implementations, the IMOD may be in a reflective state when unactuated, reflecting light within the visible spectrum, and may be in a dark state when unactuated, absorbing and/or destructively interfering light within the visible range. In some other implementations, however, an IMOD may be in a dark state when unactuated, and in a reflective state when actuated. In some implementations, the introduction of an applied voltage can drive the pixels to change states. In some other implementations, an applied charge can drive the pixels to change states.

The depicted portion of the pixel array in FIG. 1 includes two adjacent interferometric modulators 12. In the IMOD 12 on the left (as illustrated), a movable reflective layer 14 is illustrated in a relaxed position at a predetermined distance from an optical stack 16, which includes a partially reflective layer. The voltage $V_0$ applied across the IMOD 12 on the left is insufficient to cause actuation of the movable reflective layer 14. In the IMOD 12 on the right, the movable reflective layer 14 is illustrated in an actuated position near or adjacent the optical stack 16. The voltage $V_{bias}$ applied across the IMOD 12 on the right is sufficient to maintain the movable reflective layer 14 in the actuated position.

In FIG. 1, the reflective properties of pixels 12 are generally illustrated with arrows 13 indicating light incident upon the pixels 12, and light 15 reflecting from the pixel 12 on the left. Although not illustrated in detail, it will be understood by a person having ordinary skill in the art that most of the light 13 incident upon the pixels 12 will be transmitted through the transparent substrate 20, toward the optical stack 16. A portion of the light incident upon the optical stack 16 will be transmitted through the partially reflective layer of the optical stack 16, and a portion will be reflected back through the transparent substrate 20. The portion of light 13 that is transmitted through the optical stack 16 will be reflected at the movable reflective layer 14, back toward (and through) the transparent substrate 20. Interference (constructive or destructive) between the light reflected from the partially reflective layer of the optical stack 16 and the light reflected from the movable reflective layer 14 will determine the wavelength(s) of light 15 reflected from the pixel 12.

The optical stack 16 can include a single layer or several layers. The layer(s) can include one or more of an electrode layer, a partially reflective and partially transmissive layer and a transparent dielectric layer. In some implementations, the optical stack 16 is electrically conductive, partially transparent and partially reflective, and may be fabricated, for example, by depositing one or more of the above layers onto a transparent substrate 20. The electrode layer can be formed from a variety of materials, for example various metals, for example indium tin oxide (ITO). The partially reflective layer can be formed from a variety of materials that are partially reflective, for example various metals, e.g., chromium (Cr), semiconductors, and dielectrics. The partially reflective layer can be formed of one or more layers of materials, and each of the layers can be formed of a single material or a combination of materials. In some implementations, the optical stack 16 can include a single semi-transparent thickness of metal or semiconductor which serves as both an optical absorber and electrical conductor, while different, electrically more conductive layers or portions (e.g., of the optical stack 16 or of other structures of the IMOD) can serve to bus signals between IMOD pixels. The optical stack 16 also can include one or more insulating or dielectric layers covering one or more conductive layers or an electrically conductive/optically absorptive layer.

In some implementations, the layer(s) of the optical stack 16 can be patterned into parallel strips, and may form row electrodes in a display device as described further below. As will be understood by one having ordinary skill in the art, the term "patterned" is used herein to refer to masking as well as etching processes. In some implementations, a highly conductive and reflective material, for example aluminum (Al), may be used for the movable reflective layer 14, and these strips may form column electrodes in a display device. The movable reflective layer 14 may be formed as a series of parallel strips of a deposited metal layer or layers (orthogonal to the row electrodes of the optical stack 16) to form columns deposited on top of posts 18 and an intervening sacrificial material deposited between the posts 18. When the sacrificial material is etched away, a defined gap 19, or optical cavity, can be formed between the movable reflective layer 14 and the optical stack 16. In some implementations, the spacing between posts 18 may be approximately 1-1000 um, while the gap 19 may be less than 10,000 Angstroms (Å).

In some implementations, each pixel of the IMOD, whether in the actuated or relaxed state, is essentially a capacitor formed by the fixed and moving reflective layers. When no voltage is applied, the movable reflective layer 14 remains in a mechanically relaxed state, as illustrated by the pixel 12 on the left in FIG. 1, with the gap 19 between the movable reflective layer 14 and optical stack 16. However, when a potential difference, a voltage, is applied to at least one of a selected row and column, the capacitor formed at the intersection of the row and column electrodes at the corresponding pixel becomes charged, and electrostatic forces pull the electrodes together. If the applied voltage exceeds a threshold, the movable reflective layer 14 can deform and move near or against the optical stack 16. A dielectric layer (not shown) within the optical stack 16 may prevent shorting and control the separation distance between the layers 14 and 16, as illustrated by the actuated pixel 12 on the right in FIG. 1. The behavior is the same regardless of the polarity of the applied potential difference. Though a series of pixels in an array may be referred to in some instances as "rows" or "columns," a person having ordinary skill in the art will readily understand that referring to one direction as a "row" and another as a "column" is arbitrary. Restated, in some orientations, the rows can be considered columns, and the columns considered to be rows. Furthermore, the display elements may be evenly arranged in orthogonal rows and columns (an "array"), or arranged in non-linear configurations, for example, having certain positional offsets with respect to one another (a "mosaic"). The terms "array" and "mosaic" may refer to either configuration. Thus, although the display is referred to as including an "array" or "mosaic," the elements themselves need not be arranged orthogonally to one another, or disposed in an even distribution, in any instance, but may include arrangements having asymmetric shapes and unevenly distributed elements.

Figure 2:
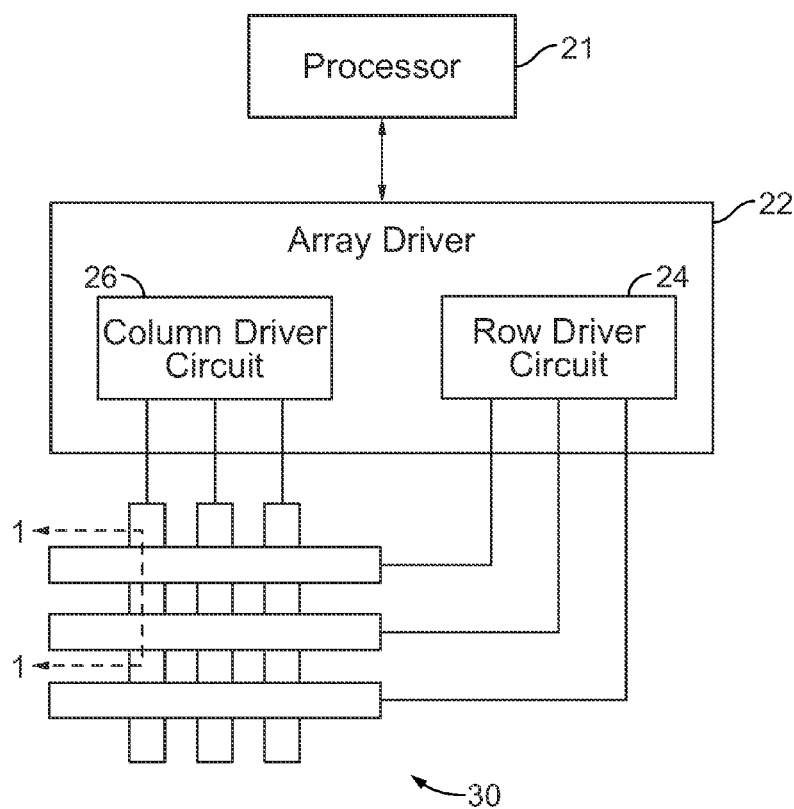
FIG. 2 shows an example of a system block diagram illustrating an electronic device incorporating a 3×3 interferometric modulator display.

FIG. 2 shows an example of a system block diagram illustrating an electronic device incorporating a 3×3 interferometric modulator display. The electronic device includes a processor 21 that may be configured to execute one or more software modules. In addition to executing an operating system, the processor 21 may be configured to execute one or more software applications, including a web browser, a telephone application, an email program, or any other software application.

The processor 21 can be configured to communicate with an array driver 22. The array driver 22 can include a row driver circuit 24 and a column driver circuit 26 that provide signals to, e.g., a display array or panel 30. The cross section of the IMOD display device illustrated in FIG. 1 is shown by the lines 1-1 in FIG. 2. Although FIG. 2 illustrates a 3×3 array of IMODs for the sake of clarity, the display array 30 may contain a very large number of IMODs, and may have a different number of IMODs in rows than in columns, and vice versa.

Figures 3, 4:
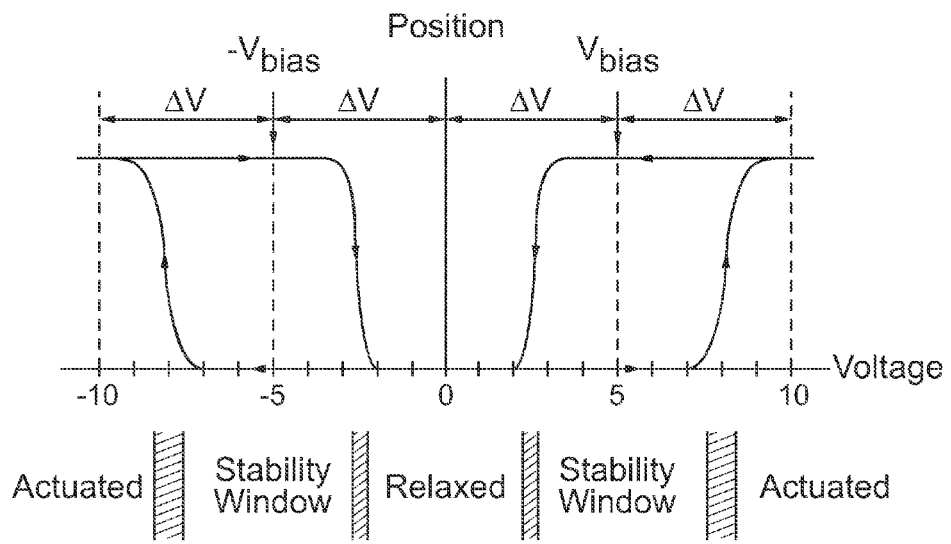
FIG. 3 shows an example of a diagram illustrating movable reflective layer position versus applied voltage for the interferometric modulator of FIG. 1.
FIG. 4 shows an example of a table illustrating various states of an interferometric modulator when various common and segment voltages are applied.

FIG. 3 shows an example of a diagram illustrating movable reflective layer position versus applied voltage for the interferometric modulator of FIG. 1. For MEMS interferometric modulators, the row/column (i.e., common/segment) write procedure may take advantage of a hysteresis property of these devices as illustrated in FIG. 3. An interferometric modulator may use, in one example implementation, about a 10-volt potential difference to cause the movable reflective layer, or mirror, to change from the relaxed state to the actuated state. When the voltage is reduced from that value, the movable reflective layer maintains its state as the voltage drops back below, in this example, 10 volts, however, the movable reflective layer does not relax completely until the voltage drops below 2 volts. Thus, a range of voltage, approximately 3 to 7 volts, in this example, as shown in FIG. 3, exists where there is a window of applied voltage within which the device is stable in either the relaxed or actuated state. This is referred to herein as the "hysteresis window" or "stability window." For a display array 30 having the hysteresis characteristics of FIG. 3, the row/column write procedure can be designed to address one or more rows at a time, such that during the addressing of a given row, pixels in the addressed row that are to be actuated are exposed to a voltage difference of about, in this example, 10 volts, and pixels that are to be relaxed are exposed to a voltage difference of near zero volts. After addressing, the pixels can be exposed to a steady state or bias voltage difference of approximately 5 volts in this example, such that they remain in the previous strobing state. In this example, after being addressed, each pixel sees a potential difference within the "stability window" of about 3-7 volts. This hysteresis property feature enables the pixel design, for example that illustrated in FIG. 1, to remain stable in either an actuated or relaxed pre-existing state under the same applied voltage conditions. Since each IMOD pixel, whether in the actuated or relaxed state, is essentially a capacitor formed by the fixed and moving reflective layers, this stable state can be held at a steady voltage within the hysteresis window without substantially consuming or losing power. Moreover, essentially little or no current flows into the IMOD pixel if the applied voltage potential remains substantially fixed.

In some implementations, a frame of an image may be created by applying data signals in the form of "segment" voltages along the set of column electrodes, in accordance with the desired change (if any) to the state of the pixels in a given row. Each row of the array can be addressed in turn, such that the frame is written one row at a time. To write the desired data to the pixels in a first row, segment voltages corresponding to the desired state of the pixels in the first row can be applied on the column electrodes, and a first row pulse in the form of a specific "common" voltage or signal can be applied to the first row electrode. The set of segment voltages can then be changed to correspond to the desired change (if any) to the state of the pixels in the second row, and a second common voltage can be applied to the second row electrode. In some implementations, the pixels in the first row are unaffected by the change in the segment voltages applied along the column electrodes, and remain in the state they were set to during the first common voltage row pulse. This process may be repeated for the entire series of rows, or alternatively, columns, in a sequential fashion to produce the image frame. The frames can be refreshed and/or updated with new image data by continually repeating this process at some desired number of frames per second.

The combination of segment and common signals applied across each pixel (that is, the potential difference across each pixel) determines the resulting state of each pixel. FIG. 4 shows an example of a table illustrating various states of an interferometric modulator when various common and segment voltages are applied. As will be understood by one having ordinary skill in the art, the "segment" voltages can be applied to either the column electrodes or the row electrodes, and the "common" voltages can be applied to the other of the column electrodes or the row electrodes.

As illustrated in FIG. 4 (as well as in the timing diagram shown in FIG. 5B), when a release voltage $VC_{REL}$ is applied along a common line, all interferometric modulator elements along the common line will be placed in a relaxed state, alternatively referred to as a released or unactuated state, regardless of the voltage applied along the segment lines, i.e., high segment voltage $VS_H$ and low segment voltage $VS_L$. In particular, when the release voltage $VC_{REL}$ is applied along a common line, the potential voltage across the modulator pixels (alternatively referred to as a pixel voltage) is within the relaxation window (see FIG. 3, also referred to as a release window) both when the high segment voltage $VS_H$ and the low segment voltage $VS_L$ are applied along the corresponding segment line for that pixel.

When a hold voltage is applied on a common line, for example a high hold voltage $VC_{HOLD\_H}$ or a low hold voltage $VC_{HOLD\_L}$, the state of the interferometric modulator will remain constant. For example, a relaxed IMOD will remain in a relaxed position, and an actuated IMOD will remain in an actuated position. The hold voltages can be selected such that the pixel voltage will remain within a stability window both when the high segment voltage $VS_H$ and the low segment voltage $VS_L$ are applied along the corresponding segment line. Thus, the segment voltage swing, i.e., the difference between the high $VS_H$ and low segment voltage $VS_L$, is less than the width of either the positive or the negative stability window.

When an addressing, or actuation, voltage is applied on a common line, for example a high addressing voltage $VC_{ADD\_H}$ or a low addressing voltage $VC_{ADD\_L}$, data can be selectively written to the modulators along that line by application of segment voltages along the respective segment lines. The segment voltages may be selected such that actuation is dependent upon the segment voltage applied. When an addressing voltage is applied along a common line, application of one segment voltage will result in a pixel voltage within a stability window, causing the pixel to remain unactuated. In contrast, application of the other segment voltage will result in a pixel voltage beyond the stability window, resulting in actuation of the pixel. The particular segment voltage which causes actuation can vary depending upon which addressing voltage is used. In some implementations, when the high addressing voltage $VC_{ADD\_H}$ is applied along the common line, application of the high segment voltage $VS_H$ can cause a modulator to remain in its current position, while application of the low segment voltage $VS_L$ can cause actuation of the modulator. As a corollary, the effect of the segment voltages can be the opposite when a low addressing voltage $VC_{ADD\_L}$ is applied, with high segment voltage $VS_H$ causing actuation of the modulator, and low segment voltage $VS_L$ having no effect (i.e., remaining stable) on the state of the modulator.

In some implementations, hold voltages, address voltages, and segment voltages may be used which produce the same polarity potential difference across the modulators. In some other implementations, signals can be used which alternate the polarity of the potential difference of the modulators from time to time. Alternation of the polarity across the modulators (that is, alternation of the polarity of write procedures) may reduce or inhibit charge accumulation which could occur after repeated write operations of a single polarity.

Figure 5A:
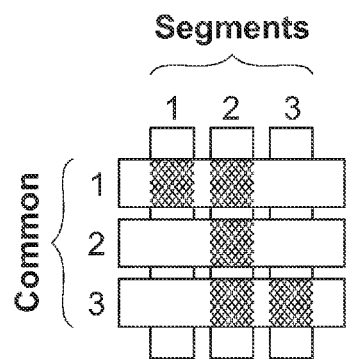
FIG. 5A shows an example of a diagram illustrating a frame of display data in the 3×3 interferometric modulator display of FIG. 2.
Figure 5B:
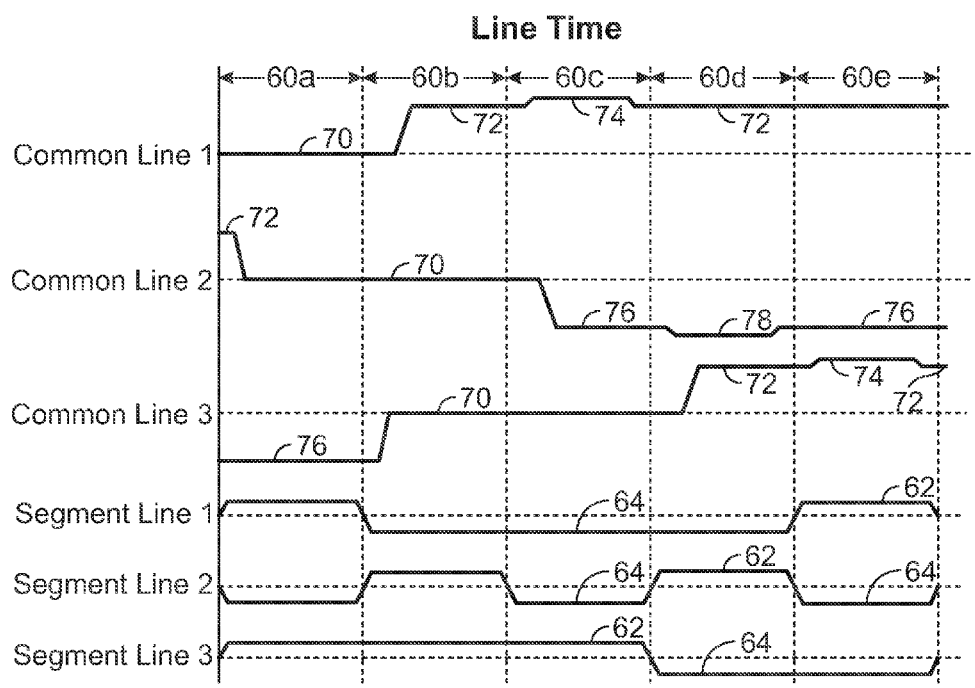
FIG. 5B shows an example of a timing diagram for common and segment signals that may be used to write the frame of display data illustrated in FIG. 5A.

FIG. 5A shows an example of a diagram illustrating a frame of display data in the 3×3 interferometric modulator display of FIG. 2. FIG. 5B shows an example of a timing diagram for common and segment signals that may be used to write the frame of display data illustrated in FIG. 5A. The signals can be applied to a 3×3 array, similar to the array of FIG. 2, which will ultimately result in the line time 60e display arrangement illustrated in FIG. 5A. The actuated modulators in FIG. 5A are in a dark-state, i.e., where a substantial portion of the reflected light is outside of the visible spectrum so as to result in a dark appearance to, for example, a viewer. Prior to writing the frame illustrated in FIG. 5A, the pixels can be in any state, but the write procedure illustrated in the timing diagram of FIG. 5B presumes that each modulator has been released and resides in an unactuated state before the first line time 60a.

During the first line time 60a: a release voltage 70 is applied on common line 1; the voltage applied on common line 2 begins at a high hold voltage 72 and moves to a release voltage 70; and a low hold voltage 76 is applied along common line 3. Thus, the modulators (common 1, segment 1), (1,2) and (1,3) along common line 1 remain in a relaxed, or unactuated, state for the duration of the first line time 60a, the modulators (2,1), (2,2) and (2,3) along common line 2 will move to a relaxed state, and the modulators (3,1), (3,2) and (3,3) along common line 3 will remain in their previous state. With reference to FIG. 4, the segment voltages applied along segment lines 1, 2 and 3 will have no effect on the state of the interferometric modulators, as none of common lines 1, 2 or 3 are being exposed to voltage levels causing actuation during line time 60a (i.e., $VC_{REL}$—relax and $VC_{HOLD\_L}$—stable).

During the second line time 60b, the voltage on common line 1 moves to a high hold voltage 72, and all modulators along common line 1 remain in a relaxed state regardless of the segment voltage applied because no addressing, or actuation, voltage was applied on the common line 1. The modulators along common line 2 remain in a relaxed state due to the application of the release voltage 70, and the modulators (3,1), (3,2) and (3,3) along common line 3 will relax when the voltage along common line 3 moves to a release voltage 70.

During the third line time 60c, common line 1 is addressed by applying a high address voltage 74 on common line 1. Because a low segment voltage 64 is applied along segment lines 1 and 2 during the application of this address voltage, the pixel voltage across modulators (1,1) and (1,2) is greater than the high end of the positive stability window (i.e., the voltage differential exceeded a predefined threshold) of the modulators, and the modulators (1,1) and (1,2) are actuated. Conversely, because a high segment voltage 62 is applied along segment line 3, the pixel voltage across modulator (1,3) is less than that of modulators (1,1) and (1,2), and remains within the positive stability window of the modulator; modulator (1,3) thus remains relaxed. Also during line time 60c, the voltage along common line 2 decreases to a low hold voltage 76, and the voltage along common line 3 remains at a release voltage 70, leaving the modulators along common lines 2 and 3 in a relaxed position.

During the fourth line time 60d, the voltage on common line 1 returns to a high hold voltage 72, leaving the modulators along common line 1 in their respective addressed states. The voltage on common line 2 is decreased to a low address voltage 78. Because a high segment voltage 62 is applied along segment line 2, the pixel voltage across modulator (2,2) is below the lower end of the negative stability window of the modulator, causing the modulator (2,2) to actuate. Conversely, because a low segment voltage 64 is applied along segment lines 1 and 3, the modulators (2,1) and (2,3) remain in a relaxed position. The voltage on common line 3 increases to a high hold voltage 72, leaving the modulators along common line 3 in a relaxed state.

Finally, during the fifth line time 60e, the voltage on common line 1 remains at high hold voltage 72, and the voltage on common line 2 remains at a low hold voltage 76, leaving the modulators along common lines 1 and 2 in their respective addressed states. The voltage on common line 3 increases to a high address voltage 74 to address the modulators along common line 3. As a low segment voltage 64 is applied on segment lines 2 and 3, the modulators (3,2) and (3,3) actuate, while the high segment voltage 62 applied along segment line 1 causes modulator (3,1) to remain in a relaxed position. Thus, at the end of the fifth line time 60e, the 3×3 pixel array is in the state shown in FIG. 5A, and will remain in that state as long as the hold voltages are applied along the common lines, regardless of variations in the segment voltage which may occur when modulators along other common lines (not shown) are being addressed.

In the timing diagram of FIG. 5B, a given write procedure (i.e., line times 60a-60e) can include the use of either high hold and address voltages, or low hold and address voltages. Once the write procedure has been completed for a given common line (and the common voltage is set to the hold voltage having the same polarity as the actuation voltage), the pixel voltage remains within a given stability window, and does not pass through the relaxation window until a release voltage is applied on that common line. Furthermore, as each modulator is released as part of the write procedure prior to addressing the modulator, the actuation time of a modulator, rather than the release time, may determine the line time. Specifically, in implementations in which the release time of a modulator is greater than the actuation time, the release voltage may be applied for longer than a single line time, as depicted in FIG. 5B. In some other implementations, voltages applied along common lines or segment lines may vary to account for variations in the actuation and release voltages of different modulators, for example modulators of different colors.

Figure 6A:
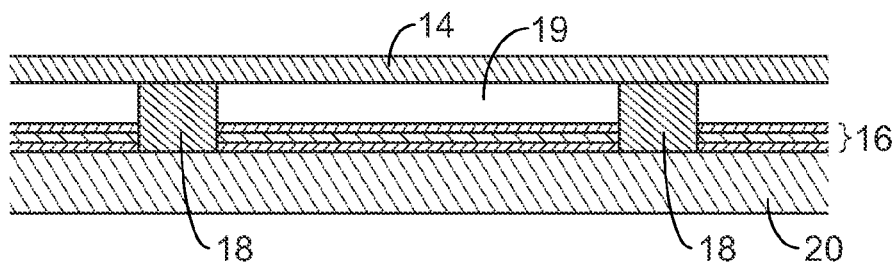
FIG. 6A shows an example of a partial cross-section of the interferometric modulator display of FIG. 1.
Figure 6B:
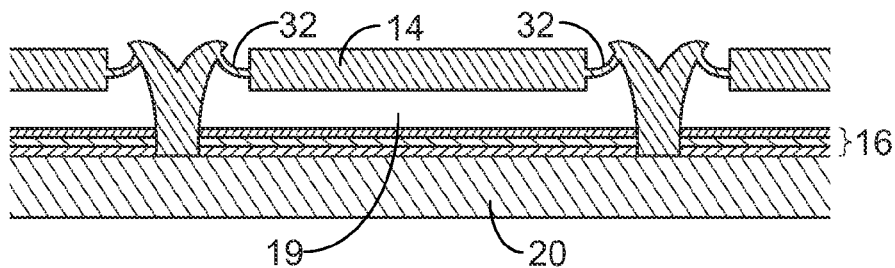
FIGS. 6B-6E show examples of cross-sections of varying implementations of interferometric modulators.
Figure 6C:
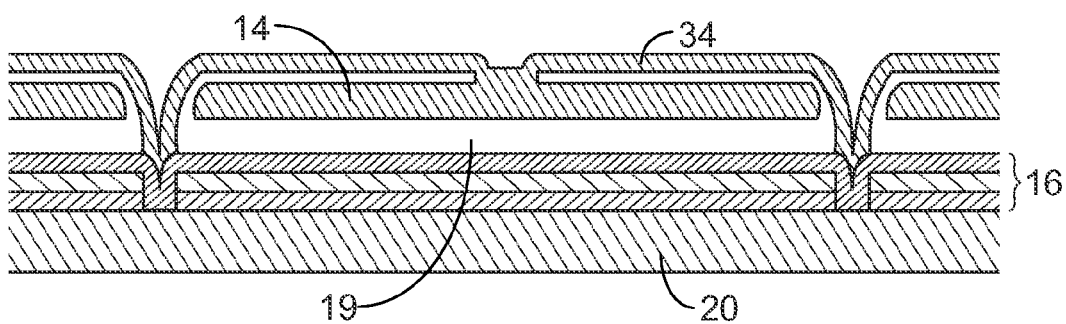

The details of the structure of interferometric modulators that operate in accordance with the principles set forth above may vary widely. For example, FIGS. 6A-6E show examples of cross-sections of varying implementations of interferometric modulators, including the movable reflective layer 14 and its supporting structures. FIG. 6A shows an example of a partial cross-section of the interferometric modulator display of FIG. 1, where a strip of metal material, i.e., the movable reflective layer 14 is deposited on supports 18 extending orthogonally from the substrate 20. In FIG. 6B, the movable reflective layer 14 of each IMOD is generally square or rectangular in shape and attached to supports at or near the corners, on tethers 32. In FIG. 6C, the movable reflective layer 14 is generally square or rectangular in shape and suspended from a deformable layer 34, which may include a flexible metal. The deformable layer 34 can connect, directly or indirectly, to the substrate 20 around the perimeter of the movable reflective layer 14. These connections are herein referred to as support posts. The implementation shown in FIG. 6C has additional benefits deriving from the decoupling of the optical functions of the movable reflective layer 14 from its mechanical functions, which are carried out by the deformable layer 34. This decoupling allows the structural design and materials used for the reflective layer 14 and those used for the deformable layer 34 to be optimized independently of one another.

Figure 6D:
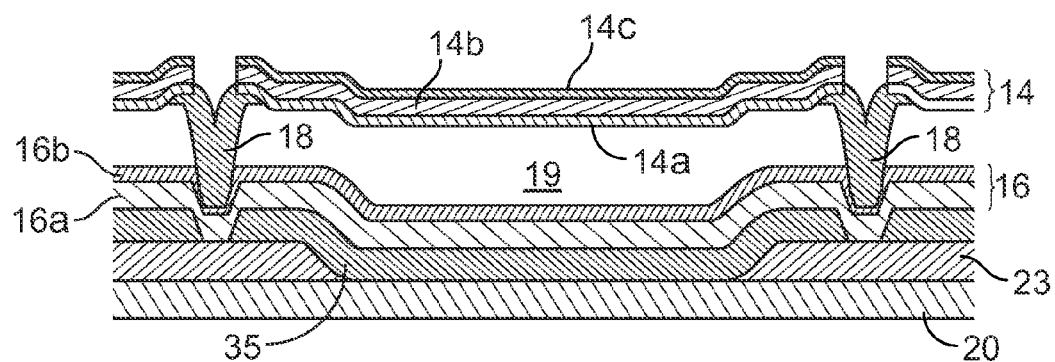

FIG. 6D shows another example of an IMOD, where the movable reflective layer 14 includes a reflective sub-layer 14a. The movable reflective layer 14 rests on a support structure, for example support posts 18. The support posts 18 provide separation of the movable reflective layer 14 from the lower stationary electrode (i.e., part of the optical stack 16 in the illustrated IMOD) so that a gap 19 is formed between the movable reflective layer 14 and the optical stack 16, for example when the movable reflective layer 14 is in a relaxed position. The movable reflective layer 14 also can include a conductive layer 14c, which may be configured to serve as an electrode, and a support layer 14b. In this example, the conductive layer 14c is disposed on one side of the support layer 14b, distal from the substrate 20, and the reflective sub-layer 14a is disposed on the other side of the support layer 14b, proximal to the substrate 20. In some implementations, the reflective sub-layer 14a can be conductive and can be disposed between the support layer 14b and the optical stack 16. The support layer 14b can include one or more layers of a dielectric material, for example, silicon oxynitride (SiON) or silicon dioxide ($SiO_2$). In some implementations, the support layer 14b can be a stack of layers, for example a $SiO_2$/SiON/$SiO_2$ tri-layer stack. Either or both of the reflective sub-layer 14a and the conductive layer 14c can include, e.g., an aluminum (Al) alloy with about 0.5% copper (Cu), or another reflective metallic material. Employing conductive layers 14a, 14c above and below the dielectric support layer 14b can balance stresses and provide enhanced conduction. In some implementations, the reflective sub-layer 14a and the conductive layer 14c can be formed of different materials for a variety of design purposes, for example achieving specific stress profiles within the movable reflective layer 14.

As illustrated in FIG. 6D, some implementations also can include a black mask structure 23. The black mask structure 23 can be formed in optically inactive regions (e.g., between pixels or under posts 18) to absorb ambient or stray light. The black mask structure 23 also can improve the optical properties of a display device by inhibiting light from being reflected from or transmitted through inactive portions of the display, thereby increasing the contrast ratio. Additionally, the black mask structure 23 can be conductive and be configured to function as an electrical bussing layer. In some implementations, the row electrodes can be connected to the black mask structure 23 to reduce the resistance of the connected row electrode. The black mask structure 23 can be formed using a variety of methods, including deposition and patterning techniques. The black mask structure 23 can include one or more layers. For example, in some implementations, the black mask structure 23 includes a molybdenum-chromium (MoCr) layer that serves as an optical absorber, a layer, and an aluminum alloy that serves as a reflector and a bussing layer, with a thickness in the range of about 30-80 Å, 500-1000 Å, and 500-6000 Å, respectively. The one or more layers can be patterned using a variety of techniques, including photolithography and dry etching, including, for example, carbon tetrafluoride ($CF_4$) and/or oxygen ($O_2$) for the MoCr and $SiO_2$ layers and chlorine ($Cl_2$) and/or boron trichloride ($BCl_3$) for the aluminum alloy layer. In some implementations, the black mask 23 can be an etalon or interferometric stack structure. In such interferometric stack black mask structures 23, the conductive absorbers can be used to transmit or bus signals between lower, stationary electrodes in the optical stack 16 of each row or column. In some implementations, a spacer layer 35 can serve to generally electrically isolate the absorber layer 16a from the conductive layers in the black mask 23.

Figure 6E:
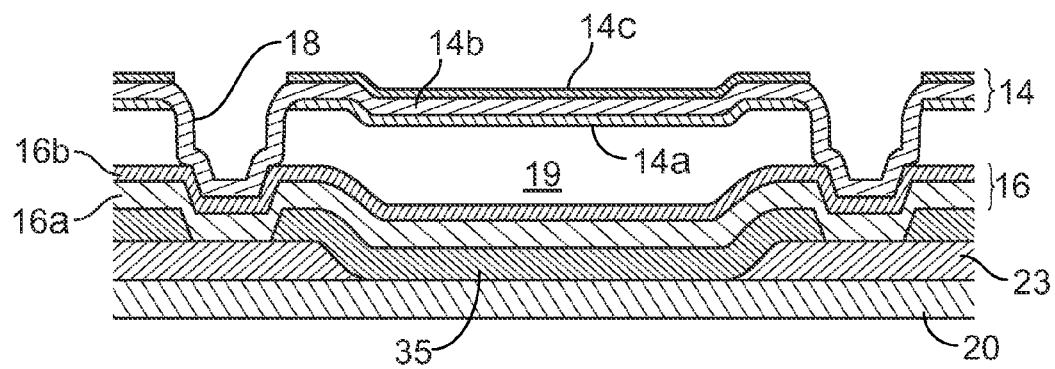

FIG. 6E shows another example of an IMOD, where the movable reflective layer 14 is self supporting. In contrast with FIG. 6D, the implementation of FIG. 6E does not include support posts 18. Instead, the movable reflective layer 14 contacts the underlying optical stack 16 at multiple locations, and the curvature of the movable reflective layer 14 provides sufficient support that the movable reflective layer 14 returns to the unactuated position of FIG. 6E when the voltage across the interferometric modulator is insufficient to cause actuation. The optical stack 16, which may contain a plurality of several different layers, is shown here for clarity including an optical absorber 16a, and a dielectric 16b. In some implementations, the optical absorber 16a may serve both as a fixed electrode and as a partially reflective layer.

In implementations such as those shown in FIGS. 6A-6E, the IMODs function as direct-view devices, in which images are viewed from the front side of the transparent substrate 20, i.e., the side opposite to that upon which the modulator is formed. In these implementations, the back portions of the device (that is, any portion of the display device behind the movable reflective layer 14, including, for example, the deformable layer 34 illustrated in FIG. 6C) can be configured and operated upon without impacting or negatively affecting the image quality of the display device, because the reflective layer 14 optically shields those portions of the device. For example, in some implementations a bus structure (not illustrated) can be included behind the movable reflective layer 14 which provides the ability to separate the optical properties of the modulator from the electromechanical properties of the modulator, for example voltage addressing and the movements that result from such addressing. Additionally, the implementations of FIGS. 6A-6E can simplify processing, for example patterning.

Figure 7:
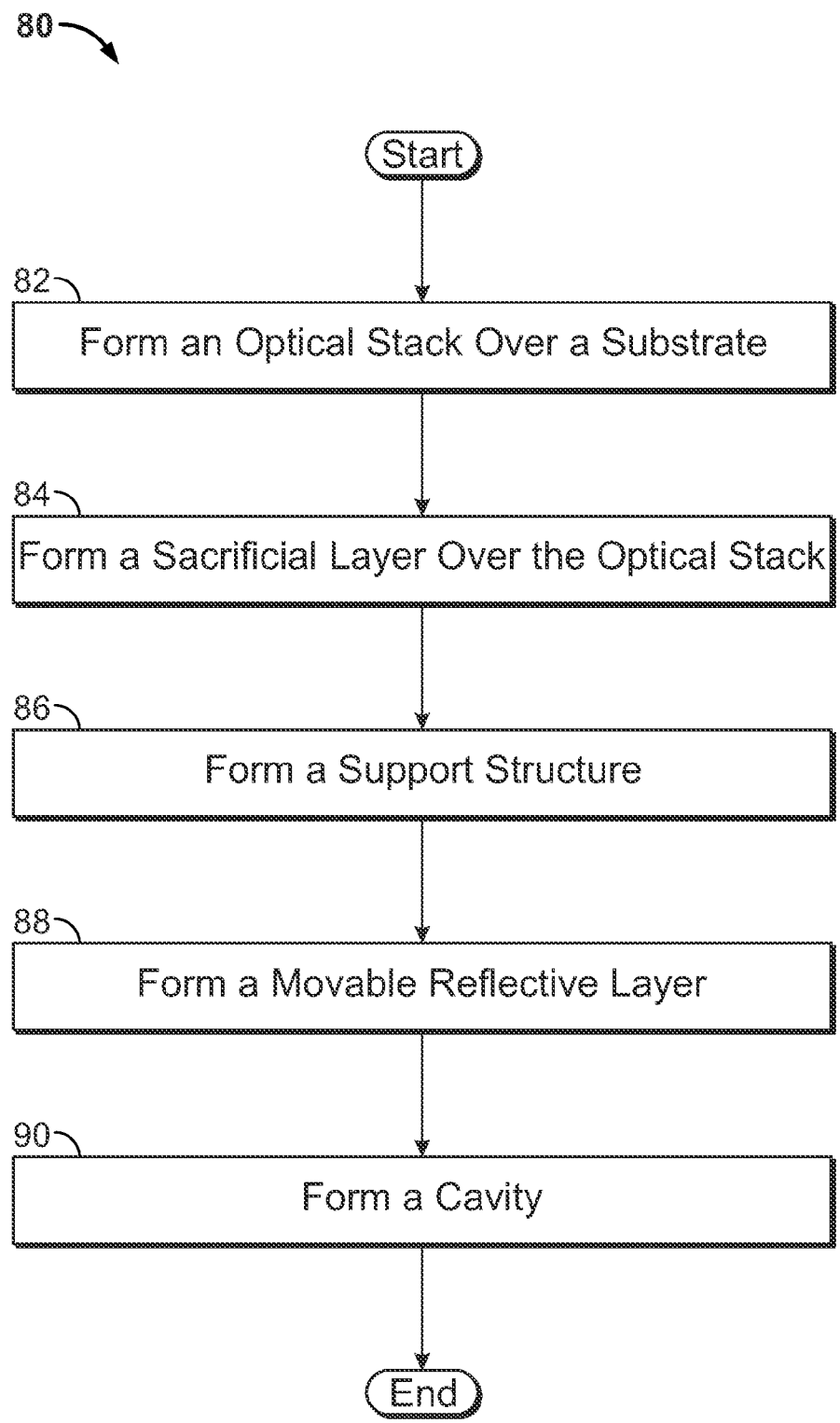
FIG. 7 shows an example of a flow diagram illustrating a manufacturing process for an interferometric modulator.
Figure 8A:
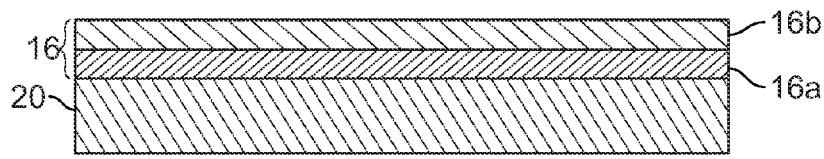
FIGS. 8A-8E show examples of cross-sectional schematic illustrations of various stages in a method of making an interferometric modulator.

FIG. 7 shows an example of a flow diagram illustrating a manufacturing process 80 for an interferometric modulator, and FIGS. 8A-8E show examples of cross-sectional schematic illustrations of corresponding stages of such a manufacturing process 80. In some implementations, the manufacturing process 80 can be implemented to manufacture an electromechanical systems device, for example interferometric modulators of the general type illustrated in FIGS. 1 and 6. The manufacture of an electromechanical systems device can also include other blocks not shown in FIG. 7. With reference to FIGS. 1, 6 and 7, the process 80 begins at block 82 with the formation of the optical stack 16 over the substrate 20. FIG. 8A illustrates such an optical stack 16 formed over the substrate 20. The substrate 20 may be a transparent substrate, for example glass or plastic, it may be flexible or relatively stiff and unbending, and may have been subjected to prior preparation processes, e.g., cleaning, to facilitate efficient formation of the optical stack 16. As discussed above, the optical stack 16 can be electrically conductive, partially transparent and partially reflective and may be fabricated, for example, by depositing one or more layers having the desired properties onto the transparent substrate 20. In FIG. 8A, the optical stack 16 includes a multilayer structure having sub-layers 16a and 16b, although more or fewer sub-layers may be included in some other implementations. In some implementations, one of the sub-layers 16a and 16b can be configured with both optically absorptive and electrically conductive properties, for example the combined conductor/absorber sub-layer 16a. Additionally, one or more of the sub-layers 16a and 16b can be patterned into parallel strips, and may form row electrodes in a display device. Such patterning can be performed by a masking and etching process or another suitable process known in the art. In some implementations, one of the sub-layers 16a and 16b can be an insulating or dielectric layer, for example sub-layer 16b that is deposited over one or more metal layers (e.g., one or more reflective and/or conductive layers). In addition, the optical stack 16 can be patterned into individual and parallel strips that form the rows of the display. It is noted that FIGS. 8A-8E may not be drawn to scale. For example, in some implementations, one of the sub-layers of the optical stack, the optically absorptive layer, may be very thin, although sub-layers 16a and 16b are shown somewhat thick in FIGS. 8A-8E.

Figure 8B:
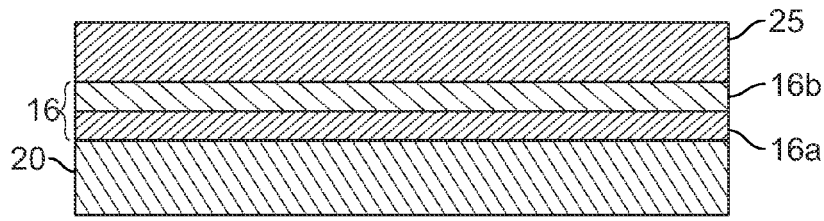

The process 80 continues at block 84 with the formation of a sacrificial layer 25 over the optical stack 16. The sacrificial layer 25 is later removed (e.g., at block 90) to form the cavity 19 and thus the sacrificial layer 25 is not shown in the resulting interferometric modulators 12 illustrated in FIG. 1. FIG. 8B illustrates a partially fabricated device including a sacrificial layer 25 formed over the optical stack 16. The formation of the sacrificial layer 25 over the optical stack 16 may include deposition of a xenon difluoride ($XeF_2$)-etchable material, for example molybdenum (Mo) or amorphous silicon (a-Si), in a thickness selected to provide, after subsequent removal, a gap or cavity 19 (see also FIGS. 1 and 8E) having a desired size. Deposition of the sacrificial material may be carried out using deposition techniques, for example physical vapor deposition (PVD, e.g., sputtering), plasma-enhanced chemical vapor deposition (PECVD), thermal chemical vapor deposition (thermal CVD), or spin-coating.

Figure 8C:
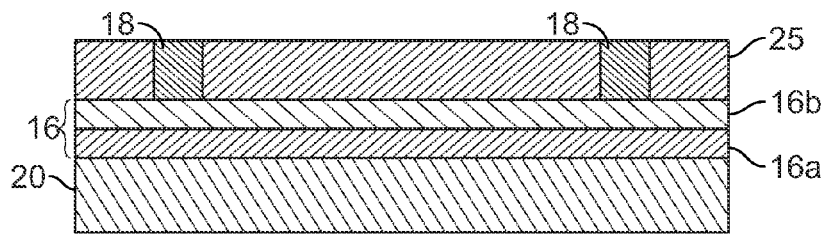

The process 80 continues at block 86 with the formation of a support structure, for example post 18, illustrated in FIGS. 1, 6 and 8C. The formation of the post 18 may include patterning the sacrificial layer 25 to form a support structure aperture, then depositing a material (for example, a polymer or an inorganic material, for example silicon oxide) into the aperture to form the post 18, using a deposition method, for example PVD, PECVD, thermal CVD, or spin-coating. In some implementations, the support structure aperture formed in the sacrificial layer can extend through both the sacrificial layer 25 and the optical stack 16 to the underlying substrate 20, so that the lower end of the post 18 contacts the substrate 20 as illustrated in FIG. 6A. Alternatively, as depicted in FIG. 8C, the aperture formed in the sacrificial layer 25 can extend through the sacrificial layer 25, but not through the optical stack 16. For example, FIG. 8E illustrates the lower ends of the support posts 18 in contact with an upper surface of the optical stack 16. The post 18, or other support structures, may be formed by depositing a layer of support structure material over the sacrificial layer 25 and patterning portions of the support structure material located away from apertures in the sacrificial layer 25. The support structures may be located within the apertures, as illustrated in FIG. 8C, but also can, at least partially, extend over a portion of the sacrificial layer 25. As noted above, the patterning of the sacrificial layer 25 and/or the support posts 18 can be performed by a patterning and etching process, but also may be performed by alternative etching methods.

Figure 8D:
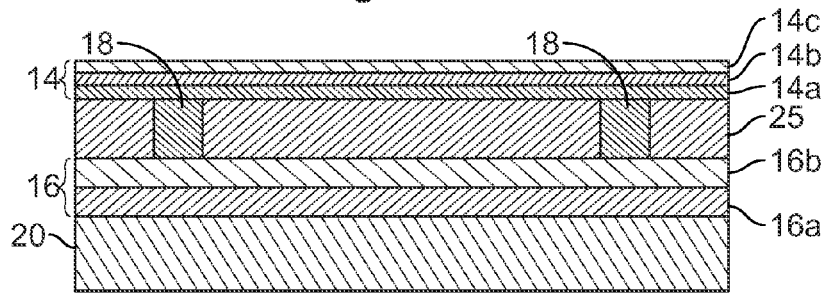
Figure 8E:
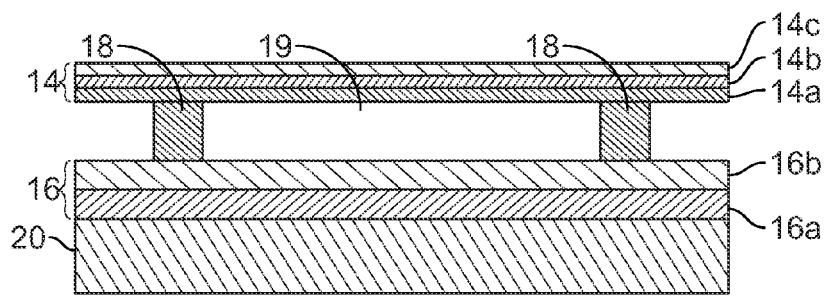

The process 80 continues at block 88 with the formation of a movable reflective layer or membrane, for example the movable reflective layer 14 illustrated in FIGS. 1, 6 and 8D. The movable reflective layer 14 may be formed by employing one or more deposition steps including, for example, reflective layer (e.g., aluminum, aluminum alloy, or other reflective layer) deposition, along with one or more patterning, masking, and/or etching steps. The movable reflective layer 14 can be electrically conductive, and referred to as an electrically conductive layer. In some implementations, the movable reflective layer 14 may include a plurality of sub-layers 14a, 14b, and 14c as shown in FIG. 8D. In some implementations, one or more of the sub-layers, for example sub-layers 14a and 14c, may include highly reflective sub-layers selected for their optical properties, and another sub-layer 14b may include a mechanical sub-layer selected for its mechanical properties. Since the sacrificial layer 25 is still present in the partially fabricated interferometric modulator formed at block 88, the movable reflective layer 14 is typically not movable at this stage. A partially fabricated IMOD that contains a sacrificial layer 25 also may be referred to herein as an "unreleased" IMOD. As described above in connection with FIG. 1, the movable reflective layer 14 can be patterned into individual and parallel strips that form the columns of the display.

The process 80 continues at block 90 with the formation of a cavity, for example cavity 19 illustrated in FIGS. 1, 6 and 8E. The cavity 19 may be formed by exposing the sacrificial material 25 (deposited at block 84) to an etchant. For example, an etchable sacrificial material, for example Mo or amorphous Si may be removed by dry chemical etching, for example, by exposing the sacrificial layer 25 to a gaseous or vaporous etchant, for example vapors derived from solid $XeF_2$, for a period of time that is effective to remove the desired amount of material, typically selectively removed relative to the structures surrounding the cavity 19. Other etching methods, e.g. wet etching and/or plasma etching, also may be used. Since the sacrificial layer 25 is removed during block 90, the movable reflective layer 14 is typically movable after this stage. After removal of the sacrificial material 25, the resulting fully or partially fabricated IMOD may be referred to herein as a "released" IMOD.

The interferometric modulators described above are bi-stable display elements having two states: a relaxed state and an actuated state. The following description relates to analog interferometric modulators. For example, in one implementation of an analog interferometric modulator, a single interferometric modulator can reflect a red color, a green color, a blue color, a black color, and a white color. In some implementations, an analog interferometric modulator can reflect any color within a range of wavelengths of light depending upon an applied voltage. Further, the optical stack of the analog interferometric modulator may differ from the bi-stable display elements described above. These differences may produce different optical results. For example, in some implementations of the bi-stable elements described above, the closed (actuated) state gives the bi-stable element a dark (for example black) reflective state. In some implementations, the analog interferometric modulator reflects white light when the electrodes are in a position analogous to the closed state of the bi-stable element.

A three-terminal electromechanical device (for example, an interferometric modulator) can include a movable middle electrode disposed in a gap between an upper and a lower electrode. In one approach, a three-terminal device can use a switch or a series capacitor to provide charge onto the middle electrode. Then, a voltage may be applied across the upper and lower electrodes, and the charged middle electrode can interact with the resulting electric field produced between the upper and lower electrodes. As a result, the charged middle electrode can be moved or displaced based upon the electric field produced by the applied voltage. However, using switches and capacitors to provide charge onto the middle electrode in this manner can lead to parasitic loading of the middle electrode. While it can be useful to provide charge onto a charge-neutral middle electrode that is not electrically connected to any external circuits and, thus, is electrically isolated, a charge-neutral middle electrode would ordinarily not respond to the applied electric field between the upper and lower electrodes. Accordingly, devices and methods for moving an electrically isolated middle electrode with net zero charge, so that it contacts an electrical contact (or electrode) thereby imparting a charge to the middle electrode, can be useful. Devices and methods to release a middle electrode after it receives charge can also be useful.

Figure 9:
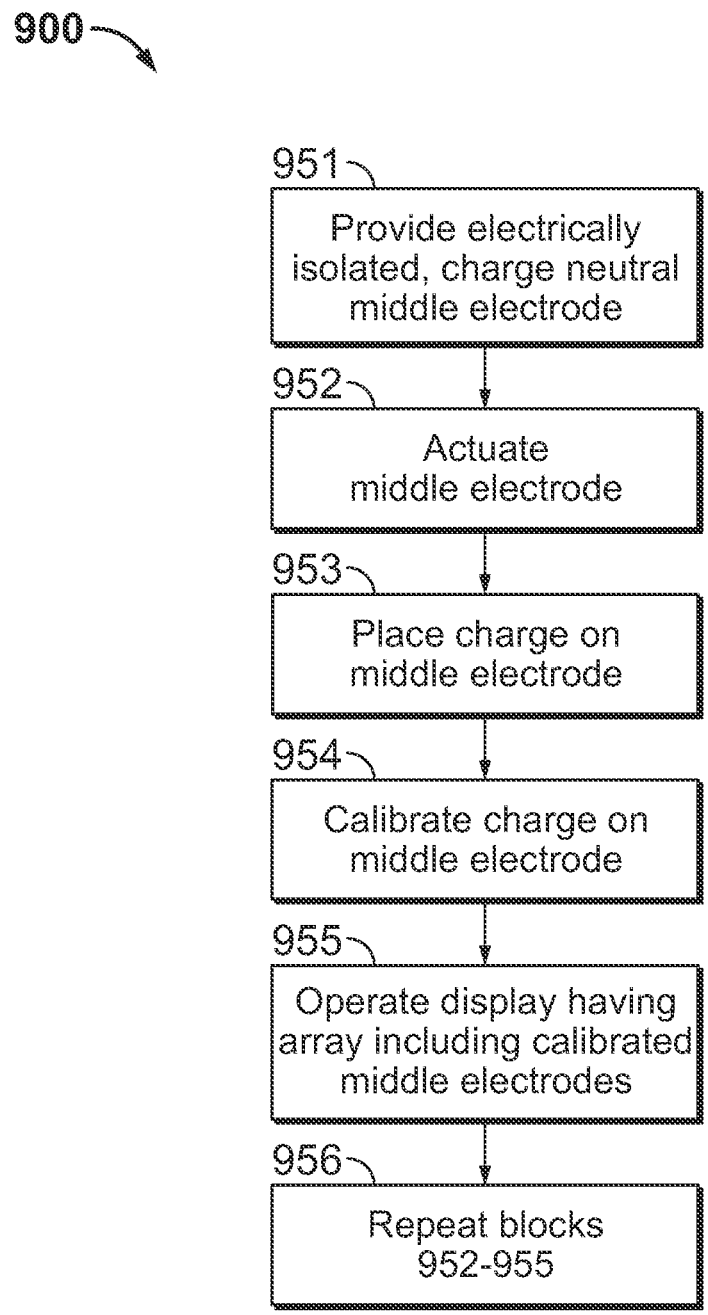
FIG. 9 shows an example of a flowchart illustrating one method for actuating and calibrating a charge neutral electrode of an analog interferometric modulator.

FIG. 9 shows an example of a flowchart illustrating one method for actuating and calibrating a charge neutral electrode of an analog interferometric modulator. The method 900 begins at block 951 in which an electrically isolated, charge neutral middle electrode is provided. The electrically isolated middle electrode can be charge neutral, for example, before being charged and/or calibrated, when a device is first powered on, or after the charge has been depleted as a result of leakage or a purposeful charge dissipation procedure. The method continues at block 952 in which the middle electrode is actuated, moving the middle electrode towards another electrode using an electrical force. Devices and methods to actuate the middle electrode when it is charge neutral are described below, for example, with reference to FIGS. 12-20. The method 900 continues at block 953 in which charge is provided to the middle electrode. FIGS. 21-25 describe some general implementations of systems and methods for placing charge on such a middle electrode. Specifically, device and methods for charging the middle electrode by contact with an upper electrode are described with reference to FIGS. 21-23, and devices and method for charging the middle electrode by contact with an isolated, grounded complimentary electrode are described with reference to FIGS. 22 and 24-25. In some implementations, the charge-neutral middle electrode may be charged using a switch configuration, as described with reference to FIGS. 26-30, while in other implementations, the middle electrode may be charged using a switchless configuration, as described with reference to FIGS. 34-38.

The method 900 includes block 954 in which the charge placed on the middle electrode is calibrated to account for the particular mechanical spring force acting on the middle electrode. Certain devices and methods for calibrating the charge using a switch configuration are described with reference to FIGS. 31-33. Additionally, some implementations of devices and methods for calibrating the charge using a switchless configuration are described with reference to FIGS. 39-41. Calibrating each of the middle electrodes across an array of three-terminal devices with a desired amount of charge can allow for reliable movement of all of the middle electrodes to the same location upon application of a selected voltage across all of the devices. This can help improve the accuracy of the color displayed in an analog interferometric modulator display.

The method 900 continues at block 955 in which a display including an array of analog interferometric modulators having calibrated middle electrodes is operated. In some aspects, operating the display includes actuating or moving the middle electrodes to various locations in the gap formed by the upper electrode 1002 and lower electrode 1010 (see FIG. 10) to display an image. The location of the middle electrode helps to determine the reflected displayed color of an analog interferometric modulator pixel. The method 900 optionally continues at block 956 in which blocks 952-955 are repeated. In some implementations, before returning to block 952, the middle electrode is rendered charge neutral. In some implementations, the middle electrode retains some charge when it is actuated at block 952.

Figure 10:
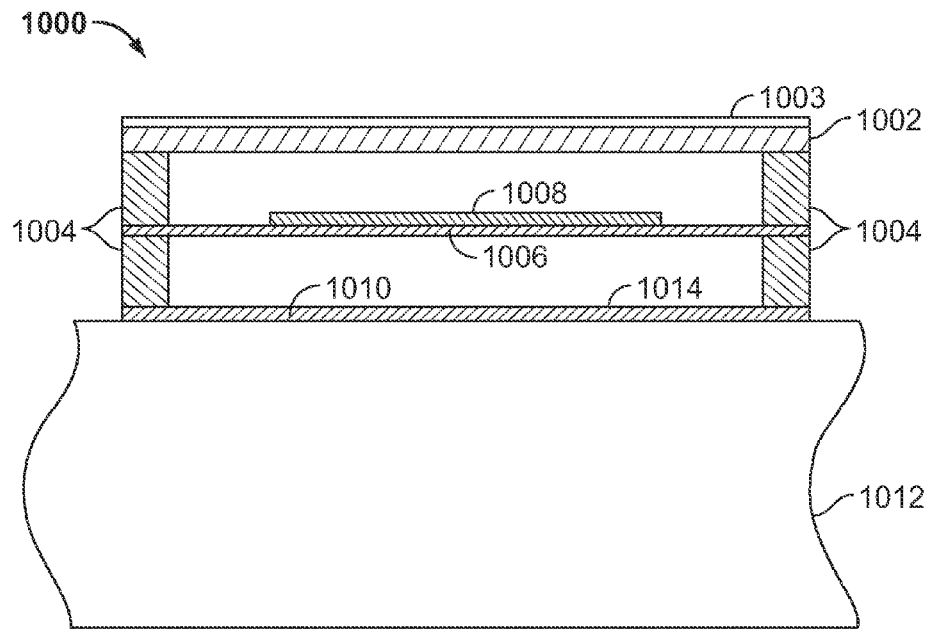
FIG. 10 shows an example of a cross-section of an interferometric modulator having a three layer or electrode design.

FIG. 10 shows an example of a cross-section of an analog interferometric modulator 1000 having a three layer or electrode design. The modulator 1000 includes an upper or first electrode 1002. In one implementation, electrode 1002 is a plate made of metal. The upper electrode 1002 may be stiffened using a stiffening layer 1003. In one implementation, the stiffening layer 1003 is a dielectric. The stiffening layer 1003 may be used to keep the upper electrode 1002 rigid and substantially flat. The modulator 900 also includes a lower or second electrode 1010, and a middle or third electrode 1006, which can also include metal. The three electrodes are electrically insulated by insulating posts 1004. The insulating posts 1004 also serve to hold middle electrode 1006 between electrodes 1002 and 1010 in an equilibrium position when no electric forces are present. The middle electrode 1006 has a stiffening layer 1008 disposed thereon. In one implementation, the stiffening layer 1008 includes silicon oxynitride.

The middle electrode 1006 is configured to move in the area or gap between upper electrode 1002 and lower electrode 1010. The stiffening layer 1008 helps to keep a portion of the middle electrode 1006 relatively rigid and flat as it moves between electrodes 1002 and 1010. In one implementation, the stiffening layer 1008 is disposed on the central portion of the middle electrode 1006. In this implementation, the side portions of the middle electrode 1006 are able to bend as the middle electrode 1006 moves. In FIG. 10, middle electrode 1006 is shown in an equilibrium position where the electrode is substantially flat. As the middle electrode 1006 moves away from this equilibrium position, the side portions of the middle electrode 1006 will deform or bend. The side portions of the middle electrode 1006 implement an elastic spring force that applies a force to move the middle electrode 1006 back to the equilibrium position (see, for example, springs 2634 in FIGS. 26-33 and springs 3434 in FIGS. 34-41).

The middle electrode 1006 also serves as a mirror to reflect light entering the structure through substrate 1012. In some implementations, substrate 1012 is made of glass. In one implementation, the lower electrode 1010 is an absorbing chromium or chromium-containing layer. To remain at least partially transparent, the absorbing layer can be made relatively thin, as described above. The lower electrode 1010 has a passivation layer 1014 (now specifically shown as a separate layer) disposed thereon. In one implementation, the passivation layer 1014 is a thin dielectric layer. In another implementation, the upper electrode 1002 has a passivation layer disposed thereon. In some implementations, the passivation layer is a thin dielectric layer.

Figure 11A:
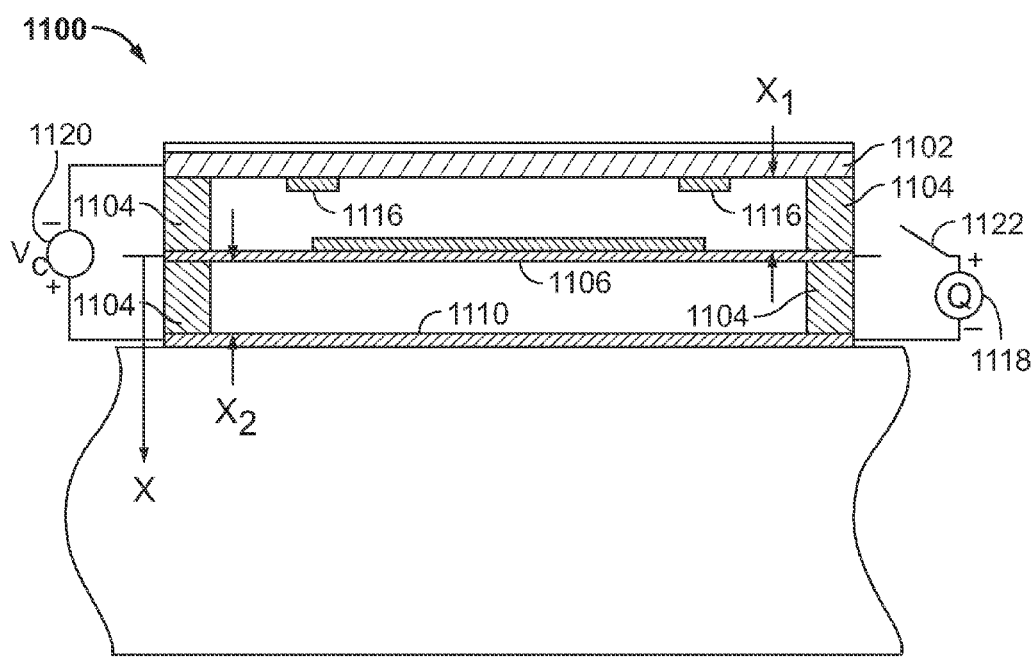
FIG. 11A shows an example of a cross-section of another analog interferometric modulator with a control circuit.

FIG. 11A shows an example of a cross-section of an analog interferometric modulator 1100 with a control circuit 1120. The analog interferometric modulator 1100 may be modulator 1000 or other similar design of analog interferometric modulator. Modulator 1100 includes an upper electrode 1102, a middle electrode 1106, and a lower electrode 1110. The modulator 1100 further includes insulating posts 1104 that insulate electrodes 1102, 1106, and 1110 from other structures. The modulator 1100 further includes resistive elements 1116 disposed on the upper electrode 1102. The upper electrode 1102 has a stiffening layer 1103 disposed thereon. In one implementation, the upper electrode 1102 is a metal and the stiffening layer 1103 is a dielectric. The modulator 1100 also includes a thin dielectric passivation layer 1114 disposed on the lower electrode 1110 such that the dielectric passivation layer 1114 is disposed between the lower electrode 1110 and the middle electrode 1106. The lower electrode 1110 is disposed on a substrate 1112. Resistive elements 1116 provide a separator between upper electrode 1102 and middle electrode 1106. When middle electrode 1106 is moved toward upper electrode 1102, resistive elements 1116 prevent the middle electrode 1106 from coming into contact with the upper electrode 1102. In one implementation, middle electrode 1106 includes an insulating layer (not shown) disposed on the bottom portion of the middle electrode 1106.

The analog interferometric modulator 1100 also includes a control circuit 1120. The control circuit 1120 is configured to apply a voltage across the upper electrode 1102 and the lower electrode 1110. A charge pump circuit 1118 is configured to selectively apply a charge to the middle electrode 1106. Using the control voltage 1120 and the charge pump circuit 1118, actuation of the middle electrode 1106 is achieved. The charge pump circuit 1118 is used to provide the middle electrode 1106 with an electric charge. The charged middle electrode 1106 then interacts with the electric field created by control circuit 1120 between upper electrode 1102 and the lower electrode 1110. The interaction of the charged middle electrode 1106 and the electric field causes the middle electrode 1106 to move between electrodes 1102 and 1110.

One example of charge injection circuitry which can be implemented as a charge pump circuit 1118 to place an accurate quantity of charge onto IMOD is illustrated in the schematics of FIG. 11B. In these schematics, the IMOD is depicted as variable capacitor. The Reset IMOD (left-side) schematic illustrates an example circuit configuration for resetting an IMOD. In this configuration, a switch S3 is closed shorting the IMOD to dissipate the charge on the IMOD. Switches S1 and S2 are "open" isolating a voltage source $V_{in}$ and a capacitor $C_{in}$, from each other and from the IMOD. The Pre-charge $C_{in}$ (center) schematic illustrates an example circuit configuration where switch S1 is closed connecting the voltage source $V_{in}$ to the capacitor $C_{in}$, charging the capacitor $C_{in}$. The switch S2 is "open" isolating the capacitor $C_{in}$, from the IMOD, and switch S3 is open so that the IMOD is no longer shorted. In the Sample and Transfer Charge onto IMOD (right-side) schematic, switch S1 is open, isolating the voltage source $V_{in}$, from the rest of the circuitry, and switch S2 is closed, connecting capacitor $C_{in}$ to the virtual ground input of the op-amp which remains connected to the IMOD terminal 1 (left terminal). The op-amp output is connected in feedback to terminal 2 of the IMOD. This is a well-known switched capacitor circuit that accurately transfers charge from the input capacitor $C_{in}$, to the capacitor in the feedback path, in this case, the IMOD. Other approaches resulting in incomplete charge transfer can be implemented using switches without an op-amp.

The middle electrode 1106 can be moved to various positions between electrodes 1102 and 1110 by varying the voltage applied by the control circuit 1120. For example, a positive voltage $V_c$ applied by control circuit 1120 causes the lower electrode 1110 to be driven to a positive potential with respect to the upper electrode 1102, which repels the middle electrode 1106 if and when it is positively charged. Accordingly, a positive voltage $V_c$ causes middle electrode 1106 to move toward upper electrode 1102. Application of a negative voltage $V_c$ by control circuit 1120 causes the lower electrode 1110 to be driven to a negative potential with respect to the upper electrode 1102, which attracts the middle electrode 1106 when it is positively charged. Accordingly a negative voltage $V_c$ causes middle electrode 1106 to move toward lower electrode 1110.

A switch 1122 can be used to selectively connect or disconnect the middle electrode 1106 from the charge pump circuit 1118. Other methods known in the art besides a switch may be used to selectively connect or disconnect the middle electrode 1106 from the charge pump circuit 1118, for example, a thin film semiconductor, a fuse, an anti fuse, etc.

The analog interferometric modulator 1100 may be configured such that the middle electrode 1106 responds in linear proportion to a voltage driven across upper electrode 1102 and lower electrode 1110. Accordingly, there is a linear relationship between the voltage used to control the movement of the middle electrode 1006 and the position of the middle electrode 1106 between electrodes 1102 and 1110.

Using a switch 1122 to provide charge to the middle electrode 1106 can cause parasitic loading of the middle electrode 1106. For example, if the middle electrode 1106 is not completely isolated electrically, a stored charge Q on the middle electrode 1106 may vary as its position between electrodes 1102 and 1110. This variation in Q can affect the response of the middle electrode 1106 to a charge. When middle electrode 1106 is not completely isolated electrically, there are parasitic capacitances attached from it to each of the upper electrode 1102 and the lower electrode 1110. In addition, a portion of the stored charge Q may leak from the middle electrode 1106 through the switch 1122 over time.

Various systems and methods can be used to account for the parasitic capacitances, for example those described in U.S. Pat. No. 7,990,604, issued Aug. 2, 2011, titled "Analog Interferometric Modulator." For example, modulator 1100 may be configured to account for the parasitic capacitances by including a capacitor connected in series with middle electrode 1106 and in parallel with parasitic capacitances 1140 and 1142. It would therefore be advantageous to provide charge, then isolate the charge, on the middle electrode 1106 without an electrical connection from the middle electrode 1106 to a switch or series capacitor. Such an electrically isolated electrode can reduce parasitic loading or charge leakage issues.

Actuating a Neutral, Electrically Isolated Electrode

Figure 12:
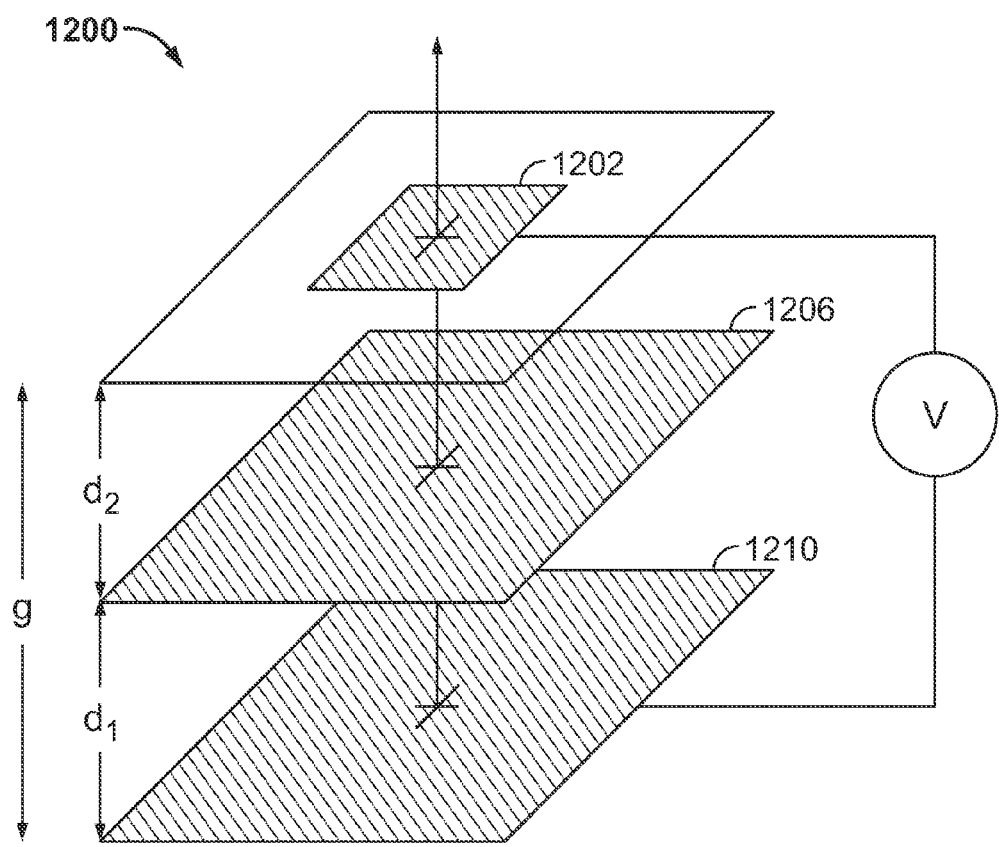
FIG. 12 shows an example of a perspective view of an analog interferometric modulator which includes a middle electrode that can be moved between two charged electrodes.

FIG. 12 shows an example of a perspective view of an analog interferometric modulator 1200 which includes a middle electrode that can be moved, or actuated, between two charged electrodes without the use of a switch or series capacitor electrically connected to the middle electrode. As described in greater detail below with reference to FIGS. 21-23, the middle electrode can be moved toward either charged electrode to provide charge onto the middle electrode without the use of a switch or series capacitor electrically connected to the middle electrode.

The modulator 1200 includes an upper electrode 1202 and a lower electrode 1210 spaced apart from the upper electrode 1202 by a constant gap g. A movable middle electrode or plate 1206 is disposed in the gap g, and can be spaced a distance $d_2$ from the upper electrode 1202 and a distance $d_1$ from the lower electrode 1210. The middle electrode 1206 may be a metal reflector or a mirror. The middle electrode 1206 can be electrically isolated, that is, it is not electrically connected to an external component, for example a switch, when the middle electrode 1206 is disposed in the gap g. The middle electrode 1206 is also charge neutral, having the same total number of positive charges as negative charges. In some implementations, the electrodes 1202, 1206, and 1210 are thin film electrodes. In some aspects, for example, a lateral dimension of a thin film upper electrode 1202 is D and the thickness of the thin film upper electrode 1202 is one-tenth the lateral dimension or less (D/10 or less). In some implementations, each of the three electrodes have thicknesses that are thin compared to the separation distances $d_1$ and $d_2$. For example, the thicknesses of each of the three electrodes can be one or more orders of magnitude thinner than the separation distances $d_1$ and $d_2$.

The middle electrode 1206 may be mechanically connected to and/or supported by structures or components (not shown in FIG. 12). However, such structure (or components) can be configured such that the middle electrode 1206 remains electrically isolated (for example, the structure may be formed from a material which helps to electrically isolate the middle electrode 1206. As discussed in greater detail below with reference to FIGS. 21, 26, and 34, such structures may include springs that exert a restorative mechanical force on the middle electrode 1206 to restore the middle electrode 1206 to a specific position in the gap g.

The uncharged, electrically isolated middle electrode 1206 can be actuated or moved toward either the upper electrode 1202 or the lower electrode 1210 upon application of an electric field between the upper electrode 1202 and the lower electrode 1210. In one implementation, this is achieved by configuring one of the upper electrode 1202 and the lower electrode 1210 to be a different size than the other. For example, in the implementation illustrated in FIG. 12, the upper electrode 1202 has a surface area $A_2$ while the lower electrode 1210 has a surface area $A_1$ that is greater than $A_2$. In other aspects, the lower electrode 1210 can have a surface area $A_1$ that is less than the surface area $A_2$ of the upper electrode 1202. The middle electrode 1206 can have a surface area less than or about equal to the surface area of the lower electrode 1210.

Applying a voltage V across the upper electrode 1202 and the lower electrode 1210 produces a non-uniform electric field between the two electrodes. Implementations of the modulator 1200 can include a control circuit configured to apply a voltage V across the upper electrode 1202 and the lower electrode 1210 to produce the non-uniform electric field.

Figure 13:
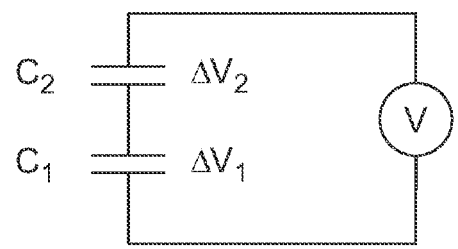
FIG. 13 shows an example of an equivalent circuit of the analog interferometric modulator shown in FIG. 12.

FIG. 13 shows an example of an equivalent circuit of the analog interferometric modulator configuration shown in FIG. 12. $C_1$ represents the capacitance between the lower electrode 1210 and the middle electrode 1206, while $C_2$ represents the capacitance between the upper electrode 1202 and the middle electrode 1206. $\Delta V_1$ represents the potential difference between the lower electrode 1210 and the middle electrode 1206, and is given by the equation:

$$\Delta V_1 = \frac{C_2}{C_1 + C_2} V \qquad (1)$$

$\Delta V_2$ represents the potential difference between the upper electrode 1202 and the middle electrode 1206, and is given by the equation:

$$\Delta V_2 = \frac{C_1}{C_1 + C_2} V \qquad (2)$$

Applying a voltage V to the upper electrode 1202 and the lower electrode 1210 provides an electrical charge on the upper electrode 1202 and the lower electrode 1210 which has the same magnitude. The electric force exerted on the middle electrode 1206 by either of these charged electrodes is inversely proportional to the surface area of the charged electrode. However, in this example, because the surface area of the upper electrode 1202 is less than that of the lower electrode 1210 in this example, the upper electrode 1202 exerts a larger electric force on the middle electrode 1206 than the lower electrode 1210. In implementations where the surface area of the lower electrode 1210 is less than that of the upper electrode 1202, the lower electrode 1210 will exert a larger electric force on the middle electrode 1206 than the upper electrode 1202.

The net force acting on the middle electrode 1206 can be determined using the parallel plate approximation for the capacitances $C_1$ and $C_2$. Because the upper electrode 1202 and the lower electrode 1210 are stationary, the net electric force on the middle electrode 1206 can be approximated as:

$$F = \frac{\varepsilon_0 A_2 (\Delta V_2)^2}{2 d_2^2} - \frac{\varepsilon_0 A_1 (\Delta V_1)^2}{2 d_1^2} \qquad (3)$$

where $\varepsilon_0$ represents the dielectric permittivity of a vacuum, $A_1$ represents the surface area of lower electrode 1210, $A_2$ represents the effective surface area of upper electrode 1202, $\Delta V_1$ represents the potential difference between the lower electrode 1210 and the middle electrode 1206, $\Delta V_2$ represents the potential difference between the upper electrode 1202 and the middle electrode 1206, $d_1$ represents the distance between the middle electrode 1206 and the lower electrode 1210, and $d_2$ represents the distance between the middle electrode 1206 the upper electrode 1202. Let $A_1 = A$ and $A_2 = \alpha A$, where $\alpha$ is the area factor. The force equation then simplifies to:

$$F = \varepsilon_0 \alpha A V^2 \frac{(1-\alpha)}{2[(1-\alpha)d_2 + \alpha g]^2} \qquad (4)$$

Thus, the application of an electric field across electrodes having disparate areas results in a net upward force on the charge neutral, electrically isolated middle plate 1206, causing it to move up towards the upper electrode 1202 in implementations where the surface area of the upper electrode 1202 is less than that of the lower electrode 1210. The middle plate 1206 is configured to move upward such that it makes contact with the upper electrode 1202, or with contacts (e.g., resistive contacts) on and/or in electrical communication with the upper electrode 1202. As described in greater detail below with reference to FIGS. 23 and 25, the contact between the middle electrode 1206 and the upper electrode 1202 can change the charge on the middle electrode 1206.

Figure 14:
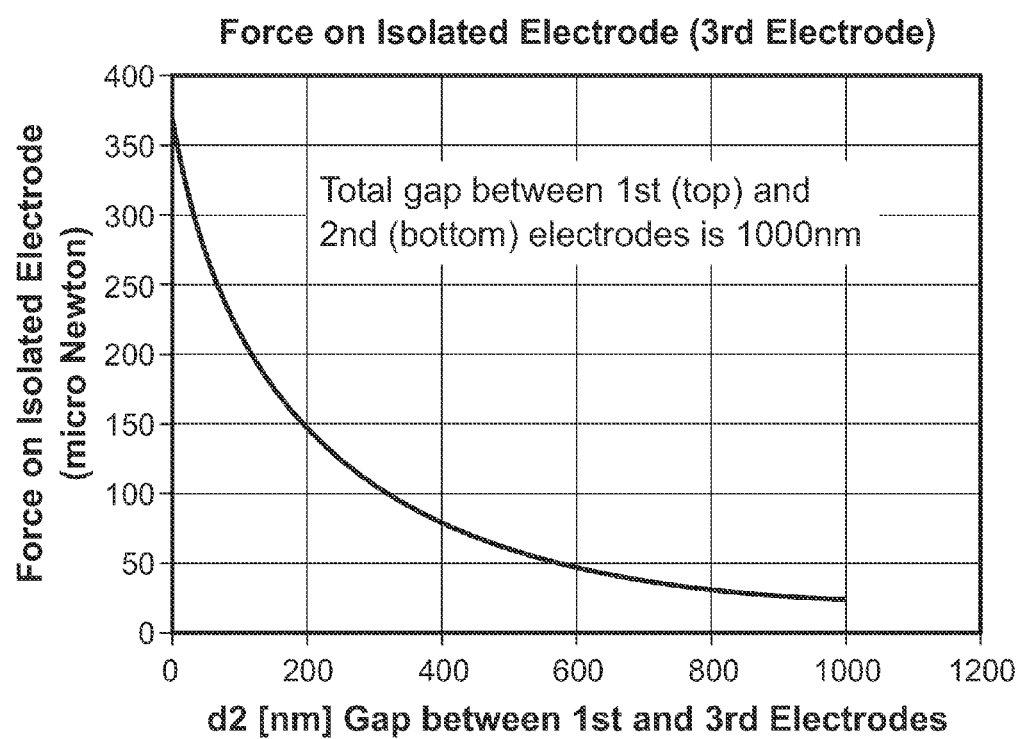
FIG. 14 shows an example of a graph illustrating how the net upward electric force acting on the middle electrode of the analog interferometric modulator of FIG. 12 varies with the distance between an upper electrode and the middle electrode.

FIG. 14 shows an example of a graph illustrating how the net upward electric force acting on the middle electrode 1206 varies with the distance $d_2$ between the upper electrode 1202 and the middle electrode 1206 in the analog interferometric modulator configuration of FIG. 12. In this example, the voltage V applied between the upper electrode 1202 and the lower electrode 1210 is 100 volts, the area factor α is 0.25, the total gap distance g is 1,000 nm, and the pixel size is 53 μm resulting in an area A of 2809 μm² in this configuration.

In some implementations, the lower electrode 1210 can have an surface area $A_2$ that is less than the surface area $A_1$ of the upper electrode 1202. In such cases, application of a voltage between the upper electrode 1202 and the lower electrode 1210 will result in a non-uniform electric field and a net downward force on the middle electrode 1206, which can move the middle electrode 1206 to contact the lower electrode 1210. As explained elsewhere, this can be exploited to charge the middle electrode 1206 by physical contact with the lower electrode 1210.

The upper electrode 1202 and the lower electrode 1210 can be configured to produce an electric field therebetween capable of moving the electrically isolated, charge neutral middle electrode 1206 when a voltage V is applied across the upper electrode 1202 and the lower electrode 1210. The series combination of two capacitors, $C_{top}$ being the capacitance between the upper electrode and the middle electrode and $C_{bot}$ being the capacitance between the middle electrode and the lower electrode is given by $$C_{total} = \frac{1}{\frac{1}{C_{top}} + \frac{1}{C_{bot}}} \quad (5)$$

$$= \frac{1}{\frac{d_2}{\varepsilon_0 \varepsilon_{bot} A} + \frac{(g - d_2)}{\varepsilon_0 \varepsilon_{bot} A}}$$

$$= \frac{1}{d_2 \left( \frac{1}{\varepsilon_0 \varepsilon_{top} A_1} - \frac{1}{\varepsilon_0 \varepsilon_{bot} A} \right) + \frac{g}{\varepsilon_0 \varepsilon_{bot} A}}$$

where $\varepsilon_0$ is the permittivity of free space, $\varepsilon_{top}$ is the relative dielectric constant filling a top gap between the upper electrode and the middle electrode, $A_1$ is the surface area of the upper electrode, $\varepsilon_{bot}$ is the relative dielectric constant filling a lower gap between the lower electrode and the middle electrode, $d_2$ is the gap between the upper and middle electrodes, g is the total distance between the upper and lower electrodes, and A is the surface area of the other lower and middle electrodes. If the electrode areas and the filling dielectric constants are the same for both the top and bottom capacitive sections, then the total capacitance value is a constant, independent of the gap between the upper and lower electrodes (for example, the distance $d_2$). If there is an imbalance in the electrode sizes and/or the dielectric constants of the gap filling media, then the total capacitance becomes a function of where the middle electrode is placed between the upper and lower electrodes. The electrical system will seek to increase the capacitance by moving the middle electrode up or down monotonically and this imbalance in the incremental capacitance (incremental with gap distance) can be a force that acts on the isolated and uncharged middle electrode.

In one implementation described above with reference to FIG. 12, the upper electrode 1202 and the lower electrode 1210 having two different surface areas are configured to produce an electric field therebetween capable of moving the electrically isolated, charge neutral middle electrode 1206. As explained above, the total capacitance is a function of where the middle electrode 1206 is placed between the upper electrode 1202 and lower electrode 1210. Application of a voltage V across the upper electrode 1202 and the lower electrode 1210 produces a non-uniform electric field that can influence the middle electrode 1206 to move towards the upper electrode 1202 or the lower electrode 1210. In another example, the electrically isolated, charge neutral middle electrode 1206 can be moved by an electric field generated between an upper and lower electrodes having different shapes. In one implementation, the upper and lower electrodes having different shapes have the same or substantially the same surface area. In another implementation, the upper and lower electrodes having different shapes have different surface areas. Such implementations may generate more electric field lines in certain areas between the upper and lower electrode, increasing the flux of the electric field in such areas. In another example discussed below with reference to FIG. 15A, a voltage applied between an upper electrode and a lower electrode, with a grounded complimentary electrode near the upper electrode, can produce an electric field that can influence the electrically isolated, charge neutral middle electrode to move toward the upper electrode. In still another implementation, a lower and upper electrode configuration that cannot be approximated as a parallel plate electrode configuration can produce an electric field an electric field capable of moving the electrically isolated, charge neutral middle electrode. In yet a further implementation, an upper gap between an upper electrode 1202 and a middle electrode 1206 or a lower gap between a lower electrode 1210 and the middle electrode 1206 may be filled with a dielectric fluid or gas, or both the upper gap and the lower gap may be filled with a dielectric fluid or gas. The rate of change of capacitance as the upper gap changes differs from the rate of change of capacitance as the lower gap changes, causing the middle electrode 1206 to move towards the upper electrode 1202 or the lower electrode 1206 upon application of a voltage V across the upper electrode 1202 and the lower electrode 1210. While certain implementations may be described as relating to a non-uniform electric field and/or certain capacitance characteristics, a person having ordinary skill in the art will understand there may be other ways to characterize and describe the electrical and physical properties of such implementations, and the included descriptions are not intended to be limiting.

Compound Electrode Configuration

Figure 15A:
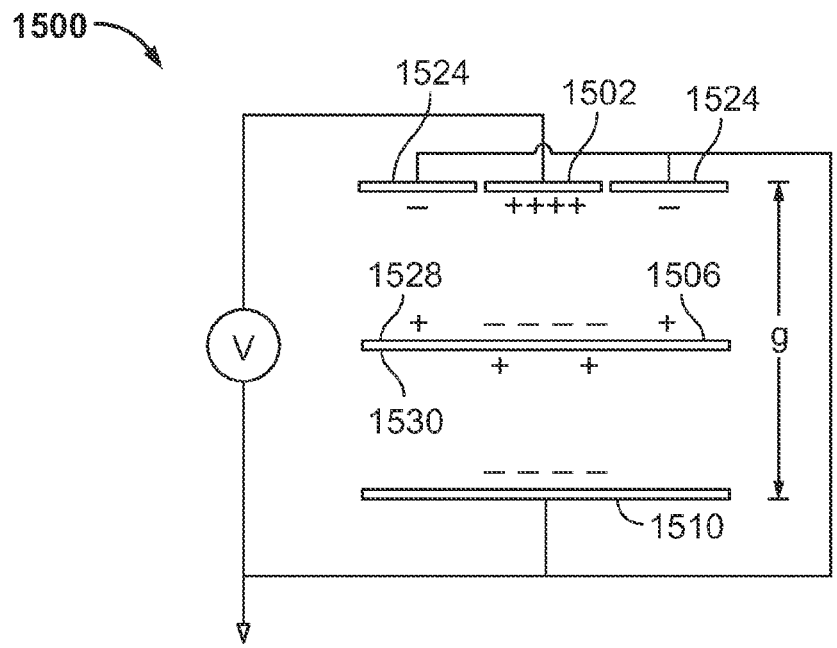
FIG. 15A shows an example of a cross-sectional schematic of an analog interferometric modulator which includes a middle electrode that can be moved between two charged electrodes.

FIG. 15A shows an example of a cross-section of an analog interferometric modulator 1500 which includes a middle movable electrode 1506, an upper electrode 1502, and a lower electrode 1510 spaced apart from the upper electrode 1502 by a constant gap g. In a relaxed (or unactuated) position, the middle electrode 1506 is electrically isolated and is positioned within gap g. The middle electrode 1506 can have a net zero electrical charge in this implementation.

The modulator 1500 also includes a complementary electrode 1524 aligned laterally relative to the upper electrode 1502. In the illustrated implementation, the complementary electrode 1524 is connected to electrical ground and electrically isolated from the upper electrode 1502, such that the complementary electrode 1524 and the upper electrode 1502 are two electrically separate electrodes.

Figure 15B:
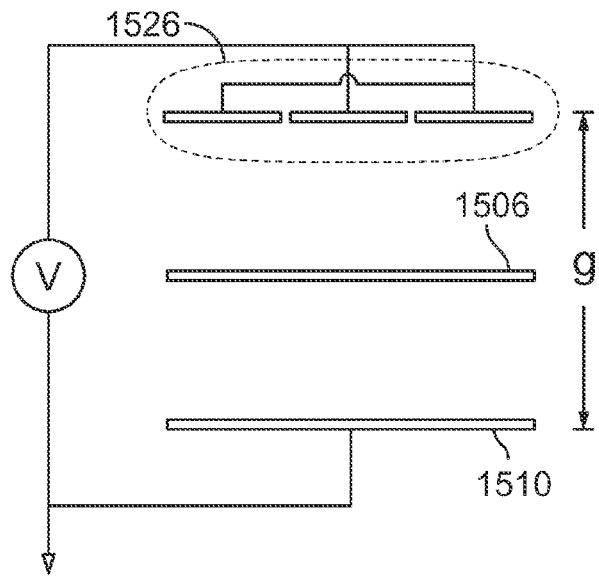
FIG. 15B shows an example of the analog interferometric modulator of FIG. 15A after a compound electrode has been formed.

As illustrated in FIG. 15B and described in greater detail below with reference to FIG. 32, however, the upper electrode 1502 and the complementary electrode 1524 can be configured to be electrically connected during a calibration procedure to form a "compound" electrode 1526. FIG. 15B shows an example of the analog interferometric modulator 1500 after the compound electrode 1526 has been formed. When referred to herein, a "compound electrode" refers to the two electrodes that are included in the compound electrode in a state when they are electrically connected. The compound electrode 1526 has a surface $A_2$ that, in some implementations, is the same or substantially the same as the surface area $A_1$ of the lower electrode 1510. In one implementation, when the complementary electrode 1524 is electrically connected to the upper electrode 1502 to form a compound electrode 1526, the compound electrode 1526 configured as a parallel plate, such that applying a voltage across the compound electrode 1526 and the lower electrode 1510 generates a generally uniform electric field. This uniform electric field can be used during normal IMOD operations to, for example, move the middle electrode 1506 to various positions to reflect various colors. Additionally, during actuation and calibration procedures described with reference to FIGS. 26-33, the complementary electrode 1524 can aid actuation and calibration of the middle electrode 1506 as described below.

In some implementations, the complementary electrode 1524 may be disposed below the middle electrode 1506 and aligned laterally relative to the lower electrode 1510, such that the lower electrode 1510 and the complementary electrode 1524 may form a compound electrode 1526.

Referring again to FIG. 15A in which the complementary electrode 1524 is connected to electrical ground and electrically isolated from the upper electrode 1502, the electrode configuration illustrated in FIG. 15A can increase the upward electric force acting on the middle electrode 1506 for a given applied voltage V. The complementary electrode 1524 can induce a positive charge on the top side 1528 of the middle electrode 1506 at its right and left ends. Because the middle electrode 1506 is net charge neutral and electrically isolated, the lower electrode 1510 induces a smaller positive charge on the bottom side 1530 of the middle electrode 1506 than in the configuration illustrated in FIG. 12. As a result, the magnitude of the upward force acting on the middle electrode 1506 is increased compared to the configuration shown in FIG. 12 where electric field non-uniformity is achieved solely through upper and lower electrodes of different areas.

Figure 16:
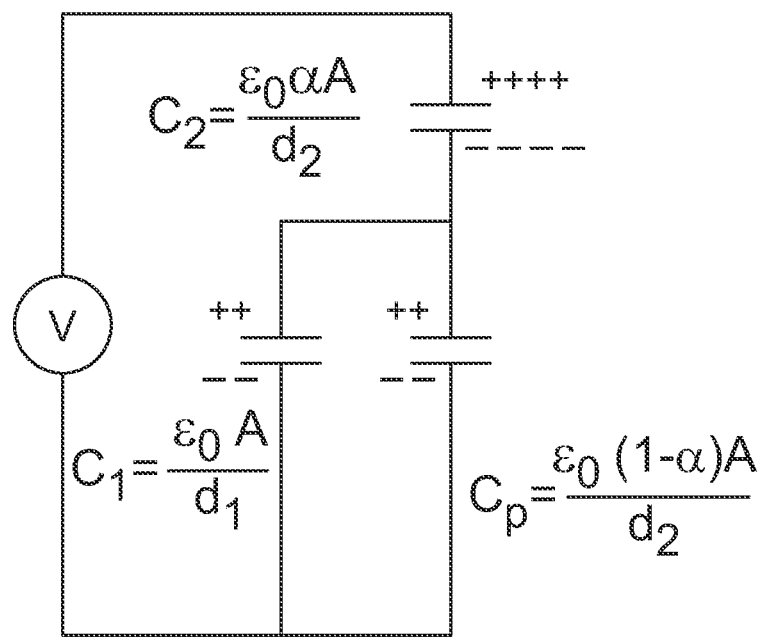
FIG. 16 shows an example of a schematic characterizing the analog interferometric modulator configuration shown in FIG. 15A as an equivalent circuit.

FIG. 16 shows an example of a schematic characterizing the analog interferometric modulator configuration shown in FIG. 15A as an equivalent circuit. The forces acting on the middle electrode 1506 will now be further described in greater detail with reference to FIG. 16. In this implementation, the surface area of the lower electrode 1510 is A, the surface area of the upper electrode 1502 is $\alpha A$, and the surface area of the grounded complementary electrode 1524 is $(1-\alpha)A$. The potential difference between the upper electrode 1502 and the middle electrode 1506 is given by the equation:

$$\Delta V_2 = \frac{(C_1 + C_p)}{C_1 + C_2 + C_p} V = \frac{\left(\frac{1}{d_1} + \frac{1-\alpha}{d_2}\right)}{\frac{1}{d_1} + \frac{\alpha}{d_2} + \frac{1-\alpha}{d_2}} V \quad (6)$$

The potential difference between the lower electrode 1510 and the middle electrode 1506 is given by the equation:

$$\Delta V_1 = \frac{C_2}{C_1 + C_2 + C_p} V = \frac{\left(\frac{\alpha}{d_2}\right)}{\frac{1}{d_1} + \frac{\alpha}{d_2} + \frac{1-\alpha}{d_2}} V \quad (7)$$

The net force acting on the middle electrode 1506 is in an upward direction (e.g., toward the upper electrode 1502), and is given by the equation:

$$F = \frac{\varepsilon_0 \alpha A (\Delta V_2)^2}{2d_2^2} + \frac{\varepsilon_0 (1-\alpha) A (\Delta V_1)^2}{2d_2^2} - \frac{\varepsilon_0 A (\Delta V_1)^2}{2d_1^2} \quad (8)$$

Comparing equation (8) to equation (4) above, it is evident that the magnitude of the net force shown in equation (8), corresponding to the implementation illustrated in FIG. 15A, is larger than the magnitude of the net force acting on the middle electrode 1206 in the implementation illustrated in FIG. 12.

Figure 17:
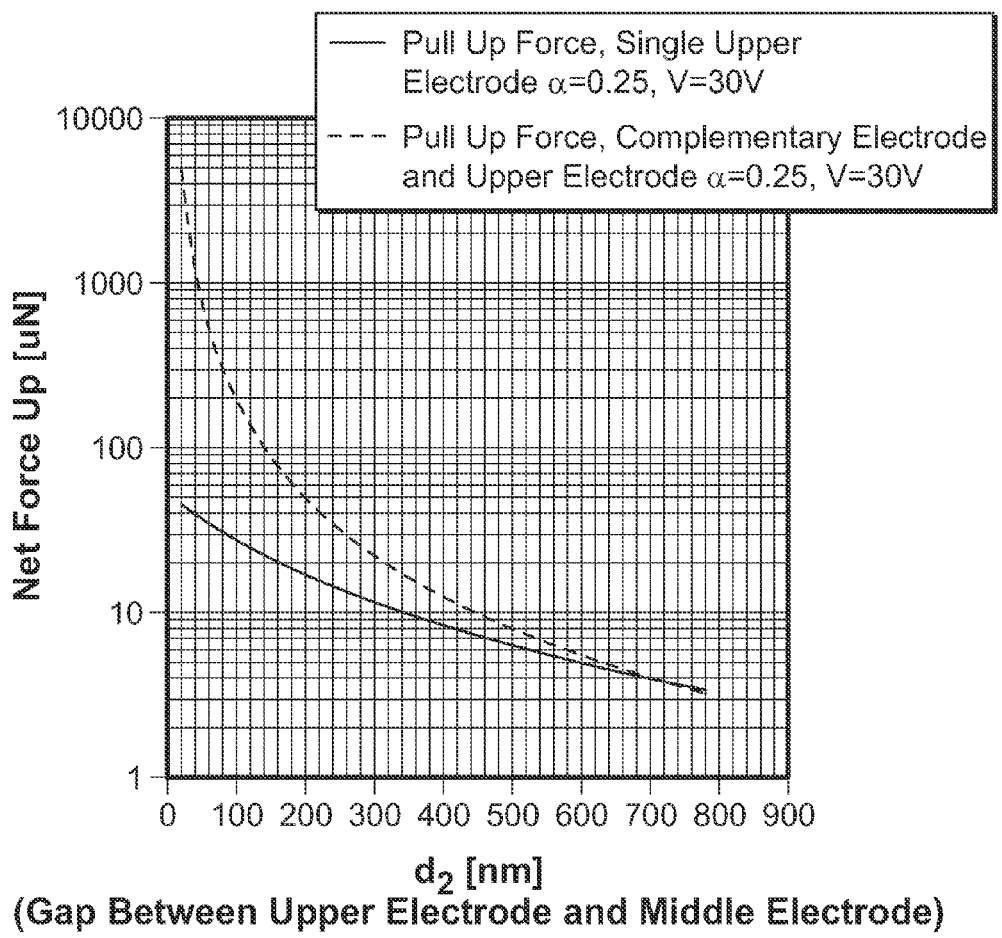
FIG. 17 shows an example of a graph illustrating the magnitude of the net upward force acting on the middle electrodes in the analog interferometric modulators of FIGS. 12 and 15A.

FIG. 17 shows an example of a graph illustrating on a logarithmic scale the magnitude of the net upward forces acting on the middle electrode 1206 in the FIG. 12 configuration and the middle electrode 1506 in the FIG. 15A configuration, as a function of the distance $d_2$ between the upper electrode 1202, 1502 and the middle electrode 1206, 1506. In both implementations, the voltage V applied between the upper electrodes 1202, 1502 and the lower electrodes 1210, 1510 is 100 volts and the area factor $\alpha$ is 0.25. FIG. 17 demonstrates that the magnitude of the net force F acting on the middle electrode 1506 in the FIG. 15A configuration, in which the complementary electrode 1524 is connected to electrical ground and electrically isolated from the upper electrode 1502, is greater than the magnitude of the net force F acting on the middle electrode 1206 for the single upper electrode 1202 configuration, where $d_2$ is less than 700 nm. Thus, the electrode configuration illustrated in FIG. 15A may increase the upward electric force acting on the middle electrode 1506 for a given voltage V.

Figure 18:
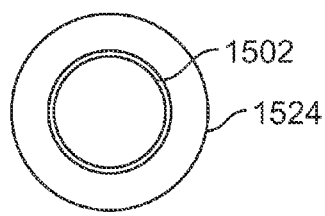
FIG. 18 shows an example of a plan view of a complementary electrode and an upper electrode shown in FIG. 15A.
Figure 19:
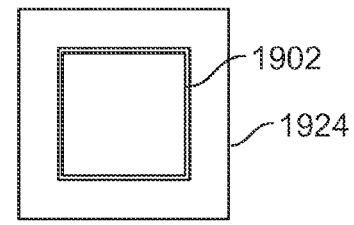
FIG. 19 shows an example of a plan view of another electrode configuration.
Figure 20:
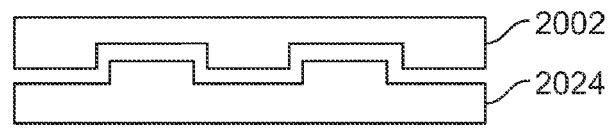
FIG. 20 shows an example of a plan view of yet another electrode configuration.

FIGS. 18-20 illustrate various electrode configurations including an upper electrode and a complementary electrode that can be electrically isolated and/or connected to form a compound electrode. FIG. 18 shows an example of a plan view of the complementary electrode 1524 and the upper electrode 1502 shown in FIG. 15A. In this implementation, a compound electrode may be formed in a ring configuration when the circular upper electrode 1502 is electrically connected to the ring-shaped complementary electrode 1524. The complementary electrode 1524 is aligned laterally relative to the upper electrode 1502. In this configuration, the upper electrode 1502 is positioned laterally inside the ring-shaped complementary electrode 1524.

Implementations of compound electrodes described herein are not limited to circular or ring shapes. For example, FIG. 19 shows an example of another electrode configuration, including a square-shaped upper electrode 1902 electrically isolated and/or connected to a square-frame-shaped complementary electrode 1924. The upper electrode 1902 is positioned laterally inside the square-shaped complementary electrode 1924. When electrically connected, the upper electrode 1902 and the complementary electrode 1924 can form a compound electrode having a surface area that is substantially the same as the surface area of a lower electrode 1910.

FIG. 20 shows an example of an interlocking configuration, where a complementary electrode 2024 is aligned laterally relative to an upper electrode 2002. When electrically connected together, the electrodes 2002, 2024 can form a compound electrode that has a surface area that is substantially the same or substantially the same as the surface area of a lower electrode 2010. A person of ordinary skill in the art will understand other shapes and configurations for compound electrodes are also possible.

Placing Charge on an Electrode

Implementations of analog interferometric modulators described above can actuate a charge-neutral, electrically isolated middle electrode such that the middle electrode moves toward the upper or the lower electrode in the presence of a non-uniform electric field. Methods of providing a charge to the middle electrode after actuating its movement will now be described with reference to FIGS. 21-25.

Direct Charging of the Electrode

Figure 21:
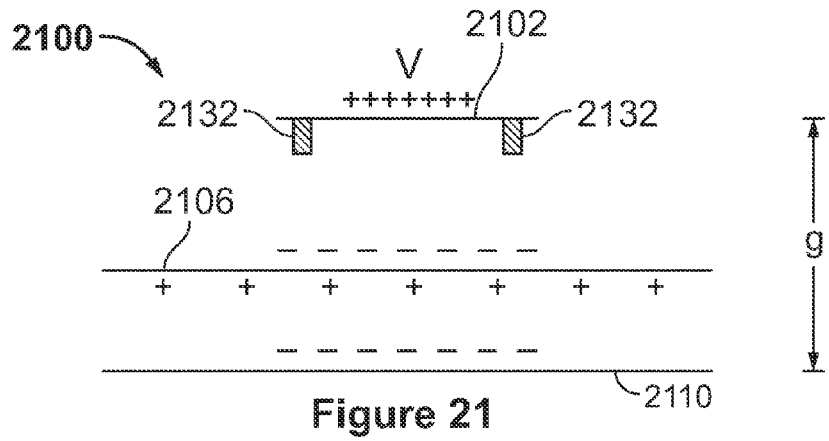
FIG. 21 shows an example of a cross-section of yet another analog interferometric modulator which includes a middle electrode that can be moved between two charged electrodes.

FIG. 21 shows an example of a cross-section of an analog interferometric modulator 2100 which includes a middle electrode 2106 and an upper electrode 2102, and a lower electrode 2110. In this implementation, the upper electrode 2102 has a surface area that is less than the surface area of the middle electrode 2106 and the lower electrode 2110. The middle electrode 2106 is illustrated prior to being actuated in the presence of a non-uniform electric field between the upper electrode 2102 and the lower electrode 2110. Prior to being actuated, the middle electrode 2106 is disposed in a first position in the gap g between the upper electrode 2102 and the lower electrode 2110. The middle electrode 2106 is electrically isolated in the first position as described in detail above with reference to FIG. 12. Prior to actuation, the middle electrode 2106 has a net neutral electric charge. The modulator 2100 can also include one or more electrical contacts, for example, one or more conductive posts 2132 disposed on the upper electrode 2102.

Figure 22:
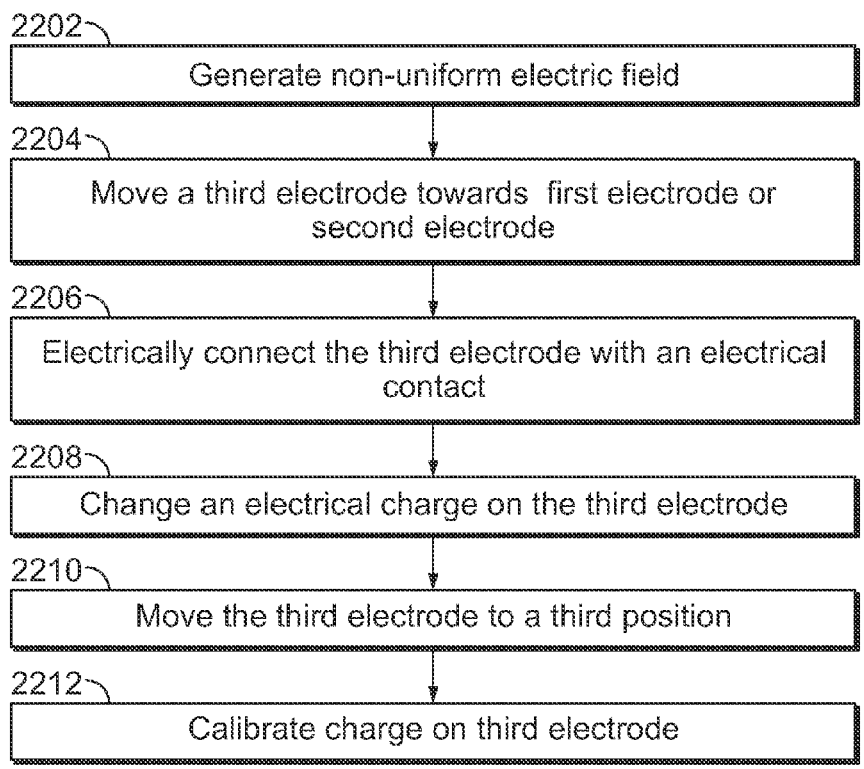
FIG. 22 shows an example of a flowchart illustrating one method for providing charge onto the middle electrode of the analog interferometric modulator of FIG. 21.

FIG. 22 shows an example of a flowchart illustrating one method 2200 for providing charge onto a middle electrode of modulator 2100 in FIG. 21. The method 2200 begins at block 2202 in which a charging actuation voltage $V_{charge}$ is applied to produce a non-uniform electric field between the upper (or first) electrode 2102 and the lower (or second) electrode 2110. The voltage $V_{charge}$ can be less than 100 volts in some implementations. The voltage $V_{charge}$ can between about 10 and about 20 volts in other implementations. In some cases, the voltage $V_{charge}$ is under about 20 volts. As described in greater detail above, the middle electrode 2106 can be actuated and moved toward either the upper electrode 2102 or the lower electrode 2110 under the influence of the non-uniform electric field between electrodes 2102 and 2110 having disparate areas.

At block 2204, upon the application of the charging actuation voltage the middle electrode 2106 moves, within the gap g, towards the first or second electrode. The remainder of the description of FIG. 22 will describe the process with reference to the upper (first) electrode, but it is understood that method 2200 may also be implemented using the lower electrode using an applied charging actuation voltage of the appropriate polarity. In implementations where the middle electrode 2106 moves towards the upper electrode 2102, the middle electrode 2106 moves in an upward direction under the influence of the non-uniform electric field towards the upper electrode 2102. In other words, the middle electrode 2106 moves away from the first position in the gap g towards a second position closer to the upper electrode 2103. At block 2206, the middle electrode 2106 moves to a second position in the gap g and contacts an electrically conductive structure (for example, conductive posts 2132) which is electrically connected to the upper electrode 2102. An example where the middle electrode 2106 is in the second position in the gap g is shown in FIG. 23.

Figure 23:
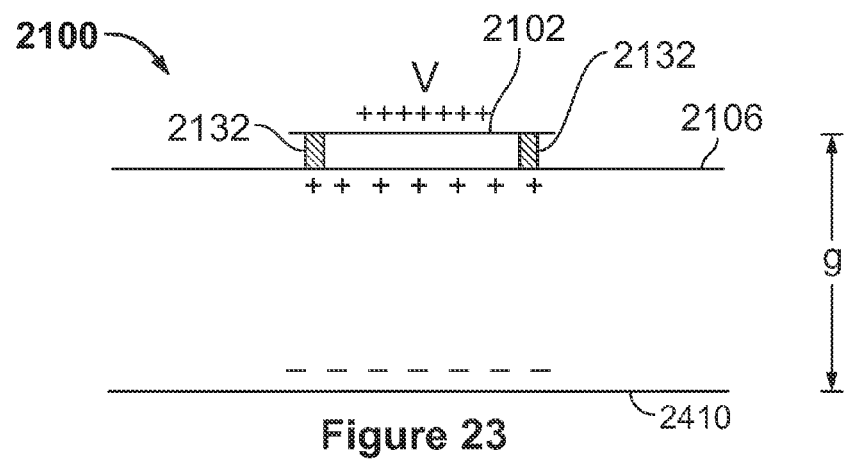
FIG. 23 shows an example of a cross-section of the analog interferometric modulator of FIG. 21 illustrating the middle electrode in a second position.

FIG. 23 shows an example of a cross-section of the modulator 2100 illustrating the middle electrode 2106 in the second position, after the middle electrode 2106 makes contact with the conductive posts 2132 on the upper electrode 2102. When moved to the second position, the middle electrode 2106 contacts the conductive posts 2132, and the middle electrode 2106 is electrically connected to the upper electrode 2102 (through the conductive posts 2132) and is no longer electrically isolated.

With reference again to FIG. 22, next at block 2208, an electrical charge on the middle electrode 2106 is changed. After electrical contact is made, the middle electrode 2106 begins to lose some of its negative charge through the conductive posts 2132, by dissipating or "leaking" of its charge. Thus, the middle electrode 2106 is not charge neutral in the second position, and becomes increasingly positively charged as leaking continues. In some implementations, the conductive posts 2132 are resistive posts that provide resistance to reduce the rate of change of the charge on the middle electrode 2106. In some implementations, a resistor exists in a path between the conductive posts 2106 and ground.

Contact between the middle electrode 2106 and the upper electrode 2102 can be sensed such that the time at which charge begins to leak off of the middle electrode 2106 can be measured. In one implementation, the charging actuation voltage $V_{charge}$ is decreased to a selected calibration voltage $V_{cal}$ once charge on the middle electrode 2106 begins to change at block 2208. Methods for determining a defined calibration voltage $V_{cal}$ are discussed in greater detail below with reference to block 3104 in FIG. 31.

The rate at which a negative charge is dissipated from the middle electrode 2106 can also be measured. In one implementation (discussed in greater detail with reference to FIG. 37), the rate of dissipation can be decreased by increasing the resistance of the conductive path between the middle electrode 2106 and the upper electrode 2102. For example, the resistance may be increased by connecting the conductive posts 2132 to the upper electrode 2102 through a resistor. Alternatively, conductive posts 2132 may be made of a highly resistive material.

As the middle electrode 2106 develops a net positive charge, the net upward electric force acting on the middle electrode 2106 diminishes. The middle electrode 2106 eventually develops just enough net positive charge that the upward electric force acting on the middle electrode 2106 can no longer balance the downward mechanical force exerted on the middle electrode 2106 by the mechanical spring force acting on the middle electrode 2106.

At block 2210, the middle electrode 2106 breaks contact with the conductive posts 2132 and moves in a downward direction away from the upper electrode 2102 to a third position in the gap g. In one implementation, the middle electrode 2106 moves to a third position just below the conductive posts 2132 after breaking contact. As used herein, a middle electrode 2106 positioned "just below" a conductive post 2132 is not in physical contact with the conductive post 2132. In one implementation, the middle electrode 2106 moves to a distance of approximately 10 nanometers below the conductive posts 2132 when the middle electrode 2106 moves to a third position just below the conductive posts 2132. After breaking electrical contact with the conductive posts 2132, the middle electrode 2106 is electrically isolated. In contrast to the net-neutral middle electrode 2106 in the first position, the middle electrode 2106 is positively-charged in the third position.

The method 2200 next moves to block 2212, in which charge on the middle electrode 2106 is calibrated. Devices and methods for calibrating charge on the middle electrode 2106 are described below with reference to FIGS. 39-41.

When the middle electrode 2106 moves to the third position at block 2210, the amount of positive charge on the middle electrode 2106 is related to the strength of the spring force (e.g., the stiffness of the springs) holding the middle electrode 2106. The stronger the spring force, the sooner the middle electrode 2106 breaks contact with the conductive posts 2132 resulting in the middle electrode 2106 having less of a positive charge than if it were connected longer. In one implementation, for example, the springs supporting a first middle electrode A are relatively stiffer than the springs holding a second middle electrode B. As a result, less negative charge is leaked off of the first middle electrode A (and consequently less positive charge imparted to the first middle electrode A), before the relatively stronger spring mechanical force acts to move the first middle electrode A down away from the upper electrode 2102. In contrast, more negative charge is leaked off of the second middle electrode B (and more positive charge imparted to the second middle electrode B), before the mechanical force imparted by the relatively weaker springs, will overcome the upward electric force acting on the second middle electrode B.

Induction Charging of the Electrode

Figure 24:
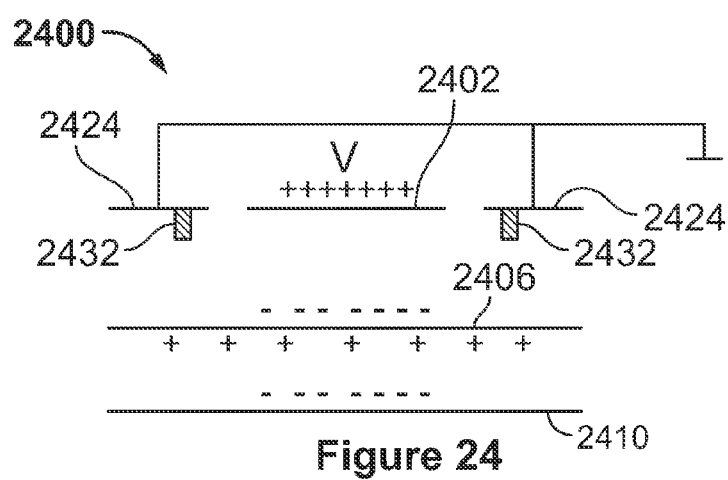
FIG. 24 shows an example of a cross-sectional schematic of still a further analog interferometric modulator which includes a middle electrode that can be moved between two charged electrodes.

FIG. 24 shows an example of a cross-section of an analog interferometric modulator 2400 capable of providing charge onto a charge-neutral, electrically isolated middle electrode. The modulator 2400 is similar to the modulator 2100 shown in FIG. 21 and includes a middle electrode 2406, an upper electrode 2402, and a lower electrode 2410. In this implementation, the modulator 2400 includes a complementary electrode 2424 aligned laterally relative to the upper electrode 2402. As described above with reference to the compound electrode 1526 illustrated in FIG. 15B, the complementary electrode 2424 and the upper electrode 2402 can be electrically connected to form a compound electrode. In the implementation illustrated in FIG. 24, however, the complementary electrode 2424 is electrically isolated from the upper electrode 2402, and is connected to electrical ground.

As illustrated, the middle electrode 2406, prior to actuation, is disposed in a first position in the gap between the upper electrode 2402 and the lower electrode 2410. The middle electrode 2406 is electrically isolated in the first position. Prior to actuation, the middle electrode 2406 has a net neutral electric charge. The modulator 2400 can also include one or more electrical contacts. For example, one or more conductive posts 2432 are disposed on the complementary electrode 2424.

Implementations of the analog modulator 2400 can provide a charge to the middle electrode 2406 through induction in accordance with the method 2200 illustrated in FIG. 22. For example, a charging actuation voltage $V_{charge}$ is applied to produce a non-uniform electric field between the upper or first electrode 2402 and the lower or second electrode 2410. At block 2204, the middle electrode 2406 moves in the gap in an upward direction towards the upper electrode 2402 under the influence of the non-uniform electric field. The middle electrode 2406 moves away from the first position in the gap towards a second position closer to the upper electrode 2402. At block 2206, the middle electrode 2406 moves to a second position in the gap and contacts the conductive posts 2432 on the complementary electrode 2424, and the middle electrode 2406 receives a charge.

Figure 25:
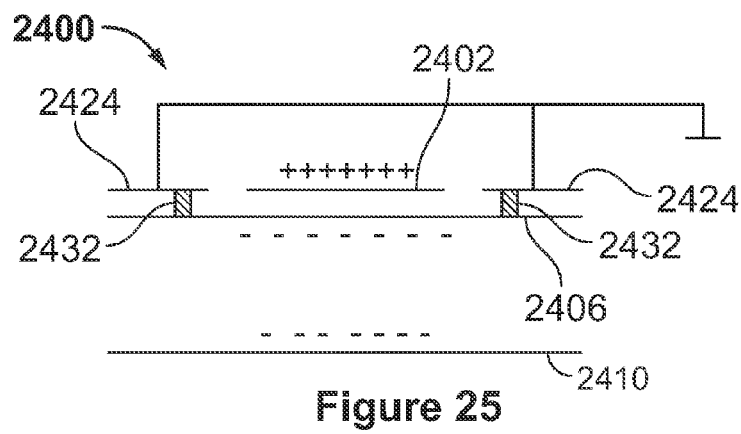
FIG. 25 shows an example of a cross-sectional schematic of the analog interferometric modulator of FIG. 24 illustrating the middle electrode in a second position.

FIG. 25 shows an example of a cross-section of the modulator 2400 illustrating the middle electrode 2406 in the second position, after the middle electrode 2406 makes contact with the conductive posts 2432 on the complementary electrode 2424. When the middle electrode 2406 contacts the conductive posts 2432, the middle electrode 2406 is no longer electrically isolated and is directly electrically connected to the complementary electrode 2424 (through the conductive posts 2432) in the second position. This contact between the middle electrode 2406 and the complementary electrode 2424 provides a path to ground, which provides inductive charging of the middle electrode 2406.

At block 2208 of FIG. 22, the electrical charge on the middle electrode 2406 is changed. After electrical contact is made, positive charges on the middle electrode 2406 begin to dissipate (or leak) through the conductive posts 2432. Thus, the middle electrode 2406 is not charge neutral in the second position, and becomes increasingly negatively charged as leaking continues. The rate at which charge on the middle electrode 2406 is dissipated can be controlled. For example, in one implementation described with reference to FIG. 29, the rate of dissipation is decreased using a resistor (not illustrated in FIGS. 24-25) connecting the complementary electrode 2424 and the conductive posts 2432 to ground.

The charging actuation voltage $V_{charge}$ can be decreased to a selected calibration voltage $V_{cal}$ once discharge begins at block 2208. As discharge continues and the middle electrode 2406 develops a net negative charge, the attraction between the upper electrode 2402 and the middle electrode 2406 diminishes. The middle electrode 2406 eventually develops just enough net negative charge that the upward electric force acting on the middle electrode 2406 can no longer balance the downward mechanical force exerted on the middle electrode 2406 that positions the middle electrode 2406 in the gap.

With reference again to FIG. 22, after contact as shown in FIG. 25, at block 2210, the middle electrode 2406 breaks contact with the conductive posts 2432 and moves in a downward direction away from the upper electrode 2402 to a third position in the gap. When the middle electrode 2406 is released at block 2210, the amount of positive charge on the middle electrode 2406 is related to the stiffness of the springs holding the middle electrode 2406, as described in greater detail above.

After breaking electrical contact with the conductive posts 2432 and moving to the third position, the middle electrode 2406 is again electrically isolated but is now negatively-charged. Implementations of analog interferometric modulators 2400 can thus inductively charge a net-neutral, electrically isolated middle electrode by subjecting the middle electrode to a non-uniform electric field and moving the middle electrode into electrical contact with a charged plate, for example, in the implementations described above, the complementary electrode 2424.

The method 2200 next moves to block 2212, in which charge on the middle electrode 2406 is calibrated. Devices and methods for calibrating charge on the middle electrode 2406 are described below with reference to FIGS. 31-33.

A person of ordinary skill in the art will understand that actuation and charging methods and devices described herein are not limited to an upper electrode 2402 that is subject to an applied voltage. For example, in one implementation, the upper electrode 2402 is connected to ground, and a charging actuation voltage is applied between the complementary electrode 2424 and the lower electrode 2410 to produce a non-uniform electric field. Conductive posts 2432 can be disposed on the upper electrode 2402 in such an implementation.

Calibrating Charge on the Electrode

In addition to actuating and providing charge onto an electrode, implementations of analog interferometric modulators described herein can calibrate the charge that has been placed on the electrode. Calibrating the charge on the middle electrodes in an array of interferometric modulators can compensate for variances in the spring constants of the mechanical structures holding the middle electrodes. Following a calibration procedure described in detail below, a series of positively- or negatively-charged, electrically isolated middle electrodes are suspended between their respective upper and lower electrodes. The positive (or negative) charge on each calibrated middle electrode is a function of the stiffness of the particular springs holding that electrode.

For example, following calibration procedures described herein, a middle electrode $E_1$ supported by relatively weak springs will have less positive charge than a middle electrode $E_2$ supported by relative stronger springs. If one global voltage, for example 1 volt, is applied across the upper and lower electrodes associated with $E_1$ and $E_2$, the resulting electric force acting on $E_1$ and $E_2$ from the applied electric field will be proportional to the charge on $E_1$ and $E_2$. The force acting on $E_2$, with a greater positive charge, will be greater than the force acting on $E_1$, with a lesser positive charge. The larger electric force acting on $E_2$ can compensate for the larger mechanical force exerted by its stiffer springs, such that it will move to the same position as $E_1$ with the same applied voltage. Thus, calibration of charge on a series of middle electrodes can be used to move the electrodes to the same location despite variances in their associated spring constants.

Induction Charging and Calibration of the Electrode

Systems and methods for inductively charging and calibrating a charge-neutral, electrically isolated electrode will now be described in detail with reference to FIGS. 26-33.

Figure 26:
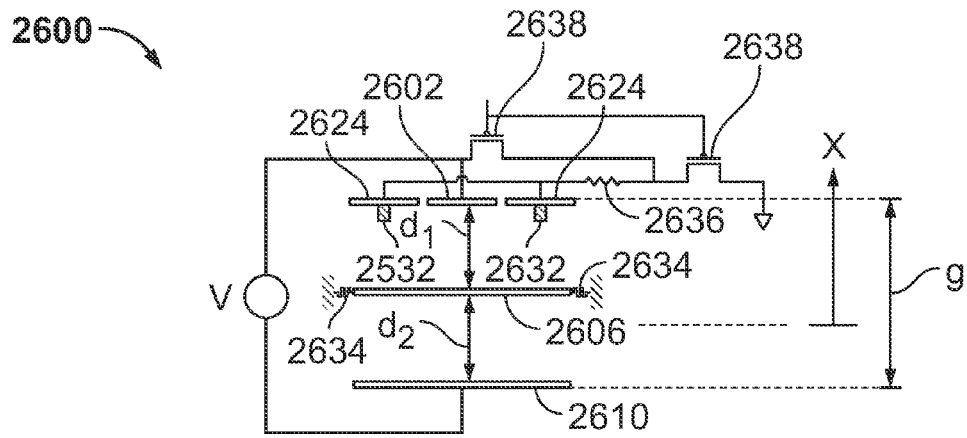
FIG. 26 shows an example of a cross-sectional schematic of an analog interferometric modulator which includes a middle electrode that can be calibrated.

FIG. 26 shows an example of a cross-section of an analog interferometric modulator 2600 capable of providing charge onto a charge-neutral, electrically isolated electrode and capable of then calibrating that charge to account for the particular mechanical spring force acting on the electrode. The modulator 2600 includes an upper or first electrode 2602 separated from a lower or second electrode 2610 by a gap g. The modulator 2600 also includes a complementary electrode 2624 aligned laterally relative to the upper electrode 2602. The modulator 2600 also includes switches 2638 that allow the complementary electrode 2624 to be electrically connected to the upper electrode 2602 or, alternatively, switches 2638 allows the complementary electrode 2624 to be connected to ground.

The modulator 2600 also includes a middle electrode 2606 suspended in the gap g and supported by springs 2634. When the middle electrode 2606 is suspended in the gap g in a first position as shown in FIG. 26, the middle electrode 2606 is electrically isolated. The middle electrode is also charge neutral in the first position. When the middle electrode 2606 moves away from the first position, mechanical restorative forces applied to the middle electrode 2606 by the springs 2634 act to restore the middle electrode 2606 to the first position.

The complementary electrode 2624 includes one or more conductive posts 2632. In some implementations, the complementary electrode 2624 is initially electrically isolated from the upper electrode 2602, and is connected to electrical ground through a resistive component 2636. In one implementation, the resistive component 2636 is a resistor configured to reduce current flow through the conductive posts 2632. As described below with reference to FIG. 32, the complementary electrode 2624 and the upper electrode 2602 can be electrically connected to form a compound electrode 2626.

Figure 27:
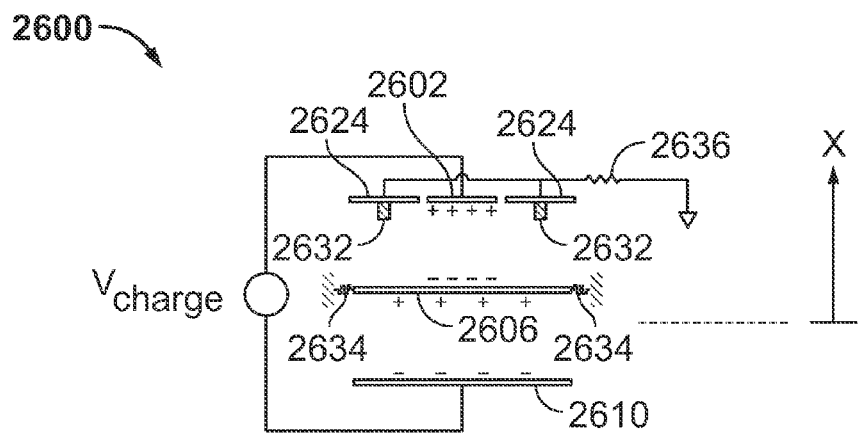
FIG. 27 shows an example of a cross-sectional schematic of the analog interferometric modulator of FIG. 26 illustrating the middle electrode in a first position.

FIG. 27 shows an example of a cross-section of the modulator 2600 illustrating the middle electrode 2606 disposed in a first position in the gap g between the upper electrode 2602 and the lower electrode 2610. A charging actuation voltage $V_{charge}$ is applied to the upper electrode 2602 and the lower electrode 2610 to produce a non-uniform electric field between, as described in greater detail above with reference to FIGS. 15 and 24.

Figure 28:
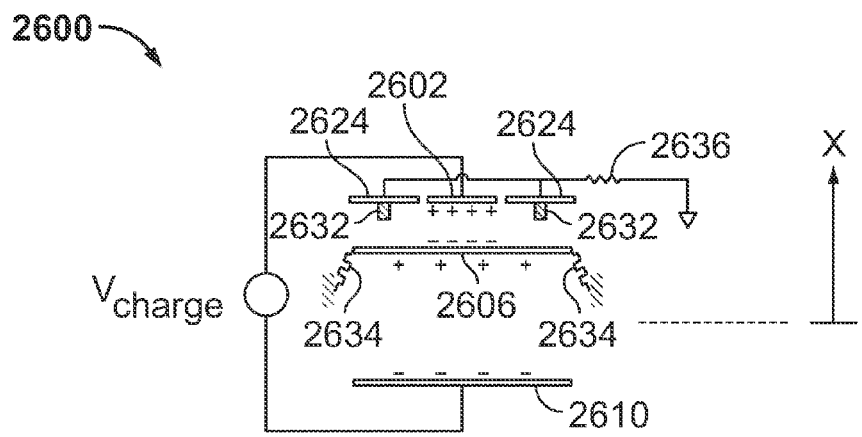
FIG. 28 shows an example of a cross-sectional schematic of the analog interferometric modulator of FIG. 26 after the middle electrode is actuated toward a second position.

FIG. 28 shows an example of a cross-section of the modulator 2600 after the middle electrode 2606 is actuated under the influence of the non-uniform electric field. In this view, the middle electrode 2606 has moved upward away from the first position toward the upper electrode 2602, but the middle electrode 2606 is still electrically isolated and charge neutral, having the same number of positive charges as negative charges.

Figure 29:
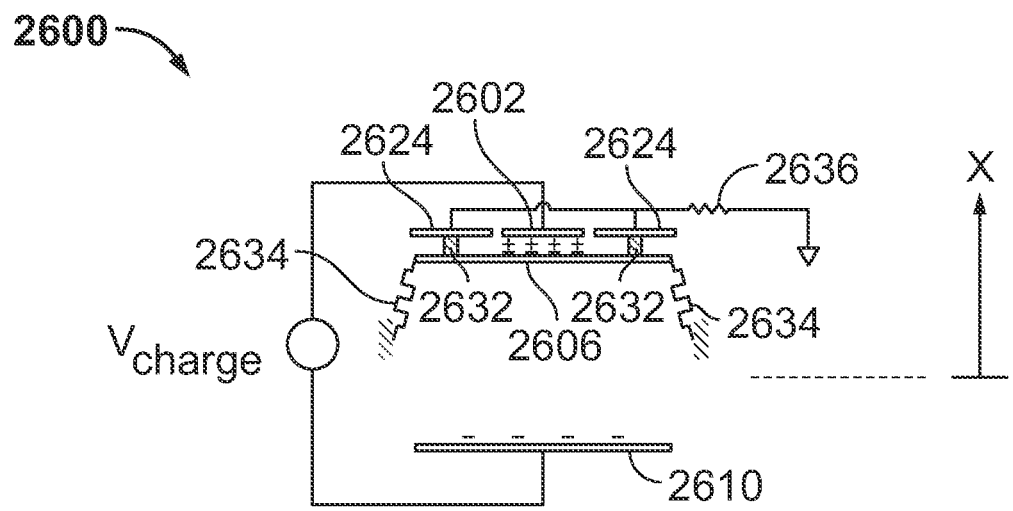
FIG. 29 shows an example of a cross-sectional schematic of the analog interferometric modulator of FIG. 26 illustrating the middle electrode in the second position.

FIG. 29 shows an example of a cross-section of the middle electrode 2606 in the second position, after it has made electrical contact with the conductive posts 2632 on the complementary electrode 2624. As described in greater detail with reference to FIG. 25, the negative charges on the middle electrode 2606 are bound by the positive charges on the upper electrode 2602, while the electrical contact between the middle electrode 2606 and the complementary electrode 2624 neutralizes positive charges on the middle electrode 2606. The mechanical restoring force exerted on the middle electrode 2606 by the springs 2634 is less than the electric force exerted by the electric field between the upper electrode 2602 and the lower electrode 2610. As positive charge on the middle electrode 2606 continues to dissipate through electrical contact with the conductive posts 2632, the middle electrode 2606 becomes increasingly negatively charged. The description above and elsewhere in this disclosure assumes that a positive voltage is applied between the lower electrode 2610 and the upper electrode 2602. However, in implementations where the applied charging actuation voltage is negative, the negative charge on the middle electrode 2606 will dissipate so that the middle electrode 2606 becomes increasingly positively charged.

The rate of dissipation of charge on the middle electrode can be controlled. For example, in one implementation, the rate of discharge is controlled and/or decreased by connecting the conductive posts 2632 and the complementary electrode 2624 to electrical ground through a resistor 2636. The rate of discharge can be decreased by selecting a resistor 2636 having a specific or desired resistance to connect the conductive posts 2632 and the complementary electrode 2624 to electrical ground.

Figure 30:
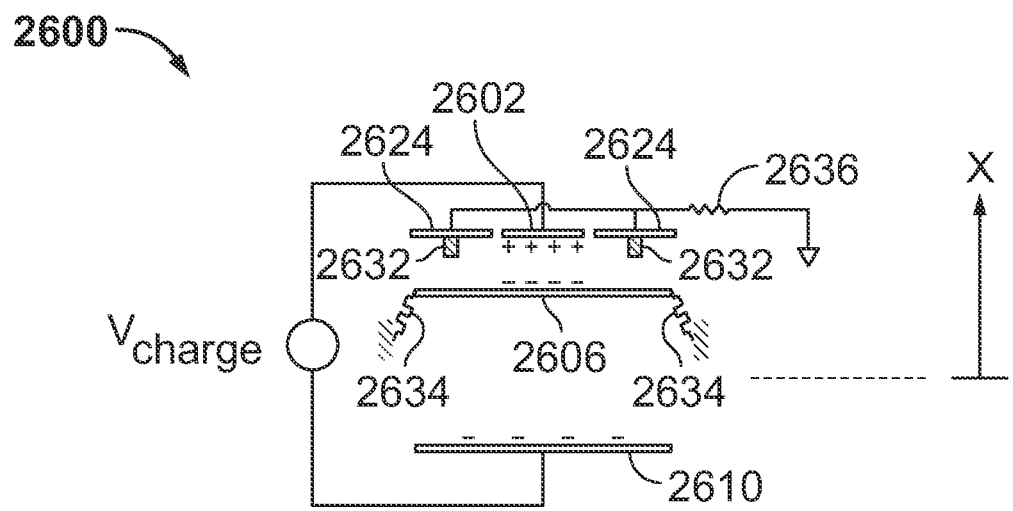
FIG. 30 shows an example of a cross-sectional schematic of the analog interferometric modulator of FIG. 26 illustrating the middle electrode in a third position.

FIG. 30 shows an example of a cross-section of the middle electrode 2606 in the third position, after the restoring spring force overcomes the electric force acting on the middle electrode 2606 and pulls the middle electrode 2606 downward away from the upper electrode 2602. The middle electrode is again electrically isolated, but is now negatively charged. The negative charge on the middle electrode 2606 is related to the stiffness of the springs 2634 supporting the middle electrode 2606.

Methods of actuating and providing charge onto a middle electrode 2606 have been described with reference to FIGS. 26-30. Methods and systems for calibrating a charge placed onto the middle electrode 2606 will now be described with reference to FIGS. 31-33.

Figure 31:
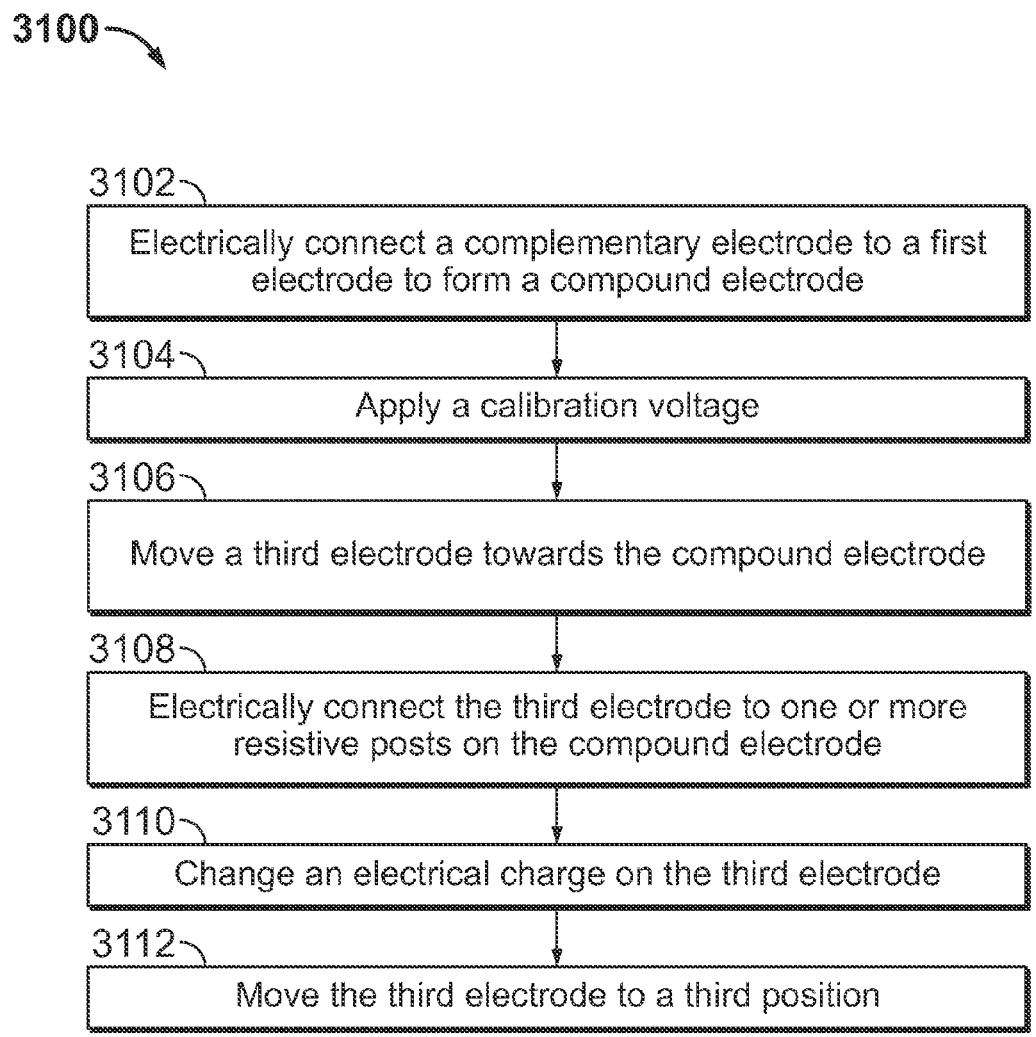
FIG. 31 shows an example of a flowchart illustrating one method for calibrating charge on the middle electrode of the analog interferometric modulator of FIG. 26.

FIG. 31 shows an example of a flowchart illustrating one method 3100 for calibrating the amount of charge on a middle electrode using, for example, the modulator 2600 of FIG. 26. In the disclosure that follows, reference will be also be made to features illustrated in FIGS. 32 and 33 as they relate to the blocks in the method 3100 illustrated in FIG. 31. The method 3100 begins at block 3102 in which the complementary electrode 2624 is electrically connected to the upper electrode 2602 to form a compound electrode 2626. In one implementation, the electrodes 2624 and 2602 are connected together with one or more switches 2638 configured to isolate or connect the electrodes 2624 and 2602. In some aspects, each modulator 2600 includes 2 switches per pixel. In another implementation, the switches 2638 include transistors that can close to form the compound electrode 2626 or open to segment the compound electrode 2626 into two separate electrodes: complementary electrode 2624 and upper electrode 2602.

Figure 32:
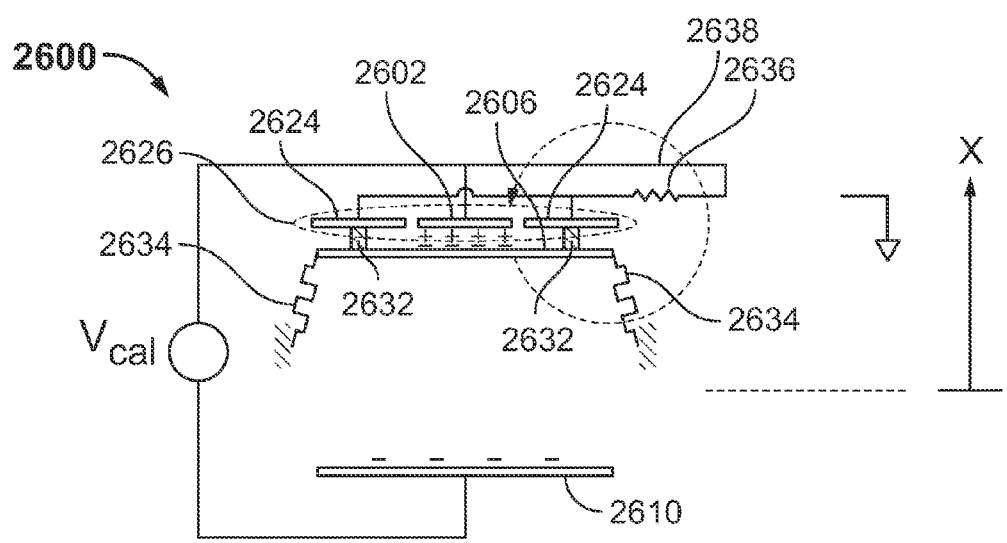
FIG. 32 shows an example of a cross-sectional schematic of the analog interferometric modulator of FIG. 26 illustrating the middle electrode in the second position during a calibration procedure.

FIG. 32 shows an example of a cross-section of the modulator 2600 after the one or more switches 2638 have closed to form a compound electrode 2626, which includes the complementary electrode 2624 and the upper electrode 2602. The complementary electrode 2624 is no longer electrically isolated from the upper electrode 2602, but electrically connected to it through the resistor 2636. Now, both the complementary electrode 2624 and the upper electrode 2602 are electrically isolated from ground. After the one or more switches 2638 are closed, the surface area of the compound electrode 2626 is the same as or substantially the same as the surface area of the lower electrode 2610.

After the middle electrode 2606 is actuated and is charged, as described above with reference to FIGS. 26-30, the middle electrode 2606 remains in the third position in the gap between the compound electrode 2626 and the lower electrode 2610. In some implementations, the position of the middle electrode 2606 at the beginning of the calibration procedure is referred to as a "first" position. One having ordinary skill in the art will understand that the middle electrode 2606 is in the same position in the gap g whether it is described as being in the "third" position at the end of a charging procedure or in a "first position" at the beginning of a calibration procedure.

With reference again to FIG. 31, in block 3104, a voltage is applied between the lower electrode 2610 and the compound electrode 2626 equal to a selected calibration voltage, $V_{cal}$. Unlike the charging actuation voltage discussed above to place a charge onto the middle electrode 2606, the voltage $V_{cal}$ applied between the lower electrode 2610 and the compound electrode 2626 is configured to create a uniform or substantially uniform electric field between the electrodes 2602 and 2626. The voltage $V_{cal}$ can be under 100 volts in some aspects. The voltage $V_{cal}$ can between about 10 an about 20 volts in other aspects. In some cases, the voltage $V_{cal}$ is under about 20 volts. A controller can be configured to apply the calibration voltage across the compound electrode 2626 and the lower electrode 2610 during a calibration procedure.

In some implementations, the calibration voltage $V_{cal}$ is determined at the time of manufacture of the modulator 2600 or an array of modulators 2600. For example, the mechanical spring force acting on the middle electrode 2606 in each modulator 2600 in an array of modulators can first be estimated to determine a range of mechanical spring forces in the array. This range can then be adjusted to account for anticipated changes in the mechanical spring forces due to aging, environmental factors, and other influences during the anticipated life of the array of modulators 2600. A single calibration voltage $V_{cal}$ to be applied to each modulator 2600 in the array can then be chosen based on this information. In one implementation, $V_{cal}$ is chosen to ensure that the modulator 2600 having the strongest mechanical spring force in the array will move upward towards the second position in electrical contact with the compound electrode 2626. In another implementation, $V_{cal}$ is chosen to ensure that the middle electrode 2606 in each modulator 2600 in the array moves upward towards the second position in electrical contact with the compound electrode 2626 when $V_{cal}$ is applied across the array to each modulator 2600.

The method next moves to block 3106, in which the negatively-charged middle electrode moves upward toward the compound electrode 2626 under the influence of the uniform electric field between the lower and compound electrodes 2610, 2626. The electric force applied to the middle electrode 2606 by the electric field thus causes the middle electrode 2606 to move away from the first position towards a second position in electrical contact with the compound electrode 2626. Next at block 3108, the middle electrode 2606 reaches the second position and is electrically connected to the compound electrode 2626 through the one or more conductive posts 2632 on the complementary electrode 2624.

FIG. 32 shows an example of a cross-section of the modulator 2600 illustrating the middle electrode 2606 in the second position and contacting the conductive posts 2632. The middle electrode 2606 is no longer electrically isolated and is directly electrically connected to the compound electrode 2626 (through the conductive posts 2632) in the second position.

With reference again to FIG. 31, in block 3110, the electrical charge on the middle electrode 2606 is changed. After the middle electrode 2606 contacts the compound electrode 2626, some of the charge on the middle electrode 2606 is neutralized, until the middle electrode 2606 can no longer resist the mechanical restoring force of the springs 2634.

Figure 33:
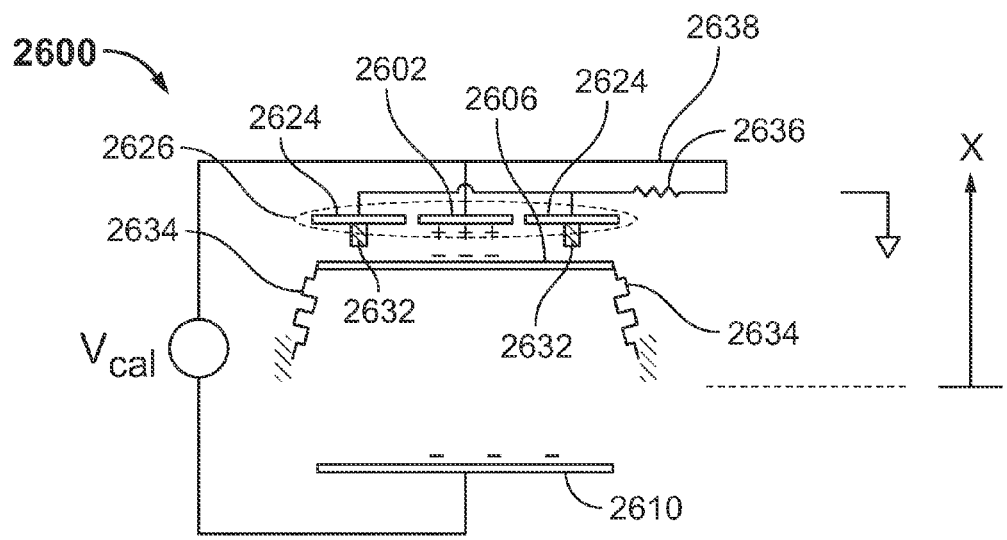
FIG. 33 shows an example of a cross-sectional schematic of the analog interferometric modulator of FIG. 26 illustrating the middle electrode in the third position following a calibration procedure.

Moving next to block 3112, the middle electrode 2606 moves in a downward direction to a third position in the gap g when the mechanical restorative force exceeds the electric force applied to the third electrode 2606. The third position in a calibration procedure, for example the third position referenced in block 3112 in FIG. 31, can be but is not necessarily the same as a third position in an actuation procedure, for example the third position referenced in block 2210 in FIG. 22. FIG. 33 shows an example of a cross-section of the modulator 2600 after the middle electrode separates from the conductive posts 2632 and moves to the third position, thus isolating the negative charges which remain on the middle electrode 2606. When the middle electrode 2606 is released at block 3112, the amount of negative charge on the middle electrode 2606 is related to the stiffness of the springs holding the middle electrode 2606. The modulator 2600 is now calibrated and in an operational range or operationally ready state.

Figure 33A:
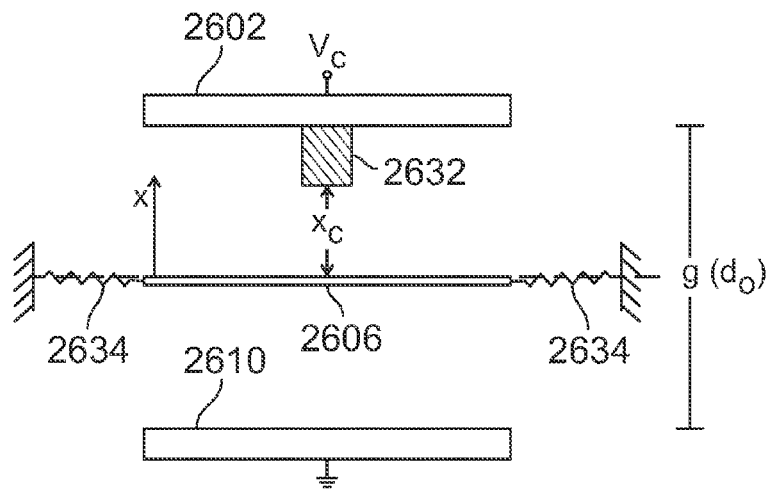
FIG. 33A shows an example of a cross-sectional schematic of an analog interferometric modulator having a middle electrode with a calibrated charge that is related to the stiffness of springs supporting the middle electrode.

FIG. 33A shows an example of a cross-sectional schematic of an analog interferometric modulator having a middle electrode 2606 with a calibrated charge $Q_c$. The calibrated charge $Q_c$ is related to the stiffness of springs 2634 supporting the middle electrode 2606. In one implementation, the relationship between the calibrated charge $Q_c$ on the middle electrode 2606 and the stiffness of the springs 2634 supporting the middle electrode 2606 is shown in the following equation:

$$Q_c = \frac{\varepsilon_0 A V_c}{2x_c}\left[1 - \sqrt{1 + \frac{4Kd_0 x_c^2}{\varepsilon_0 A V_c^2}}\right] \quad (9)$$

where $\varepsilon_0$ represents the dielectric permittivity of a vacuum, A represents the surface area of middle electrode 2606, $V_c$ represents the voltage charging the upper electrode 2602, $x_c$ represents the distance from the location of the middle electrode 2606 at the quiescent (relaxed) position to a conductive post 2632, K represents the spring constant, and $d_0$ represents the distance of the gap g.

The calibration procedure described with reference to FIG. 31 can be applied to a series of modulators 2600 in an array. Following the calibration procedure described in FIG. 31, a plurality of negatively-charged, electrically isolated middle electrodes are suspended between their respective upper and lower electrodes. The negative charge on each calibrated middle electrode is a function of the stiffness of the particular springs holding that electrode. The amount of negative charge on each calibrated middle electrode is also sufficient to ensure that each of the middle electrodes will reliably and consistently move to the same location when the same voltage is applied across all of the middle electrodes. Thus, calibration of charge on a series of middle electrodes can be used to move the electrodes to the same location despite variances in their associated spring constants.

The calibration procedure described herein can be used to calibrate modulators 2600 in a display. In one implementation, a display includes a plurality of analog interferometric modulators 2600 arranged in an array. Drive voltages can be applied across the plurality of modulators 2600 in the array to operate the display and display data. Operating the display can include actuating or moving the middle electrodes 2606 of the modulators in the array to various locations in the gap formed by the upper electrodes 2602 and lower electrodes 2610 to display an image and/or data. The location of the middle electrode 2606 in the gap helps to determine the reflected displayed color of an analog interferometric modulator pixel. Operating or driving the display can result in charge being dissipated from the middle electrode 2606 in each of the plurality of modulators 2600. In some implementations, the middle electrodes 2606 become charge neutral after the display is operated. In other implementations, a charge remains on middle electrodes 2606 after the display is operated. In some implementations, a dissipation voltage may be applied to cause the middle electrode 2606 to contact a conductive post 2632 in order to dissipate all charge from the middle electrode 2606.

The actuation, charging, and calibration procedures described with reference to FIGS. 26-33 can then be performed in preparation to display data on the display a second time. The complementary electrode 2624 in each of the modulators 2600 can be electrically isolated from the upper electrode 2602 and connected to electrical ground. The actuation procedure described above with reference to FIGS. 27-28 can then be performed. For example, a charging actuation voltage can be applied across the upper electrode 2602 and the lower electrode 2610 of each of the modulators 2600 to produce a non-uniform electric field in the gap between the upper electrode 2602 and the lower electrode 2610. The charging actuation voltage may be the same or substantially the same as the drive voltage. As described with reference to FIGS. 27-28, the middle electrodes 2606 in each of the modulators 2600 will be actuated or moved toward the upper electrode 2602.

The charging procedure described with reference to FIGS. 29-30 can then be performed across all modulators 2600 in the array. As described with reference to FIGS. 31-33, a calibration procedure can then be performed on each modulator 2600 to calibrate the charge that has been placed on each middle electrode 2606. In one implementation, the calibration voltage used to actuate the middle electrodes 2606 during the calibration procedure is less than the charging actuation voltage. Following the calibration procedure, the modulators 2600 are in an operationally ready state. Drive voltages can again be applied across the plurality of modulators to operate the display to display data, beginning the cycle again. In some implementations, before the cycle is begun again, a dissipation voltage may be applied to return the middle electrode 2606 to a charge-neutral state, as mentioned above, or the middle electrode 2606 can still retain some charge when it is further charged and then calibrated. It will be understood that the above-described cycle of operation (for example, data display), actuation, charging, and calibration can be repeated where useful and adjusted to account for variances in the rate of charge leakage from the middle electrodes 2606 over the lifetime of the device.

Switchless Charging and Calibration of the Electrode

Systems and methods for charging and calibrating a charge-neutral, electrically isolated electrode without the use of switches will now be described in detail with reference to FIGS. 34-41.

Figure 34:
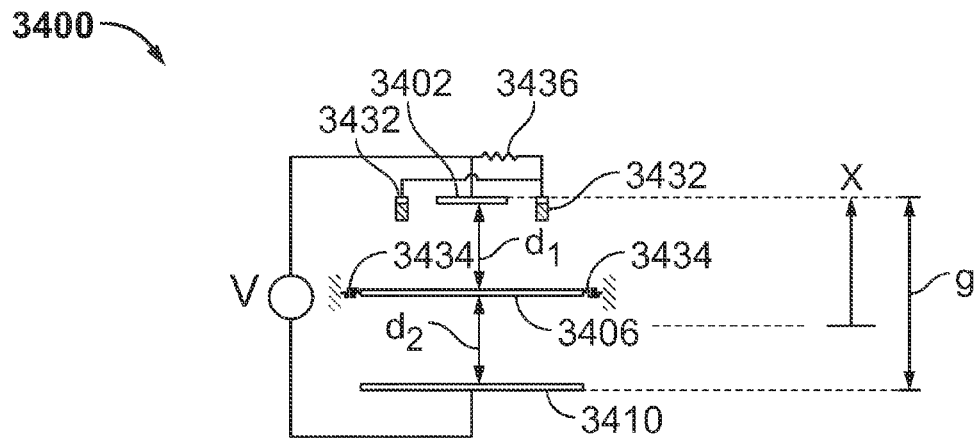
FIG. 34 shows an example of a cross-sectional schematic of yet another analog interferometric modulator which includes a middle electrode that can be calibrated.

FIG. 34 shows an example of a cross-section of an analog interferometric modulator 3400 capable of providing a charge onto a charge-neutral, electrically isolated electrode, then calibrating that charge to account for the particular mechanical spring force acting on the electrode, using a switchless calibration geometry. The modulator 3400 includes an upper or first electrode 3402 separated from a lower or second electrode 3410 by a gap g. The modulator 3400 also includes a middle electrode 3406 suspended in the gap g and supported by springs 3434.

When the middle electrode 3406 is suspended in the gap g in a first position as shown in FIG. 34, the middle electrode 3406 is electrically isolated. The middle electrode is also charge neutral in the first position. When the middle electrode 3406 moves away from the first position, mechanical restorative forces applied to the middle electrode 3406 by the springs 3434 act to restore the middle electrode 3406 to the first position.

The modulator 3400 includes one or more resistive contacts or posts 3432 aligned laterally relative to the upper electrode 3402. The conductive posts 3432 are electrically connected to the upper electrode 3402 through a resistive component 3436. In one implementation, the resistive component 3436 is a resistor configured to reduce current flow through the conductive posts 3432.

Figure 35:
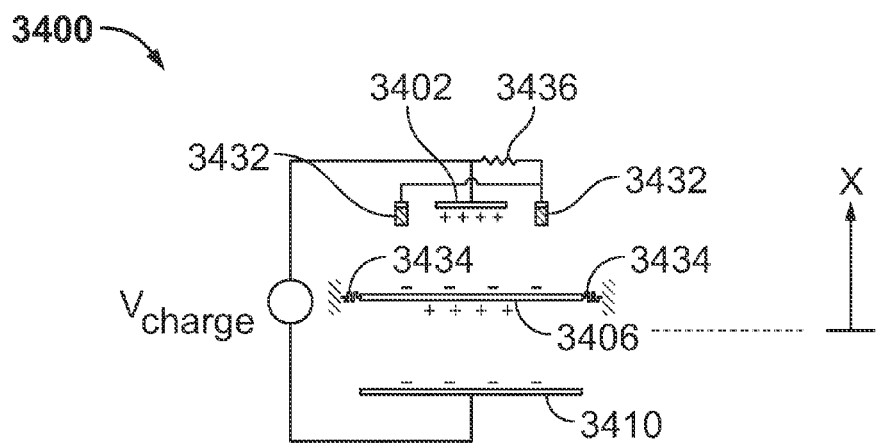
FIG. 35 shows an example of a cross-sectional schematic of the analog interferometric modulator of FIG. 34 illustrating the middle electrode in a first position.

FIG. 35 shows an example of a cross-section of the modulator 3400 at the beginning of an actuation and charging procedure. As shown in FIG. 27, the middle electrode 3400 is initially charge neutral. A charging actuation voltage $V_{charge}$ is applied to produce a non-uniform electric field between the upper electrode 3402 and the lower electrode 3410 (such as described in greater detail above with reference to FIGS. 12 and 23). In this implementation, the upper electrode 3402 has a positive charge and the lower electrode 3410 has a negative charge (relative to each other) as a result of the applied voltage $V_{charge}$.

Figure 36:
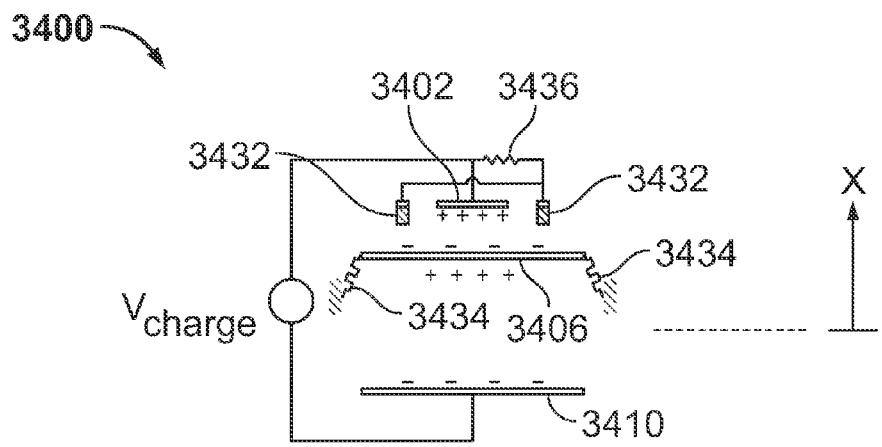
FIG. 36 shows an example of a cross-sectional schematic of the analog interferometric modulator of FIG. 34 after the middle electrode is actuated toward a second position.

FIG. 36 shows an example of a cross-section of the modulator 3400 after the middle electrode 3406 is actuated under the influence of the non-uniform electric field, as described in greater detail with reference to FIG. 23. In this view, the middle electrode 3406 has moved upward away from the first position toward the upper electrode 3402, but it is still electrically isolated and charge neutral.

Figure 37:
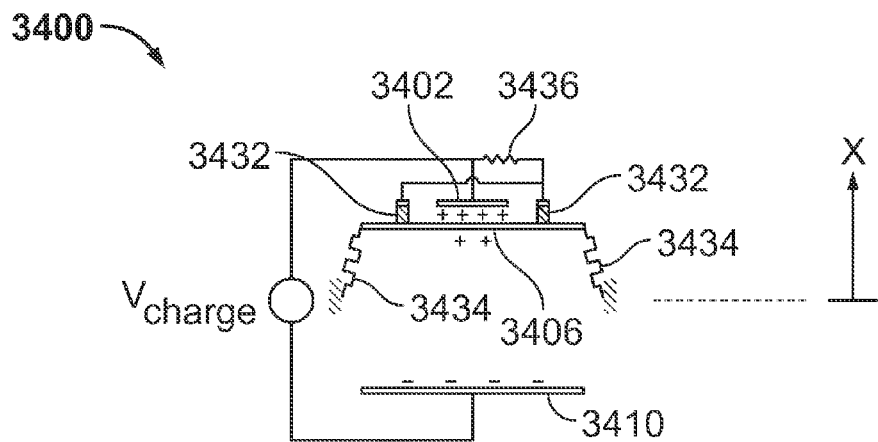
FIG. 37 shows an example of a cross-sectional schematic of the analog interferometric modulator of FIG. 34 illustrating the middle electrode in the second position.

FIG. 37 shows an example of a cross-section of the modulator 3400 illustrating the middle electrode 3406 in the second position, after it has made electrical contact with the conductive posts 3432. As described in greater detail with reference to FIG. 23, the electrical contact between the middle electrode 3406 and the conductive posts 3432 decreases negative charges on the middle electrode 3406. In one implementation, the rate of changing the charge on the middle electrode 3406 is controlled and/or decreased by connecting the conductive posts 3432 to the upper electrode 3402 through a resistor 3436. For example, the rate of changing the charge on the middle electrode 3406 can be controlled and/or decreased by selecting a resistor 3436 having a specific or desired resistance to connect the conductive posts 3432 and the upper electrode 3402.

The middle electrode 3406 is thus charged by direct contact with the conductive posts 3432. The mechanical restoring spring force exerted on the middle electrode 3406 by the springs 3434 is less than the electric force exerted by the electric field between the upper and lower electrodes 3402, 3410. As negative charge on the middle electrode 3406 dissipates through electrical contact with the conductive posts 3432, the middle electrode 3406 becomes increasingly positively charged.

Figure 38:
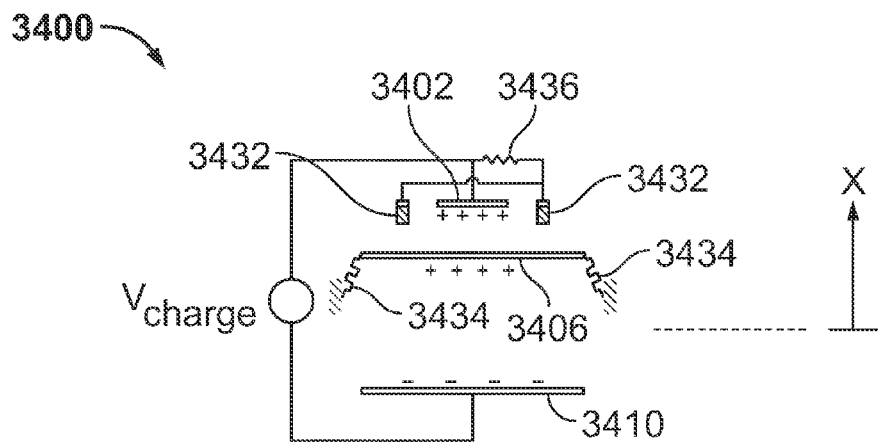
FIG. 38 shows an example of a cross-sectional schematic of the analog interferometric modulator of FIG. 34 illustrating the middle electrode in a third position.

FIG. 38 shows an example of a cross-section of the modulator 3400 illustrating the middle electrode 3406 in the third position, after the restoring spring force overcomes the electric force acting on the middle electrode 3406 and pulls the middle electrode 3406 downward away from the conductive posts 3432. The middle electrode is again electrically isolated, but is now positively charged. The positive charge on the middle electrode 3406 is related to the stiffness of the springs 3434 supporting the middle electrode 3406. The middle electrode 3406 now has a charge and returns to an electrically isolated position in the gap g, prior to a calibration procedure to calibrate the charge.

Methods of actuating and directly providing charge onto a middle electrode 3406 have been described with reference to FIGS. 34-38. Methods and systems for calibrating the charge that has been placed on the middle electrode 3306 will now be described with reference to FIGS. 39-41.

At the end of the actuation and charging procedure described above with reference to FIGS. 34-38, the middle electrode 3406 remains in the third position in the gap g between the top electrode 3402 and the lower electrode 3410. In some implementations, the position of the middle electrode 3406 at the beginning of the calibration procedure is referred to as a "first" position.

Figure 39:
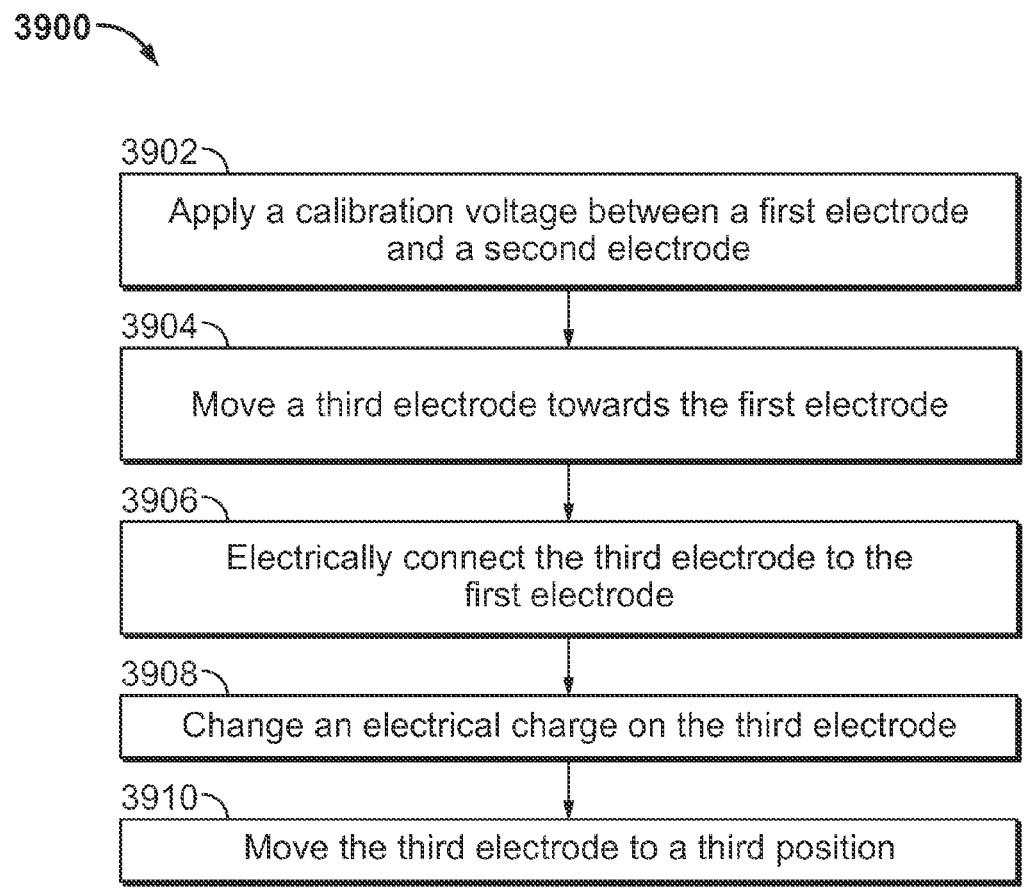
FIG. 39 shows an example of a flowchart illustrating one method of calibrating charge on the middle electrode of the analog interferometric modulator of FIG. 34.

FIG. 39 shows an example of a flowchart illustrating one method 3900 for calibrating charge on a middle electrode using the modulator 3400 of FIG. 34. The method 3900 begins at block 3902 in which the voltage applied between the upper electrode 3402 is set to a selected calibration voltage $V_{cal}$. Methods to determine $V_{cal}$ are described in greater detail above with reference to block 3104 of FIG. 31. In some implementations, the polarity of the applied voltage is reversed, so that a negative voltage is applied to the upper electrode 3402 and a positive voltage is applied to the lower electrode 3410.

At block 3904, the positively-charged middle electrode moves upward toward the conductive posts 3432 under the influence of an electric field between the upper and lower electrodes 3402, 3410. The force applied to the middle electrode 3406 by the electric field causes the middle electrode 3406 to move away from the first position towards a second position in electrical contact with the conductive posts 3432.

Next at block 3906, the middle electrode 3406 moves to the second position and is electrically connected to the conductive posts 3432.

Figure 40:
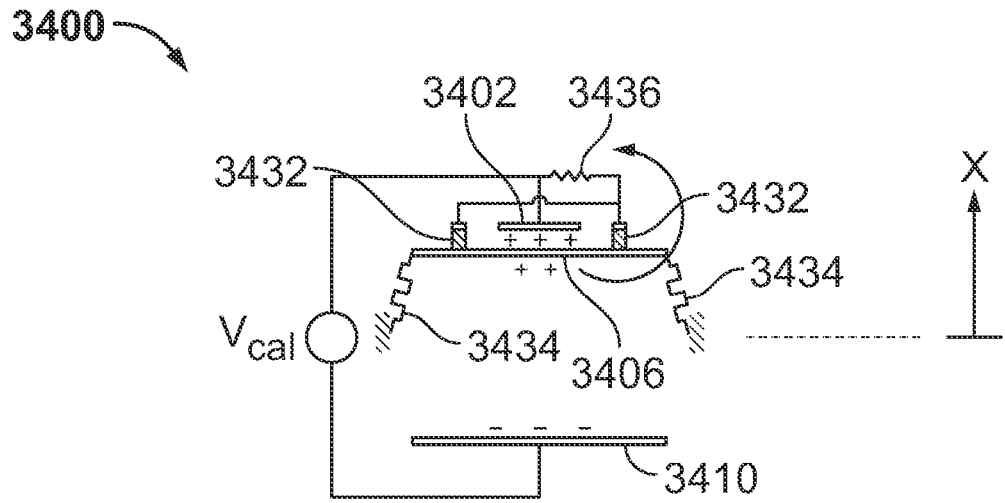
FIG. 40 shows an example of a cross-sectional schematic of the analog interferometric modulator of FIG. 34 illustrating the middle electrode in the second position during a calibration procedure.

FIG. 40 shows an example of a cross-section of the modulator 3400 illustrating the middle electrode 3406 in the second position and contacting the conductive posts 3432. The middle electrode 3406 is no longer electrically isolated and is directly electrically connected to the conductive posts 3432 in the second position.

Next at block 3908, the electrical charge on the middle electrode 3406 is changed. As shown in FIG. 40, after electrical contact is made between the middle electrode 3406 and the conductive posts 3432, some of the positive charge on the middle electrode 3406 is depleted until the middle electrode 3306 can no longer resist the mechanical restoring force of the springs 3434.

Figure 41:
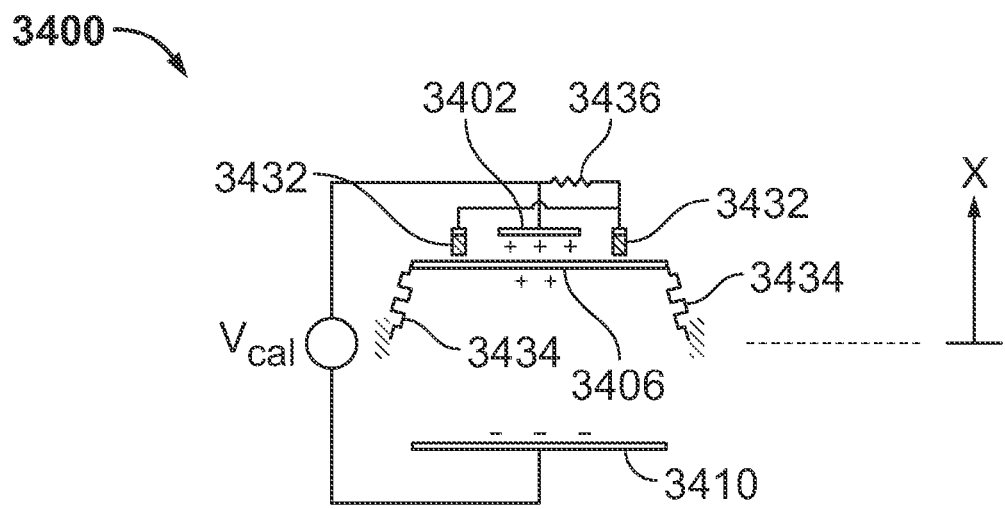
FIG. 41 shows an example of a cross-sectional schematic of the analog interferometric modulator of FIG. 34 illustrating the middle electrode in the third position following a calibration procedure.

Moving next to block 3910, the middle electrode 3406 moves in a downward direction to a third position in the gap g when the mechanical restorative spring force exceeds the force applied to the third electrode 3406. FIG. 41 shows an example of a cross-section of the modulator 3400 after the middle electrode separates from the conductive posts 3432 and moves to the third position, thus isolating the positive charges which remain on the middle electrode 3406. When the middle electrode 3406 releases at block 3910, the amount of positive charge on the middle electrode 3406 is related to the stiffness of the springs holding the middle electrode 3406, as described in greater detail above. The modulator 3400 is now calibrated and in an operational range or operationally ready state.

The calibration procedure described with reference to FIG. 39 can be applied to a series of modulators 3400 in an array. Following the calibration procedure described in FIG. 39, a series of positively-charged, electrically isolated middle electrodes are suspended between their respective upper and lower electrodes. The positive charge on each calibrated middle electrode is a function of the stiffness of the particular springs holding that electrode. Calibration of charge on a series of middle electrodes can be used to move the electrodes to the same location for a given applied voltage despite variances in their associated spring constants.

The calibration procedure described with reference to FIG. 39 can be used to calibrate modulators 3400 in a display. In one implementation, a display includes a plurality of analog interferometric modulators 3400 arranged in an array. Drive voltages can be applied across the plurality of modulators 3400 in the array to operate the display and display data. Operating the display can include actuating or moving the middle electrodes 3406 of the modulators in the array to various locations in the gap formed by the upper electrodes 3402 and lower electrodes 3410 to display an image and/or data. Operating the display can result in charge being dissipated from the middle electrode 3406 in each of the plurality of modulators 3400. In some implementations, operating the display can result in charge being dissipated from the middle electrode 3406 in each of the plurality of modulators 3400, such that the middle electrodes 3306 have an uncalibrated charge. In some implementations, the charge is purposefully dissipated from the middle electrode 3406 by applying a dissipation voltage.

The actuation, charging, and calibration procedures described with reference to FIGS. 34-41 can then be performed in preparation to display data on the display a second time. To begin, the actuation procedure described above with reference to FIGS. 35-36 can be performed. For example, a charging actuation voltage can be applied across the upper electrode 3402 and the lower electrode 3410 of each of the modulators 3400 to produce a non-uniform electric field in the gap between the upper electrode 3402 and the lower electrode 3410. The charging actuation voltage may be the same or substantially the same as the drive voltage. As described with reference to FIGS. 35-36, the middle electrodes 3406 in each of the modulators 3400 will be actuated or moved toward the upper electrode 3402.

The charging procedure described with reference to FIGS. 37-38 can then be performed across all modulators 3400 in the array. As described with reference to FIGS. 39-41, a calibration procedure can then be performed on each modulator 3400 to calibrate the charge that has been placed on each middle electrode 3406. In one implementation, the calibration voltage used to actuate the middle electrodes 3406 during the calibration procedure is less than the charging actuation voltage. Following the calibration procedure, the modulators 3400 are in an operationally ready state. Drive voltages can again be applied across the plurality of modulators to operate the display to display data, beginning the cycle again. In some implementations, multiple drive voltages are applied on any given modulator to display different colors at different points in time before it is actuated, charged, and calibrated once again. In some implementations, before the cycle is begun again, a dissipation voltage may be applied to return the middle electrode 3406 to a charge-neutral state, as mentioned above, or the middle electrode 3406 can still retain some charge when it is further charged and then calibrated. The above-described cycle of operation (for example, data display), actuation, charging, and calibration can be repeated where useful and adjusted to account for variances in the rate of charge leakage from the middle electrodes 3406 over the lifetime of the device.

The voltage to actuate the middle electrode in order to calibrate charge on the middle electrode in the "switchless" implementation illustrated in FIG. 34 will be greater than the voltage to actuate the middle electrode for calibration in the implementation illustrated in FIG. 26. The upper electrode 3402 in the "switchless" implementation illustrated in FIG. 34 has a smaller surface area than the compound electrode 2626 in the implementation illustrated in FIG. 32. As described above with reference to FIG. 17, the force exerted by the smaller upper electrode 3402 in the "switchless" implementation illustrated in FIG. 34 will generally be less than the force exerted by the compound electrode 2626 in the implementation illustrated in FIG. 32, thus a higher voltage will generally be used to actuate the middle electrode. It will also be understood that the capacitance between the upper electrode 3402 and the lower electrode 3410 in the implementation illustrated in FIG. 34 is not a constant, but a function of the position of the middle electrode 3406. As a result, the capacitance between the upper electrode 3402 and the lower electrode 3410 is a nonlinear function of the displacement of the middle electrode 3406. The degree of nonlinearity is governed by the disparity in area between the upper electrode 3402, the middle electrode 3406, and the lower electrode 3410.

The actuation, charging, and calibration methods and systems described herein are not limited to electromechanical systems devices, or MEMS devices. The methods and systems described herein can be used in any display device involving actuation, placement of charge, or calibration of charge on electrodes, for example OLED or LCD devices. The devices, methods, and systems described herein can also be implemented in devices having torsional mirrors or electrodes. For example, an electrically isolated, charge neutral torsional mirror or electrode can be actuated to move rotationally under the influence of a non-uniform field.

Figure 42A:
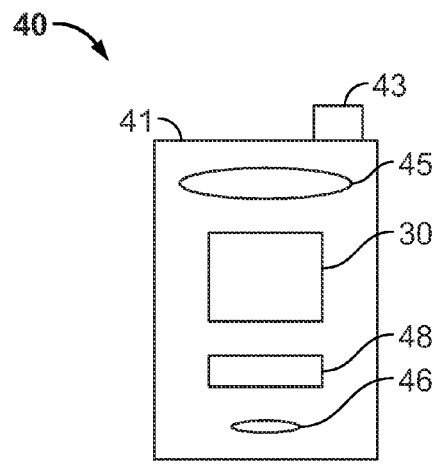
FIGS. 42A and 42B show examples of system block diagrams illustrating a display device that includes a plurality of interferometric modulators.
Figure 42B:
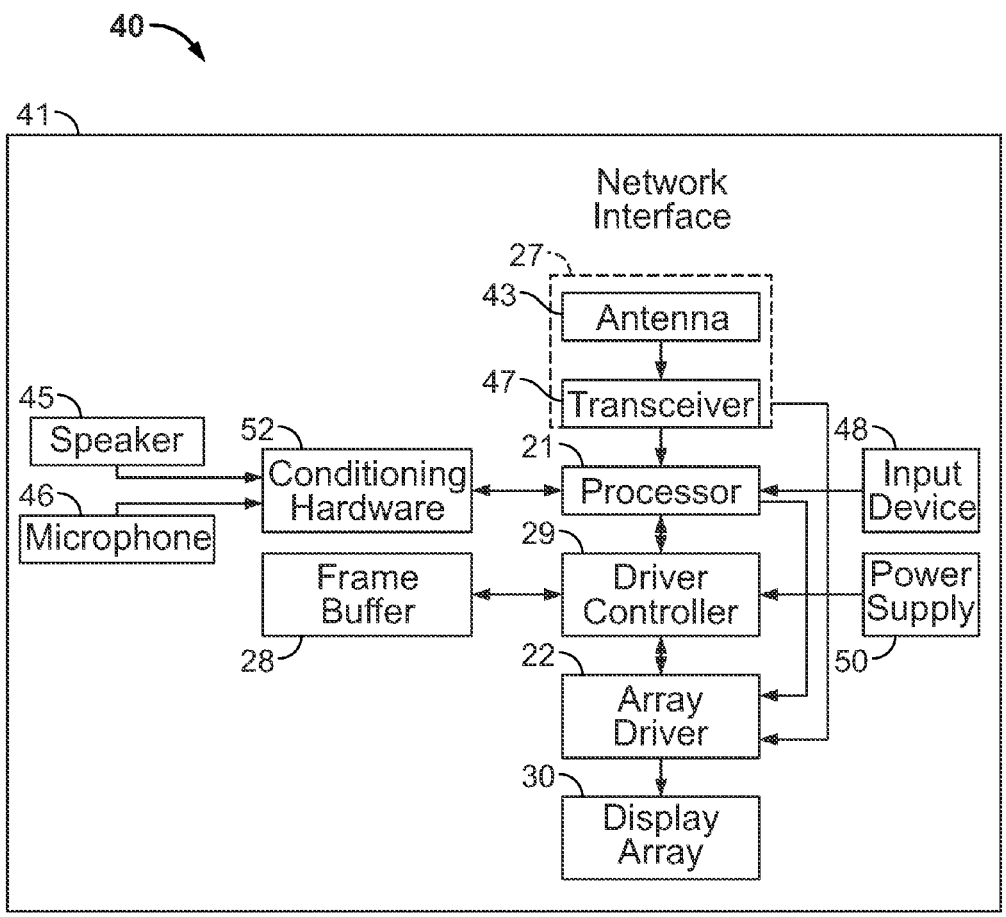

FIGS. 42A and 42B show examples of system block diagrams illustrating a display device 40 that includes a plurality of interferometric modulators. The display device 40 can be, for example, a smart phone or a cellular or mobile telephone. However, the same components of the display device 40 or slight variations thereof are also illustrative of various types of display devices, for example televisions, e-readers, handheld devices, and portable media players.

The display device 40 includes a housing 41, a display 30, an antenna 43, a speaker 45, an input device 48, and a microphone 46. The housing 41 can be formed from any of a variety of manufacturing processes, including injection molding, and vacuum forming. In addition, the housing 41 may be made from any of a variety of materials, including, but not limited to: plastic, metal, glass, rubber, and ceramic, or a combination thereof. The housing 41 can include removable portions (not shown) that may be interchanged with other removable portions of different color, or containing different logos, pictures, or symbols.

The display 30 may be any of a variety of displays, including a bi-stable or analog display, as described herein. The display 30 also can be configured to include a flat-panel display, for example plasma, EL, OLED, STN LCD, or TFT LCD, or a non-flat-panel display, for example a CRT or other tube device. In addition, the display 30 can include an interferometric modulator display, as described herein. For example, the display can include analog interferometric modulator pixels that are operated, actuated, charged, and/or calibrated using methods described herein.

The components of the display device 40 are schematically illustrated in FIG. 42B. The display device 40 includes a housing 41 and can include additional components at least partially enclosed therein. For example, the display device 40 includes a network interface 27 that includes an antenna 43 which is coupled to a transceiver 47. The transceiver 47 is connected to a processor 21, which is connected to conditioning hardware 52. The conditioning hardware 52 may be configured to condition a signal (e.g., filter a signal). The conditioning hardware 52 is connected to a speaker 45 and a microphone 46. The processor 21 is also connected to an input device 48 and a driver controller 29. The driver controller 29 is coupled to a frame buffer 28, and to an array driver 22, which in turn is coupled to a display array 30. A power supply 50 can provide power to all components as required by the particular display device 40 design.

The network interface 27 includes the antenna 43 and the transceiver 47 so that the display device 40 can communicate with one or more devices over a network. The network interface 27 also may have some processing capabilities to relieve, e.g., data processing requirements of the processor 21. The antenna 43 can transmit and receive signals. In some implementations, the antenna 43 transmits and receives RF signals according to the IEEE 16.11 standard, including IEEE 16.11 (a), (b), or (g), or the IEEE 802.11 standard, including IEEE 802.11a, b, g or n. In some other implementations, the antenna 43 transmits and receives RF signals according to the BLUETOOTH standard. In the case of a cellular telephone, the antenna 43 is designed to receive code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless network, for example a system utilizing 3G or 4G technology. The transceiver 47 can pre-process the signals received from the antenna 43 so that they may be received by and further manipulated by the processor 21. The transceiver 47 also can process signals received from the processor 21 so that they may be transmitted from the display device 40 via the antenna 43.

In some implementations, the transceiver 47 can be replaced by a receiver. In addition, in some implementations, the network interface 27 can be replaced by an image source, which can store or generate image data to be sent to the processor 21. The processor 21 can control the overall operation of the display device 40. The processor 21 receives data, for example compressed image data from the network interface 27 or an image source, and processes the data into raw image data or into a format that is readily processed into raw image data. The processor 21 can send the processed data to the driver controller 29 or to the frame buffer 28 for storage. Raw data typically refers to the information that identifies the image characteristics at each location within an image. For example, such image characteristics can include color, saturation, and gray-scale level.

The processor 21 can include a microcontroller, CPU, or logic unit to control operation of the display device 40. The conditioning hardware 52 may include amplifiers and filters for transmitting signals to the speaker 45, and for receiving signals from the microphone 46. The conditioning hardware 52 may be discrete components within the display device 40, or may be incorporated within the processor 21 or other components.

The driver controller 29 can take the raw image data generated by the processor 21 either directly from the processor 21 or from the frame buffer 28 and can re-format the raw image data appropriately for high speed transmission to the array driver 22. In some implementations, the driver controller 29 can re-format the raw image data into a data flow having a raster-like format, such that it has a time order suitable for scanning across the display array 30. Then the driver controller 29 sends the formatted information to the array driver 22. Although a driver controller 29, for example an LCD controller, is often associated with the system processor 21 as a stand-alone Integrated Circuit (IC), such controllers may be implemented in many ways. For example, controllers may be embedded in the processor 21 as hardware, embedded in the processor 21 as software, or fully integrated in hardware with the array driver 22.

The array driver 22 can receive the formatted information from the driver controller 29 and can re-format the video data into a parallel set of waveforms that are applied many times per second to the hundreds, and sometimes thousands (or more), of leads coming from the display's x-y matrix of pixels.

In some implementations, the driver controller 29, the array driver 22, and the display array 30 are appropriate for any of the types of displays described herein. For example, the driver controller 29 can be a conventional display controller or a bi-stable display controller (e.g., an IMOD controller). Additionally, the array driver 22 can be a conventional driver or a bi-stable display driver (e.g., an IMOD display driver). Moreover, the display array 30 can be a conventional display array or a bi-stable display array (e.g., a display including an array of IMODs). In some implementations, the driver controller 29 can be integrated with the array driver 22. Such an implementation can be useful in highly integrated systems including cellular phones, watches and other small-area displays.

In some implementations, the input device 48 can be configured to allow, e.g., a user to control the operation of the display device 40. The input device 48 can include a keypad, for example a QWERTY keyboard or a telephone keypad, a button, a switch, a rocker, a touch-sensitive screen, or a pressure- or heat-sensitive membrane. The microphone 46 can be configured as an input device for the display device 40. In some implementations, voice commands through the microphone 46 can be used for controlling operations of the display device 40.

The power supply 50 can include a variety of energy storage devices. For example, the power supply 50 can be a rechargeable battery, for example a nickel-cadmium battery or a lithium-ion battery. In implementations using a rechargeable battery, the rechargeable battery may be chargeable using power coming from, for example, a wall socket or a photovoltaic device or array. Alternatively, the rechargeable battery can be wirelessly chargeable. The power supply 50 also can be a renewable energy source, a capacitor, or a solar cell, including a plastic solar cell or solar-cell paint. The power supply 50 also can be configured to receive power from a wall outlet.

In some implementations, control programmability resides in the driver controller 29 which can be located in several places in the electronic display system. In some other implementations, control programmability resides in the array driver 22. The above-described optimization may be implemented in any number of hardware and/or software components and in various configurations.

The various illustrative logics, logical blocks, modules, circuits and algorithm steps described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and steps described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular steps and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein. The word "exemplary" is used exclusively herein to mean "serving as an example, instance, or illustration." Any implementation described herein as "exemplary" is not necessarily to be construed as preferred or advantageous over other possibilities or implementations. Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of the IMOD as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method of calibrating an analog interferometric modulator in a display, comprising:
   applying a calibration voltage across a first electrode and a second electrode to produce an electric field in a gap between the first electrode and the second electrode to move a third electrode, positioned in the gap, towards the first electrode from an electrically isolated first position to an electrically connected second position, the third electrode being subject to a mechanical restorative force; and
   electrically connecting the third electrode to one or more conductive posts electrically connected to the first electrode, to change an electric charge on the third electrode when the third electrode is in the second position, until the mechanical restorative force on the third electrode exceeds an electric field force on the third electrode such that the third electrode moves to an electrically isolated third position, the third position being farther away from the first electrode than the second position.

2. The method of claim 1, wherein the first electrode includes an upper electrode and a complementary electrode aligned laterally relative to the upper electrode, wherein the method further comprises electrically connecting the complementary electrode to the upper electrode to form a compound electrode, and wherein applying a calibration voltage includes applying a calibration voltage across the compound electrode and the second electrode.

3. The method of claim 2, wherein electrically connecting the complementary electrode to the upper electrode includes closing one or more switches to connect the complementary electrode to the upper electrode.

4. The method of claim 2, wherein the compound electrode and the second electrode have substantially the same surface area and the electric field produced between the compound electrode and the second electrode is uniform.

5. The method of claim 2, wherein the complementary electrode is grounded before being electrically connected to the upper electrode.

6. The method of claim 2, wherein changing an electric charge includes dissipating an electric charge on the third electrode through the one or more conductive posts when the third electrode is in the second position.

7. The method of claim 2, further comprising calibrating a plurality of the analog interferometric modulators arranged in an array of the analog interferometric modulators in the display.

8. The method of claim 7, further comprising applying a dissipation voltage across the plurality of analog interferometric modulators in the array to dissipate a charge from the third electrode in each of the plurality of analog interferometric modulators in the array, such that the third electrodes become charge neutral.

9. The method of claim 8, further comprising electrically isolating the complementary electrode from the upper electrode, connecting the complementary electrode to ground in each of the plurality of analog interferometric modulators, and applying a charging actuation voltage across the upper electrode and the second electrode of each of the plurality of analog interferometric modulators.

10. The method of claim 1, wherein changing the electrical charge on the third electrode includes dissipating a charge on the third electrode through the one or more conductive posts when the third electrode is in the second position, and wherein the one or more conductive posts are electrically connected to the first electrode through a resistive component configured to reduce current flow through the one or more conductive posts.

11. The method of claim 1, wherein the second electrode has a greater surface area than the first electrode and the electric field produced between the first electrode and the second electrode is non-uniform.

12. The method of claim 1, further comprising calibrating a plurality of the analog interferometric modulators arranged in an array of the analog interferometric modulators in the display.

13. The method of claim 12, further comprising applying a dissipation voltage across the plurality of analog interferometric modulators in the array to dissipate a charge from the third electrode in each of the plurality of analog interferometric modulators in the array, such that the third electrodes become charge neutral.

14. The method of claim 12, further comprising applying a charging actuation voltage across the first electrode and the second electrode of each of the plurality of analog interferometric modulators to produce a non-uniform electric field in a gap between the first electrode and the second electrode, wherein the calibration voltage is less than the charging actuation voltage.

15. A device for modulating light, comprising:
   a display element comprising
      a first electrode;

a second electrode spaced apart from the first electrode by a gap, the first electrode and the second electrode configured to produce a non-uniform electric field therebetween when an actuation voltage is applied across the first electrode and the second electrode during an actuation procedure;

a complementary electrode aligned laterally relative to the first electrode, the complementary electrode configured to be electrically isolated from the first electrode during the actuation procedure and electrically connected to the first electrode to form a compound electrode during a calibration procedure, the compound electrode and the second electrode configured to produce a uniform electric field therebetween when a calibration voltage is applied across the compound electrode and the second electrode during the calibration procedure;

at least one electrical contact disposed on the complementary electrode; and a movable third electrode disposed between the first electrode and the second electrode, the third electrode being configured to move within the gap between an electrically isolated first position, a second position in electrical communication with the at least one electrical contact, and an electrically isolated third position, wherein the electrical contact is configured to change an electrical charge on the third electrode when the third electrode is in the second position, and wherein the third electrode is configured to move to the third position after the electrical charge on the third electrode has been changed.

16. The device of claim 15, wherein the at least one electrical contact includes one or more conductive posts electrically connected to the complementary electrode.

17. The device of claim 15, wherein the third electrode is configured to move to the second position in response to the non-uniform electric field during the actuation procedure.

18. The device of claim 15, wherein the third electrode is configured to move to the second position in response to the uniform electric field during the calibration procedure.

19. The device of claim 15, wherein the third electrode is configured to move from the first position to the second position and from the second position to the third position during the actuation procedure.

20. The device of claim 15, wherein the third electrode is configured to move from the third position to the second position and from the second position to the third position during the calibration procedure.

21. The device of claim 15, wherein the third electrode is configured to have a net neutral charge when the third electrode is in the first position.

22. The device of clam 15, wherein the complementary electrode is connected to electrical ground when it is electrically isolated from the first electrode during the actuation procedure and wherein the complementary electrode is electrically connected to the first electrode via switches during the calibration procedure.

23. The device of claim 15, further comprising:
a display including a plurality of the display elements;
a processor that is configured to communicate with the display, the processor being configured to process image data; and
a memory device that is configured to communicate with the processor.

24. The device of claim 23, further comprising:
a driver circuit configured to send at least one signal to the display.

25. The device of claim 24, further comprising:
a controller configured to send at least a portion of the image data to the driver circuit.

26. The device of claim 25, wherein the controller is configured to apply the calibration voltage across the compound electrode and the second electrode during the calibration procedure.

27. The device of claim 23, further comprising:
an image source module configured to send the image data to the processor.

28. The device of claim 27, wherein the image source module includes at least one of a receiver, a transceiver, and a transmitter.

29. The device of claim 23, further comprising:
an input device configured to receive input data and to communicate the input data to the processor.

* * * * *